(12) United States Patent
Charrier et al.

(10) Patent No.: US 6,266,451 B1
(45) Date of Patent: Jul. 24, 2001

(54) METHOD AND DEVICE FOR THE PROCESSING OF DATA NOTABLY THE COMPRESSION AND DECOMPRESSION OF IMAGE DATA

(75) Inventors: Maryline Charrier, Rennes; Isabelle Amonou, Thorigne-Fouillard; Claude Dierieck, Cesson Sevigne, all of (FR)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/046,602

(22) Filed: Mar. 24, 1998

(30) Foreign Application Priority Data

| Mar. 28, 1997 | (FR) | 97 03865 |
| Mar. 28, 1997 | (FR) | 97 03864 |
| Mar. 28, 1997 | (FR) | 97 03863 |

(51) Int. Cl.$^7$ .................................. G06K 9/36
(52) U.S. Cl. .......................... 382/249; 382/248
(58) Field of Search .................. 382/248, 249, 382/232; 348/403, 405, 393, 395, 396

(56) References Cited

U.S. PATENT DOCUMENTS

| 5,416,856 |   | 5/1995 | Jacobs et al. | 382/232 |
| 5,768,437 | * | 6/1998 | Monro et al. | 382/249 |
| 5,796,864 | * | 8/1998 | Callahan | 382/166 |
| 5,862,263 | * | 1/1999 | Kim et al. | 382/249 |
| 5,870,502 | * | 2/1999 | Bonneau et al. | 382/249 |

OTHER PUBLICATIONS

Jacquin, "Fractal Image Coding: A Review", Proc. IEEE, vol. 81, No. 10, Oct. 1993, pp. 1451–1465.

* cited by examiner

*Primary Examiner*—Yon J. Couso
(74) *Attorney, Agent, or Firm*—Fitzpatrick, Cella, Harper & Scinto

(57) ABSTRACT

The method for primary processing according to the invention takes into account a minimum dimension and a partition of a set of data into so-called "initial elementary" subsets ($K_i$).

Figure 1:
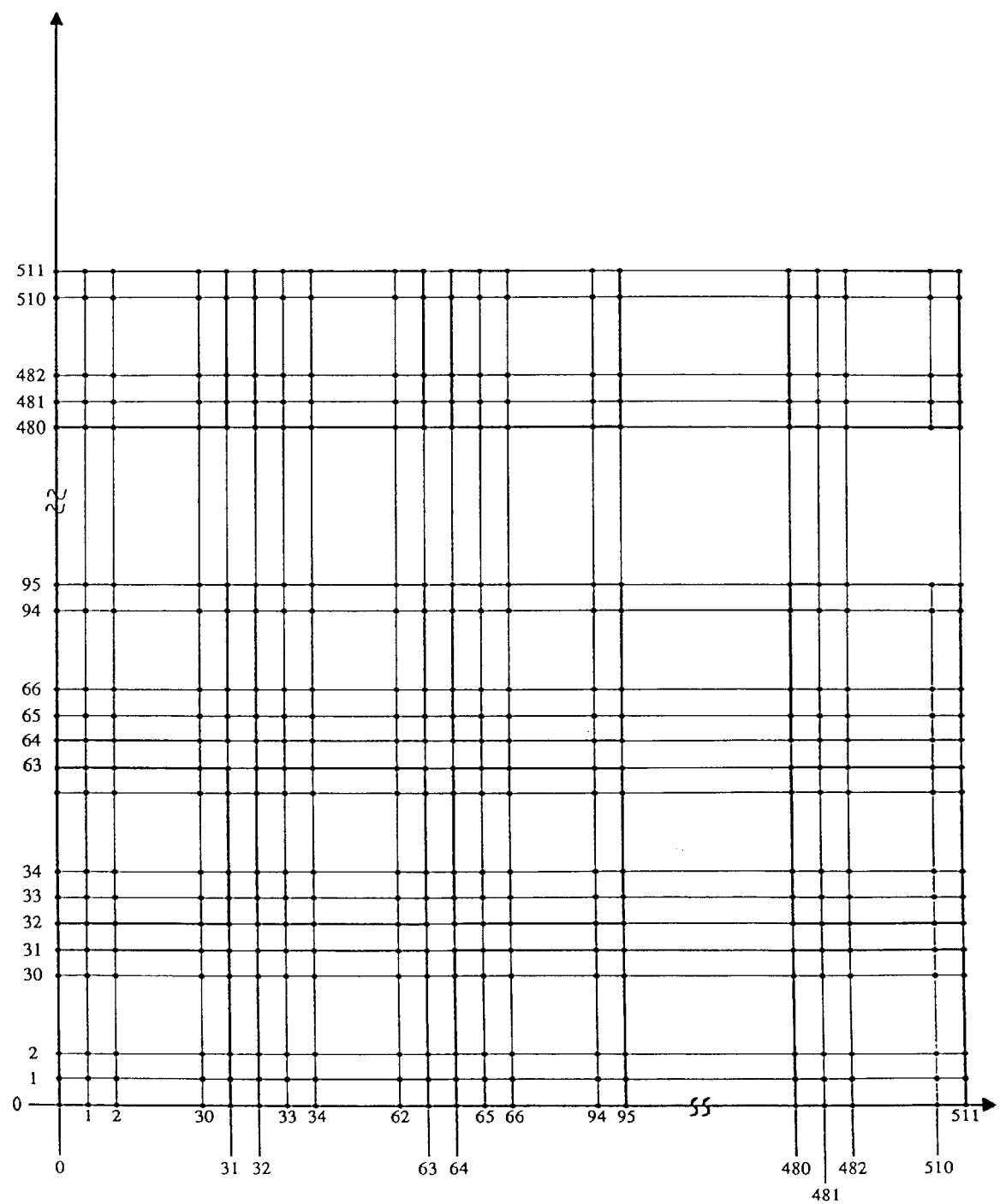

It includes:
  a) for each elementary subset which size is larger than the minimum dimension, one iteration of:
    a division suitability estimation step, and
    when appropriate, a step of "supplementary partitioning" of the said subset,
  b) a "construction" step of a global multidimensional mapping and non-linear mapping, the restrictions of the global mapping to the elementary subsets ($K_i$) being composed of elementary mappings, the fixed point of the global mapping constituting an approximation of all or part of this set,
the set of parameters ($a_i$, b) determined by the restrictions constituting an approximation of the said set of data.

61 Claims, 28 Drawing Sheets

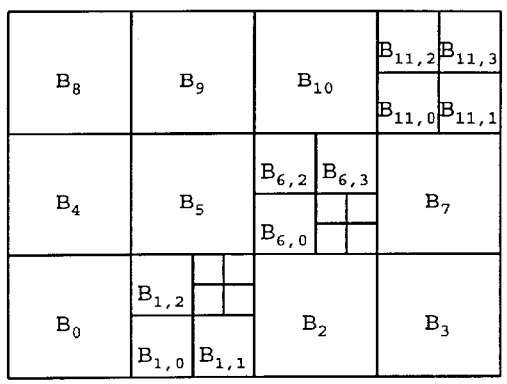
Fig. 21A
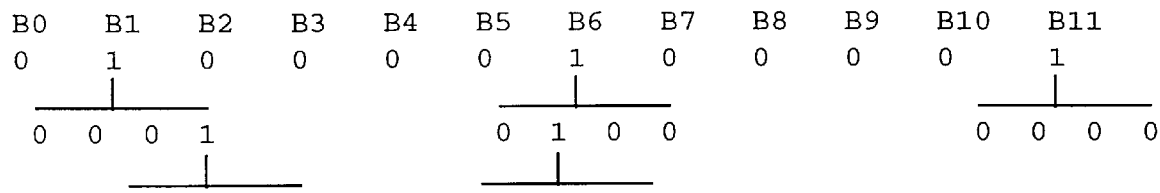
Fig. 21B
```
HEADER
0D
1 0D 0D 0D 1 D D D D
0D
0D
0D
0D
1 0D 1 D D D D 0D 0D
0D
0D
0D
0D
1 0D 0D 0D
```
Fig. 21C

METHOD AND DEVICE FOR THE PROCESSING OF DATA NOTABLY THE COMPRESSION AND DECOMPRESSION OF IMAGE DATA

The present invention concerns, in general terms, a method and a device for the processing of data, notably the representation, generation, restoration, regeneration or iterative processing of data.

More particularly the present invention relates to the transmission (that is to say the representation remotely) and/or the storage (that is to say the representation in a memory) of data, with or without their compression. These data may advantageously consist of the digital or analogue data of an image or sequence of images, and/or the digital or analogue data relating to sound (music, speech, etc), and/or the digital or analogue data relating to any mono or multi-dimensional signal. More generally, the present invention relates to the representation of any mono or multidimensional data.

Before explaining the objectives and means of the invention, the following definitions are given below:

"Set of data": set of any data representing physical quantities (most often voltage levels) themselves capable of representing other physically perceptible or measurable quantities. In favoured mappings, the sets of data concerned are of images, sound or mono or multidimensional signals, etc. In the mapping concerning image processing, the "image" will sometimes be referred to instead of the "set of data" relating to the image. That which will be explained below about "images" or "sub-images" is respectively applicable to the "sets of data" or "subsets of data" and vice versa.

"Representation of data": any "processing" of a set of data of a given type, resulting in the perfect or imperfect transformation of the said set of data into another type. For example: the data may be constituted by the 256 levels of grey of the pixels of an image, their representation consisting of a series of binary words capable of being stored or transmitted; conversely, the representation of the data constituted by the said binary words may consist of their transformation in order to regain data of the same type as the initial data.

"Primary representation": by convention, any processing resulting in the transformation of data of a first type to data of a second type. In this case "primary processing" of the data will be referred to.

"Secondary representation": by convention, the transformation of data of the second type resulting from primary processing. In this case "secondary processing" will be referred to.

"Data restoration": a particular case of secondary representation in which the data of the second type are transformed into data of the first type. This restoration may be perfect or imperfect.

A "metric space" is a set of elements equipped with a distance functional which is symmetrical, positive and satisfies triangular inequality. This space is "complete" when it contains all the limit points of all the convergent series.

A "Lipschitz mapping": a mapping which transforms the points of a metric space into the same space and for which the set of ratios of the distance between two elements transformed by the said mapping, over the distance between the two said elements, is bounded.

A "contractive mapping" or "contraction": a Lipschitz mapping for which the smallest majorant (contraction factor) of the said set of ratios is less than unity. However, within the meaning of the present invention, all convergent mappings, that is to say those having a fixed point (thus allowing the use of successive approximations) in a subset of the metric space, are contractive.

A "similarity" is a Lipschitz mapping for which the ratio of the distance between two transformed elements over the distance between the said elements is a fixed quantity. A linear similarity is a "similitude".

A "contractive similarity" is a Lipschitz mapping for which the ratio of the distance between two transformed elements over the distance between the said elements is a fixed quantity strictly less than unity.

The "fixed point" of a contraction of a complete metric space into the same space (or of a subset of that space into itself) is the unique element which is left invariant by the said contractive mapping.

The "construction" of a contractive mapping on a set of data consists of composing a family of contractions capable of transforming the data and selecting the parameters of one of the said contractions in order to satisfy one or more predetermined conditions.

The "method of successive approximations" makes it possible to iteratively approach the fixed point of a contraction as close as is wished. Starting from an arbitrary element, the said contraction is applied on this element. The same contraction is next applied on the previously obtained transform. By reiterating this process, the fixed point of the contraction is approached successively and inescapably.

"A better approximation" of an element in a metric space is a point from a subset of candidates, which are themselves points of the said space, which minimises the distance to the said element.

"A good approximation" of an element in a metric space is a point of a subset of the said space which is close, with a predetermined error, to a predetermined better approximation.

Various methods of image representation, with compression, using the so-called "fractal" technique, are known in the prior art.

Through the document U.S. Pat. No. 5,065,447, a method and a device allowing the processing or storage of images with compression of the data relating to the initial image are known. In this method, the data relating to the initial image are divided, that is to say the image is cut up into a plurality of elementary sub-images (called "domain blocks"). This method next consists of generating an ordered dictionary of a set of reference sub-images (called "range blocks") composed of image portions of predetermined size which have undergone a certain number of predetermined operations such as rotation and reversal along various axes of symmetry. Next, for each elementary sub-image, a comparison with the set of reference sub-images in the dictionary is carried out and the reference sub-image the most similar to the elementary sub-image under consideration is selected from the dictionary. Finally, the method consists of processing or storing parametric information relating to the addresses of the reference sub-images selected from the dictionary, in order to represent each of the original elementary sub-images.

It is through this set of operations that the method described in this document makes it possible to obtain a first representation of the image with compression of the data.

In order to carry out, from the said parametric information, the restoration of the initial image, the method and device described in this document perform the following operations: from an arbitrary starting image, steps similar to those above are carried out, that is to say the arbitrary starting image is partitioned and a dictionary is composed from its elementary sub-images. However, the dictionary is only partially composed, performing, for each sub-image, only the predetermined operation corresponding to the address concerned in the dictionary for the position of the sub-image under consideration.

The data thus obtained are used to reiterate this process until the difference between two consecutively obtained images is less than a predetermined threshold. The image obtained last of all is then an approximation of the initial image.

This method, of interest theoretically, has the major drawback that it is sometimes not easily practicable industrially with the means known at present. This is because each image must lead to a long analysis with composition of a particularly large dictionary, the elementary sub-images of the image to be stored or transmitted all being compared with each reference sub-image present in the dictionary. The inventors, who have carried out simulations, thus noted that for certain images of average size and resolution (512×512 pixels with 3×256 colour levels), the processing time for compression was of the order of 1000 to 2000 seconds on a work station, that is of the order of half an hour. Such a processing time is obviously prohibitive for almost any industrial mapping.

Through the document WO-A-93/17519, another method and device allowing the processing of images with compression of the data relating to the initial image are known. In this method, the data relating to the initial image are also partitioned, that is to say the image is divided into a plurality of elementary sub-images (called "domains"). In this method, a set of fractal transforms linking the sub-images to the set of initial data is determined next, that is to say the initial image is searched for a portion of image similar to the elementary image under consideration, so as to minimise the error between the initial data and the approximated data thus obtained. The coefficients of the set of fractal transformations thus carried out constitute the first representation of the initial image.

In order to achieve the restoration of the image, the method and device described in this document carry out a search for the fixed points of the elementary fractal transformations of which the coefficients have been received without however explaining how this search is performed. The initial image is thus restored by carrying out a union of the restored sub-images.

This method is also of interest theoretically. However, the inventors noted significant degradations in the quality of the restored image.

The inventors have attempted to develop a data processing method of the same kind as the methods of the prior art analyzed above, but having better performance both as regards quality of the restored data and as regards processing speed.

During their research, the inventors discovered that the reason why the methods described in U.S. Pat. No. 5,065,447 and WO-A-93/17519 have the above-mentioned faults is due to the fact that both methods involve geometrical transformations of image portions essentially constituted by contractive similarities (construction of the dictionary in U.S. Pat. No. 5,065,447 and fractal transformation in WO-A-93/17519). They have in fact been able to reveal that in both cases it is a question of the use of an idea widely shared by persons skilled in the art concerned by fractal compression at the time of filing of the present mapping, an idea according to which the images could, whatever their origin, essentially be composed of elements or parts having significant degrees of resemblance between them.

However, in fact, the performance of WO-A-93/17519 is very poor as regards the quality of the restored image since the inventors discovered that the restoration capabilities of contractive similitudes are very limited contrary to the belief of the said persons skilled in the art at the date of filing of the present mapping.

Likewise the performance of U.S. Pat. No. 5,065,447 is very limited as regards processing time. As the restoration capabilities of contractive similitudes are intrinsically limited, the author of U.S. Pat. No. 5,065,447 is led to production of a large dictionary which is constructed on the basis of numerous transformations of sub-images in the method according to U.S. Pat. No. 5,065,447: in effect it is a question of artificially multiplying the elements of resemblance, which certainly makes it possible to substantially improve the quality of the restored image, but at the expense of the calculation time.

The inventors have therefore attempted to implement a method and device for the processing of data, notably images, making it possible to obtain better performances than the aforementioned prior art both as regards quality of the data or the restored image and as regards the calculation speed, and capable of resulting in a significant compression of the data to be transmitted or stored.

Moreover, when, as is usually found, an image to be processed has some areas which are practically uniform and other areas where at least one of the components varies rapidly from one pixel to another, processing parameters which are uniform over the whole image turn out to be poorly adapted, either because they provide processing of too high a quality in the most uniform areas, or because they involve processing of too low a quality in the most complex areas. The inventors have therefore attempted to optimise, according to the local complexity of the image to be processed, locally used processing parameters.

The methods and devices according to the invention solve this problem.

In general terms, the present invention relates first of all to a method for primary processing of a set of data representing physical quantities, a primary processing method taking into account a minimum dimension and having an "initial partitioning" step during which the said set of data is partitioned into so-called "initial elementary" subsets, a primary processing method characterised in that it includes:
a) for each elementary subset which does not have the said minimum dimension, at least one iteration of a sequence of steps including:
   a division suitability estimation step during which a suitability for division of the said elementary subset is estimated, and
   when the suitability estimate does not meet predetermined so-called "quality" criteria, a step of "supplementary partitioning" of the said subset into so-called "intermediate" elementary subsets,
b) a "construction" step in which, for each elementary subset resulting from the last partitioning step, n working subsets are considered, n being non-zero, and an elementary mapping of the n working subsets in the elementary subset under consideration is constructed by determining the parameters of the elementary mapping so as to:
   make contractive a so-called "first type" global mapping, for the said set of data, the said global mapping belonging to the group of mappings composed of multidimensional mappings and non-linear mappings, the restrictions of the global mapping to the elementary subsets being composed of the said elementary mappings, the fixed point of the global mapping constituting an approximation of all or part of this set, allow the use of a method of successive approximations converging towards the fixed point of the said global contractive mapping;

the set of parameters thus determined, and, when at least one supplementary partitioning step has taken place, so-called "partitioning" information, representing each said supplementary partitioning, jointly constituting a primary representation of the said set of data.

In general terms, the present invention next relates to a device for primary processing of a set of data representing physical quantities, characterised in that it has:

means for entering data to be processed;

means for outputting parameters and partitioning information;

first logic means, for transforming the data to be processed into parameters and partitioning information;

the said first logic means having:

"partitioning" means adapted to partition the said set of data into "elementary subsets", "estimation" means adapted, for each elementary subset which does not have the said minimum dimension, to estimate a suitability for division of the said elementary subset, the said partitioning means being, moreover, adapted to partition each elementary subset which does not have the said minimum dimension, and for which the division suitability estimate does not meet predetermined so-called "quality" criteria, into so-called "intermediate elementary" subsets and "construction" means adapted to:

construct a so-called "first type" global contractive mapping, the fixed point of which constitutes an approximation of all or part of this set of data, by determining the parameters of each elementary mapping of n working subsets associated with each elementary subset resulting from the last partitioning, n being non-zero, in the said elementary subset, the restrictions of the global mapping to the elementary subsets being composed of the said elementary mappings, the said global mapping belonging to the group of mappings composed of multidimensional mappings and non-linear mappings, so as to allow the use of a method of successive approximations converging towards the fixed point of the said global contractive mapping;

deliver on the output means the parameters thus determined and, when at least one elementary subset has been partitioned, so-called "partitioning" information, representing each said supplementary partitioning, jointly constituting a primary representation of the said set of data.

By virtue of these provisions, the present invention achieves the objectives explained above.

It must be noted first of all that it has been discovered that, generally speaking, in accordance with the invention, in order to process, and notably represent, a set of initial data representing physical quantities, notably with compression of the said initial data, it is sufficient to construct, by appropriate means, a global contractive mapping, acting on the said data.

Another important characteristic of the invention resides in the fact that in order to construct the said global contractive mapping it is necessary to use at least one mapping belonging to the group of mappings composed of multidimensional mappings and non-linear mappings. By doing this, all recourse to mathematical transformations belonging to the class of contractive similarities is excluded, which makes it possible to avoid the drawbacks noted above.

However, to construct the said global contractive mapping acting on the data, persons skilled in the art have at their disposal a very wide range of mathematical tools from which they can draw. Consequently they can choose from amongst these tools those most favourable to the performance, for example in conjunction with the type of data to be represented or the particular mapping related to. Such a possibility does not exist in the prior art analyzed above and turns out to be highly advantageous. Thus, for example, in the case of local processing of the image, by partitioning the latter into elementary sub-images, persons skilled in the art can choose, for the local processing, mappings which are not necessarily contractive, which gives them an important choice in the possibilities for local processing of the image and thus leaves them great freedom. In particular, they can choose, at the local level, Lipschitz mappings which will allow them to facilitate use of the contractive character of the global mapping.

Furthermore, the use of a method of successive approximations leaves persons skilled in the art the freedom to choose the final deviation between the said fixed point and the data thus restored or generated.

The estimation step allows the device to estimate or measure the local complexity of the set of data in the elementary subset, and the complexity of the processing to be applied to it. A division suitability being estimated, during the estimation step it is checked whether this suitability meets predetermined so-called "quality" criteria. When the division suitability meets these criteria, which generally means that the local complexity of the set of data can be processed correctly without supplementary division, no division is performed on the elementary subset. On the other hand, when the division suitability does not meet the said criteria, this generally means that the local complexity is greater than that which can be processed correctly without supplementary division, a supplementary partitioning step is performed, the elementary subsets resulting from this partitioning being processed in their turn.

The method of the invention is thus adaptive according to the values of the set of data, which makes it possible to process the local variations between these data more finely.

This is because it should be noted first of all that the method and device allow representation of a set of data, notably those relating to an image, with, if appropriate, a significant compression.

Moreover, by considering the number of successive partitionings defining an elementary subset and constructing each elementary mapping under consideration from working subsets, the quality of the restoration is improved notably, insofar as the number of partitionings is high. Of course, the calculation time increases with the number of supplementary partitionings used to define each elementary subset but this calculation time, even for a relatively large number, is very much smaller than the calculation time connected with the construction of a dictionary and analysis of the image on the basis described in document U.S. Pat. No. 5,065,447.

Furthermore, by avoiding the composition of a dictionary and the long analysis described in document U.S. Pat. No. 5,065,447, and by virtue of the characteristics of the present invention, the processing of an image is notably accelerated compared with the aforementioned US document. Using their preferred embodiment, the inventors were able to record that, for a 512×512 pixel image with 3×256 colour levels, the processing time was of the order of less than 100 seconds on a work station; they have moreover every reason to believe that improvements made to the method and device briefly defined above will make it possible to obtain improved performance as regards speed.

It should moreover be noted that as the elementary mappings constructed belong to the group of mappings composed of multidimensional mappings and non-linear mappings, the mappings belonging to the similitudes class are avoided, with the advantages observed above.

According to particular characteristics, in the primary processing method as briefly explained above, for at least one iteration of the said sequence of steps, the suitability estimate determined during the suitability estimation step consists of a measurement of a predetermined statistical quantity applied to the data of the elementary subset under consideration. Preferentially, the statistical quantity measured is the variance of the elementary subset under consideration.

Correlatively, according to particular characteristics, in the primary processing device as briefly explained above, the estimation means are adapted to measure a predetermined statistical quantity applied to the data of the elementary subset under consideration. Preferentially, the statistical quantity measured is the variance of the elementary subset under consideration.

By virtue of each of these provisions, determination of the suitability estimate is easy and uses only addition, multiplication and division functions.

According to other particular characteristics, at least one iteration of the said sequence of steps is performed after a construction step, the suitability estimation step including an operation of measuring a difference between, on the one hand, the data of the elementary subset and, on the other hand, the restriction of the global contractive mapping under construction to the elementary subset under consideration, and, when a step of supplementary partitioning of the elementary subset is carried out, it is followed by a new construction step taking into account the said supplementary partitioning. Preferentially, the difference measurement operation consists of a distance measurement operation.

Correlatively, according to particular characteristics of the primary processing device as briefly explained above:

the construction means having constructed a global contractive mapping, the estimation means are adapted to measure a difference between, on the one hand, the data of the elementary subset and, on the other hand, the restriction of the global contractive mapping under construction to the elementary subset under consideration, and in that when the partitioning means carry out a supplementary partitioning, the construction means are adapted to construct a new global contractive mapping taking into account the said supplementary partitioning. Preferentially, to measure the said difference, the estimation means take into account a distance measurement.

By virtue of these provisions, it is the adaptation of the global contractive mapping to the data of the elementary subset under consideration which is estimated, which accounts better for the result to be expected from processing the primary representation determined according to the invention.

According to particular characteristics, the predetermined quality criteria consist of comparing the said measurement with a predetermined value. Preferentially, the suitability estimate meets the predetermined quality criteria when the said measurement is less than the said predetermined value.

Correlatively, according to particular characteristics of the primary processing device as briefly explained above, the estimation means are adapted to compare the said measurement with a predetermined value in order to determine whether the predetermined quality criteria are met. Preferentially, the estimation means are adapted to determine that the suitability estimate meets the predetermined quality criteria when the said measurement is less than the said predetermined value.

By virtue of these provisions, mapping of the quality criteria is particularly simple.

According to another of its aspects, the present invention relates to a method for secondary processing of a set of parameters associated with at least one item of partitioning information, resulting from primary processing of a first set of data, a secondary processing method characterised in that it includes:

a step of determining dimensions of elementary subsets constituting a partitioning of a second set of data, the said step taking into account the presence of partitioning information corresponding to the said subsets, each elementary mapping corresponding to an elementary subset being determined by at least one parameter from the said set of parameters, and an "iterative calculation" step during which, from the said set of parameters and the said dimensions, a method of successive approximations converging towards the fixed point of a so-called "second type" global contractive mapping is used on the second set of data, the restrictions of the global mapping to the elementary subsets being composed of the said elementary mappings, using, in order to do this, at least one mapping belonging to the group of mappings composed of multidimensional mappings and non-linear mappings.

Correlatively, in another of its aspects, the present invention relates to a device for secondary processing of data suitable for the secondary processing of a set of parameters associated with at least one item of partitioning information, resulting from the primary processing of initial data carried out by a primary processing device, characterised in that it has:

means for entering parameters and partitioning information;

means for outputting data;

second logic means for transforming parameters and partitioning information into data;

the said second logic means having:

dimension "determination" means adapted to determine dimensions of elementary subsets constituting a partitioning of a second set of data, taking into account the presence of partitioning information corresponding to the said subsets, each elementary mapping corresponding to an elementary subset being determined by at least one parameter from the said set of parameters, and "iterative calculation" means adapted to use, from the said set of parameters and the said dimensions, a method of successive approximations converging towards the fixed point of a so-called "second type" global contractive mapping including the said elementary mappings, using, in order to do this, at least one mapping belonging to the group of mappings composed of multidimensional mappings and non-linear mappings, the said fixed point constituting a secondary representation of the said set of initial data, and to deliver the data thus calculated on the output means.

By virtue of these provisions, secondary processing of a set of data having a set of parameters resulting from the primary processing of initial data can be carried out relatively simply since it is sufficient to use a method of successive approximations, known per se, converging towards the fixed point of a global contractive mapping. The convergence process thus used makes it possible to approach a representation of the set of initial data. Advantageously, an error threshold can be fixed, from which it will be considered that the precision required for representation of the set of initial data is achieved.

On the assumption, used in the preferred embodiment, that the global contractive mapping used during the primary processing and the global contractive mapping used during the secondary processing are identical, the representation of the set of initial data which results at the conclusion of the secondary processing in reality constitutes a restoration of the said initial data, with, if appropriate, the predetermined error mentioned above. Thus, if the set of initial data relates to an image, the primary processing makes it possible to transform and/or compress these data, for example with a view to their storage or transmission, and the secondary processing makes it possible to restore them.

On the assumption that the global contractive mapping used during the primary processing and the global contractive mapping used during the secondary processing are of distinct types, the secondary representation no longer constitutes a restoration of the initial data but in reality constitutes a transformation of them. This will be the case for example when an initial colour image has been subject to primary processing and is then represented by a grey scale image: in the two cases, clearly the same image is concerned, however the data relating to the image obtained at the conclusion of the secondary processing are no longer of the same type as the initial data.

By virtue of these provisions, the method of successive approximations used for the secondary processing is implemented in a particularly simple manner from the parameters obtained at the conclusion of the primary processing. The inventors were able to record, in the field of processing images with compression, the performance both as regards quality of the restored image and as regards the processing speed noted above.

The advantages briefly explained above concerning the supplementary partitionings concern, in a similar manner, the quality of the secondary processing, the partitioning information making it possible to reconstitute the elementary subsets of different dimensions used during the primary processing.

Another aspect of the invention combines, within the same processing method, a primary processing phase and a secondary processing phase. These provisions may be particularly advantageous on the assumption that it is wished to transform data of one type into data of another type. Thus, for example, in certain image processing applications, it may be useful to be able to transform a color image into a grey scale image. According to this aspect of the invention, such a transformation will consist, on the one hand, of primary processing of the colour image, followed (immediately or otherwise) by secondary processing, of the parameters thus obtained, during which a so-called "second type" global contractive mapping (different from the global contractive mapping used during the primary processing) will be used so as to restore a different type of image, in the example cited, a grey scale image. This is an example of "complex processing".

According to particular characteristics, the method for the primary processing of a first set of data allow the use, on a second set of data having a number of data items different from the number of data items in the first set, of a method of successive approximations converging towards the fixed point of a so-called "second type" of global contractive mapping.

Correlatively, the construction means of the device for the primary processing of a set of data representing physical quantities is adapted to allow the use of a method of successive approximations converging towards the fixed point of the said global contractive mapping, on a second set of data having a number of data items different from the number of data items in the first set of data.

Correlatively, during the step of iterative calculation of the method for the secondary processing of a set of parameters resulting from a primary processing of a first set of data, use is made of a second set of data having a number of data different from the first set of data.

Correlatively, the iterative calculation means of the device for the secondary processing of data suitable for the secondary processing of a set of parameters, is adapted to use a second set of data having a number of data items different from the number of data items of the first set of data.

According to these provisions, the parameters are independent of the dimension of the elementary subset with which they are associated, and thus, a reconstruction can be effected with the same simplicity and with the same efficacy whatever the dimensions of the reconstructed image.

By virtue of these arrangements, the method of successive approximations used for the secondary processing is used in a particular simple fashion using parameters obtained at the end of the primary processing, since these parameters are independent of the dimensions of the elementary subset with which they are associated.

The invention also relates to a printer, a photocopier, a camera and a facsimile device having a processing device as briefly explained above.

The invention also relates to a memory which stores:
parameters and partitioning information resulting from primary processing as briefly explained above and/or
instructions for software allowing implementation of a processing method as briefly explained above.

Since the advantages of these devices and memory are identical to those which are explained above, they are not repeated here.

Figure 2:
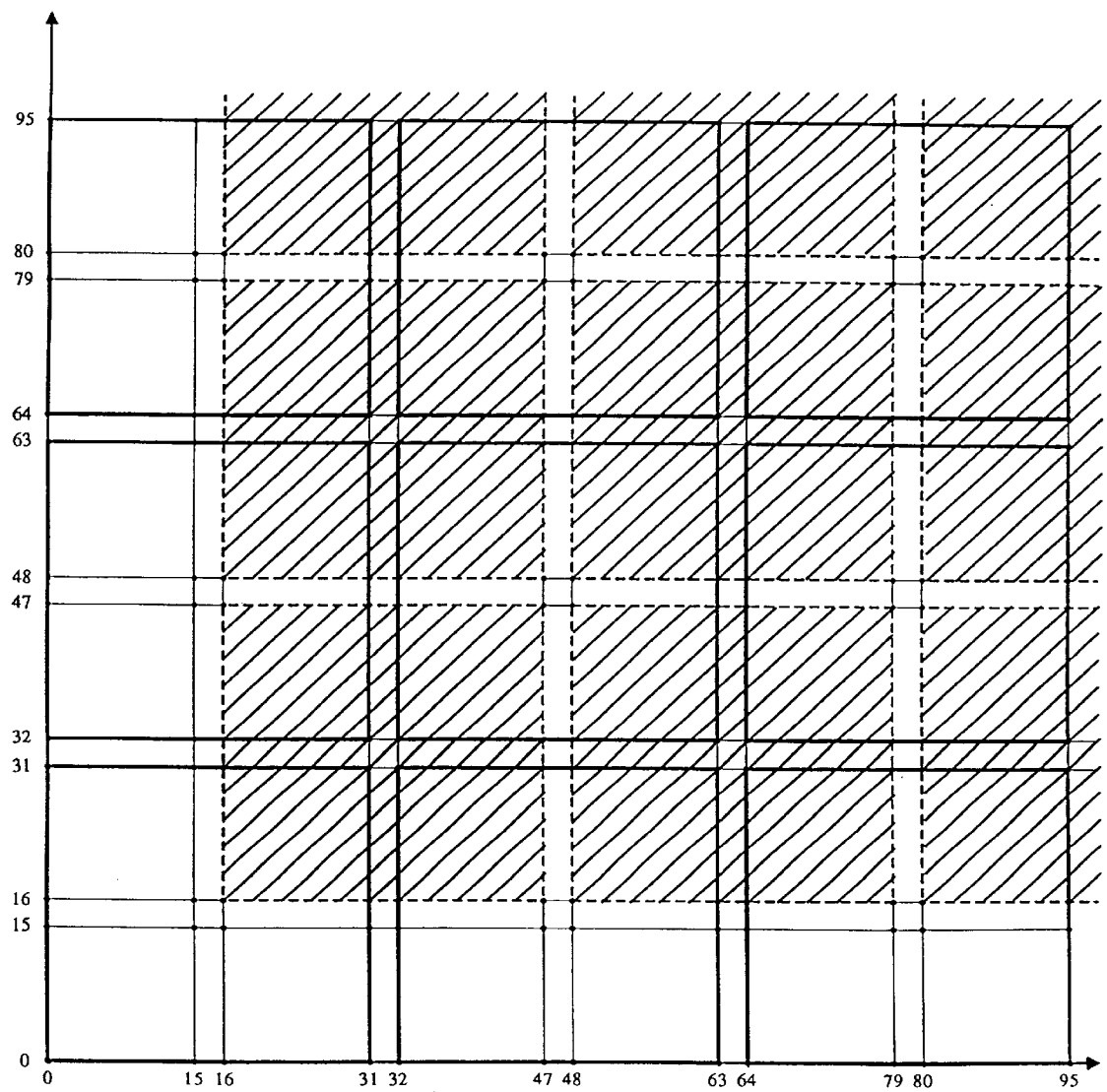
Figure 3:
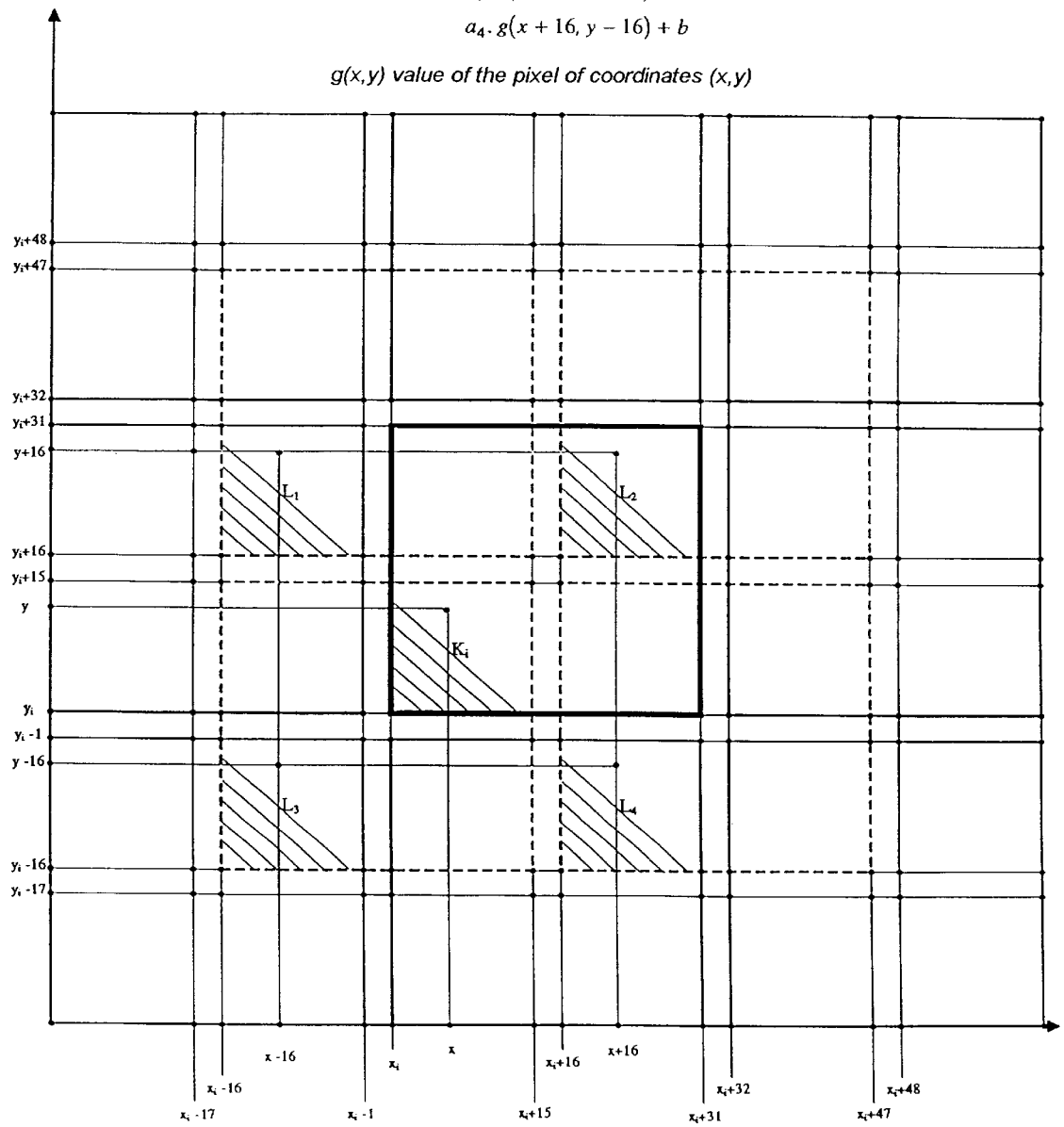
Figure 3A:
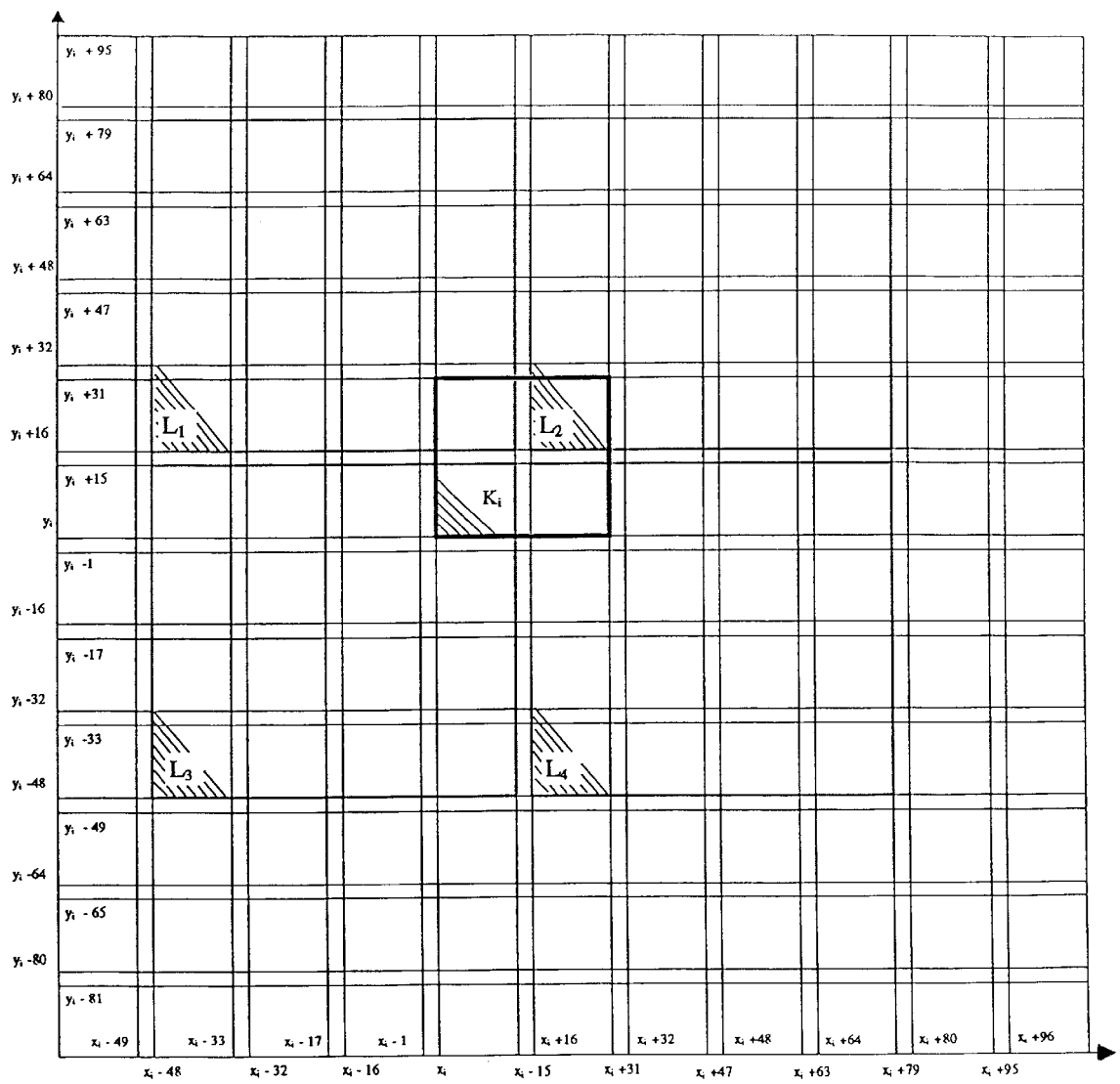
Figure 4:
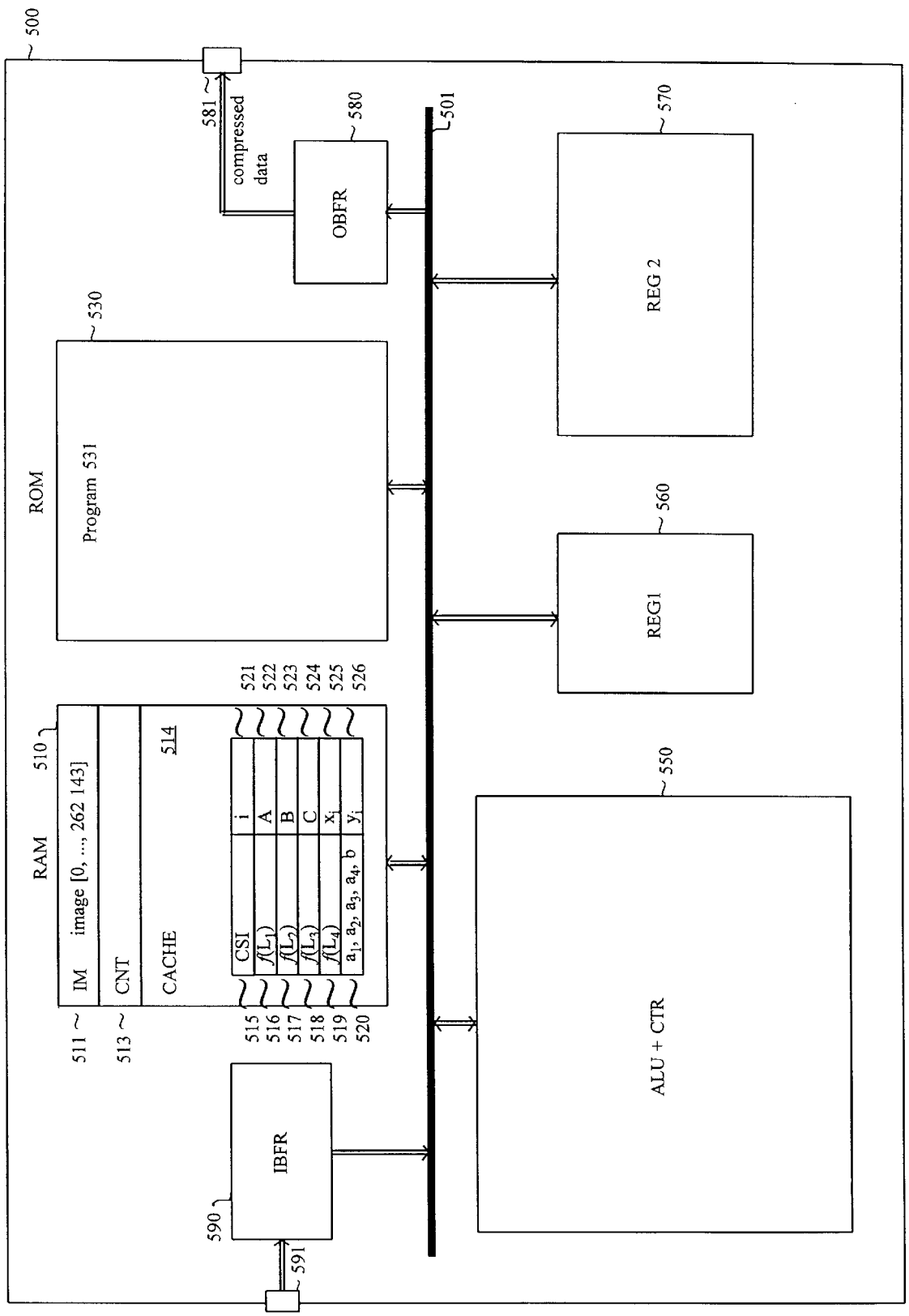
Figure 5:
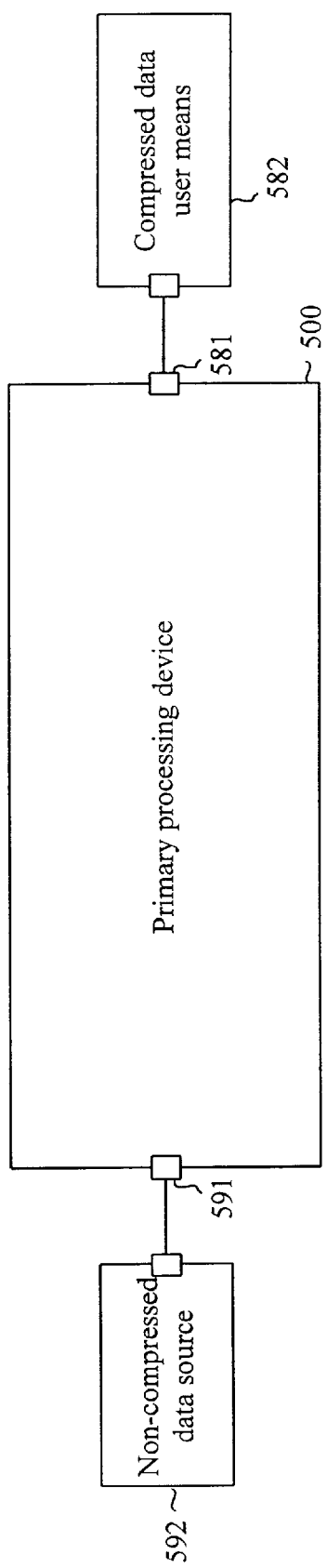
Figure 6:
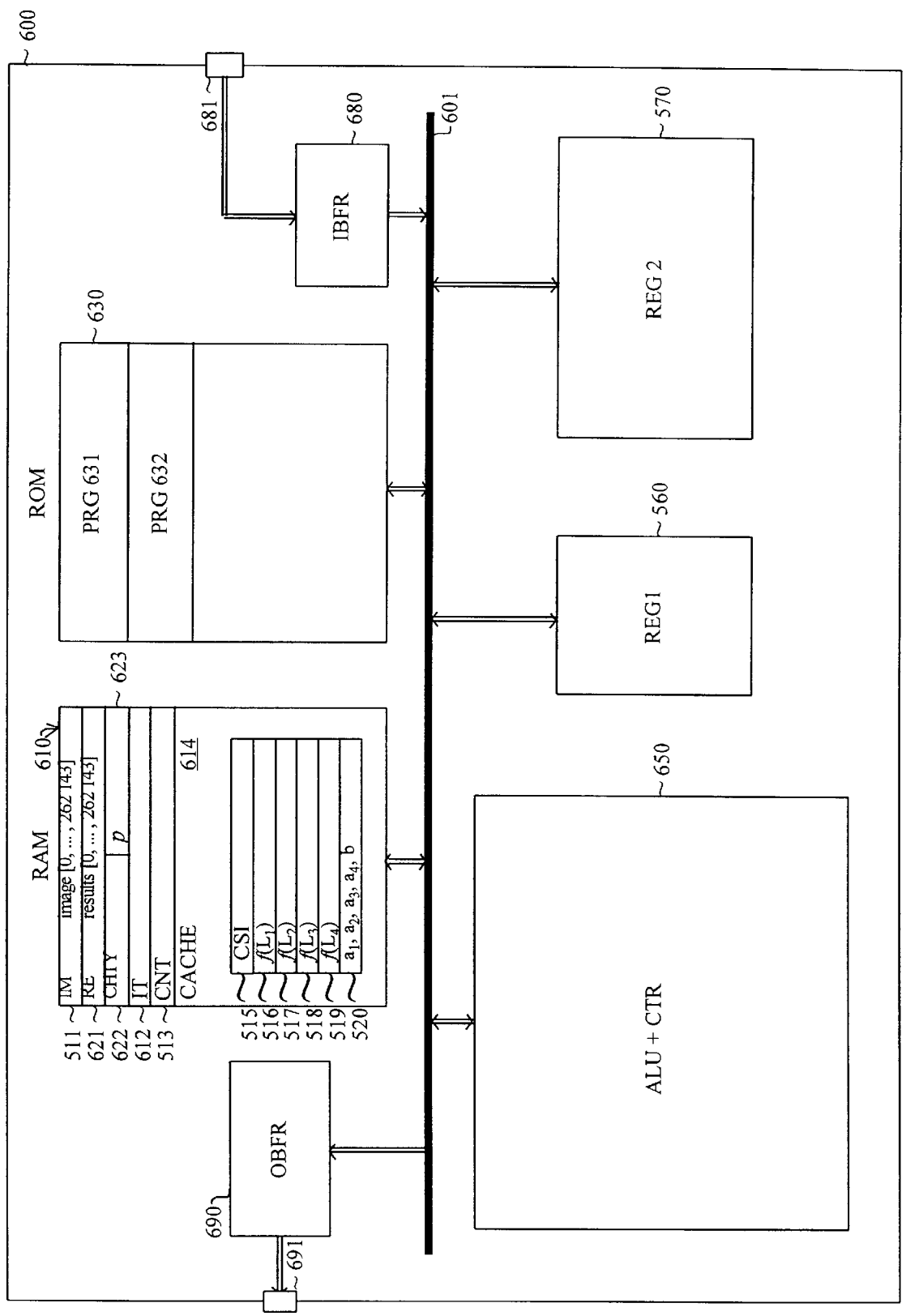
Figure 7:
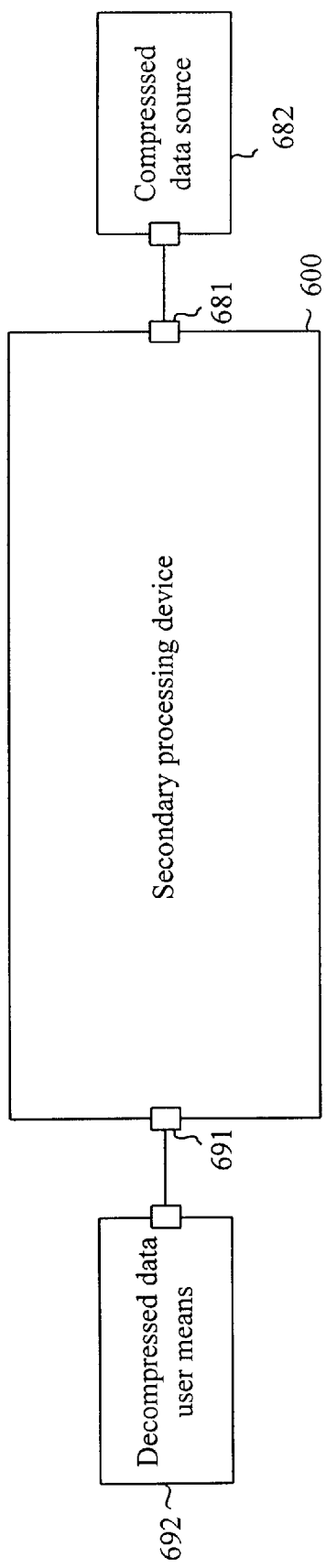
Figure 8:
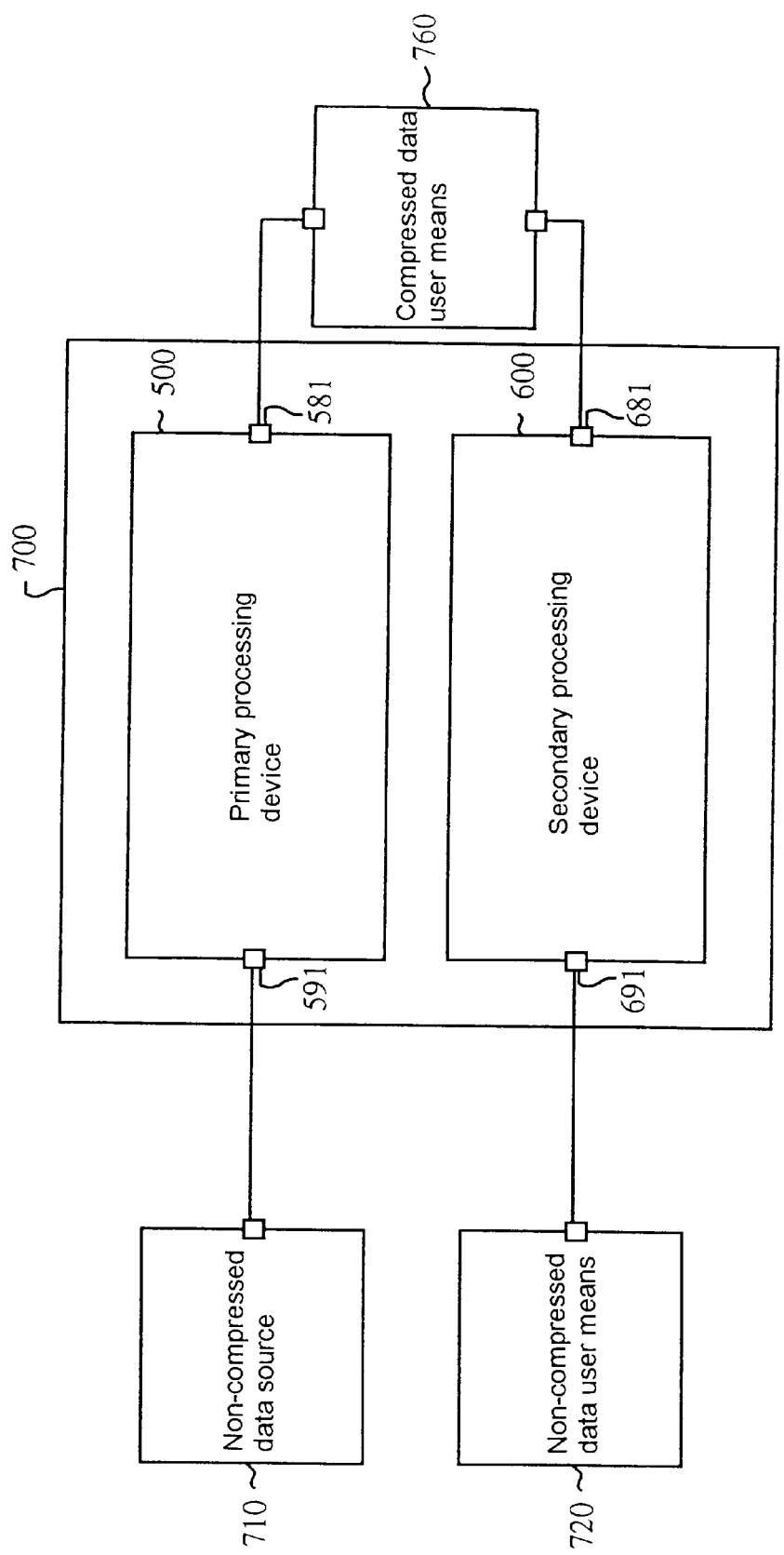
Figure 9:
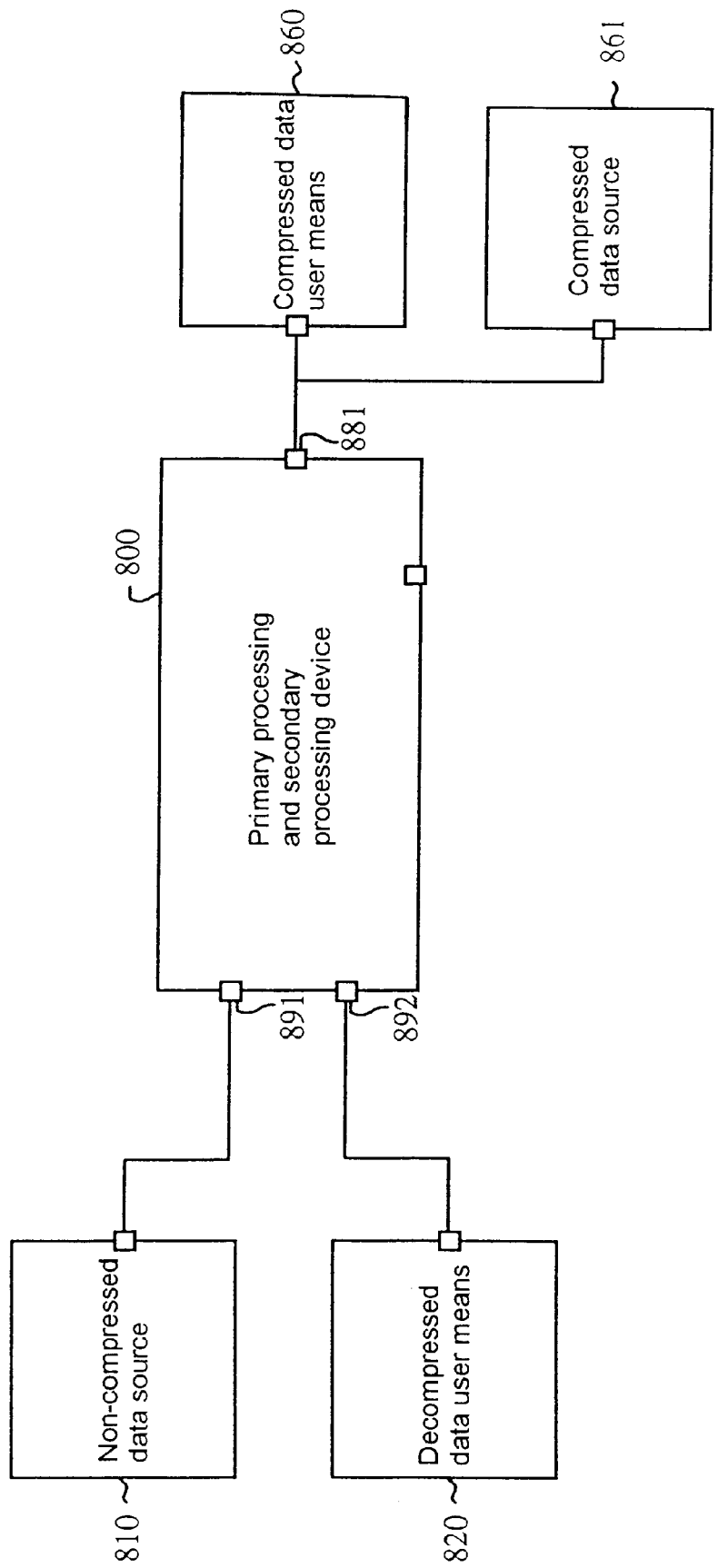
Figure 9A:
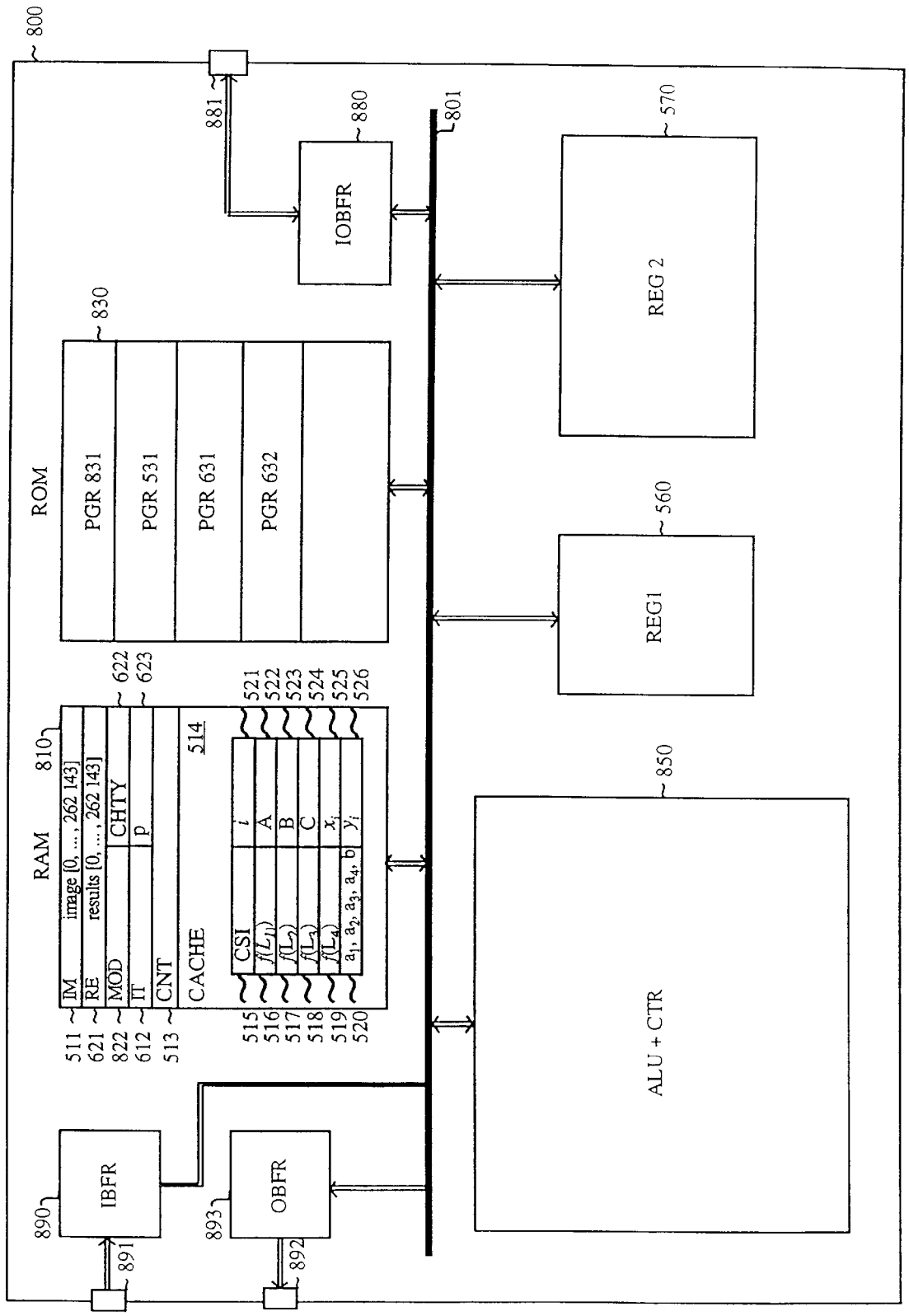
Figure 10:
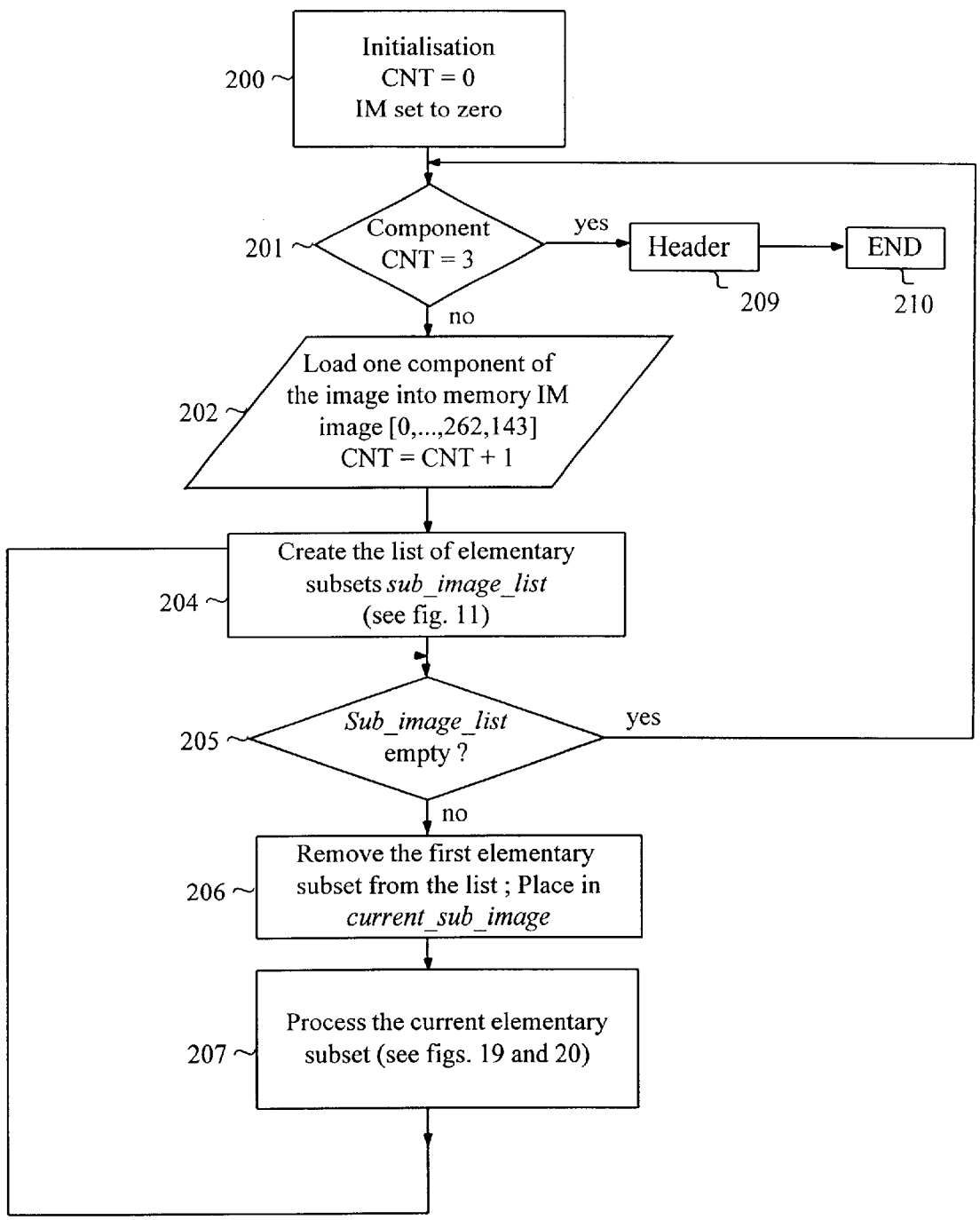
Figure 14:
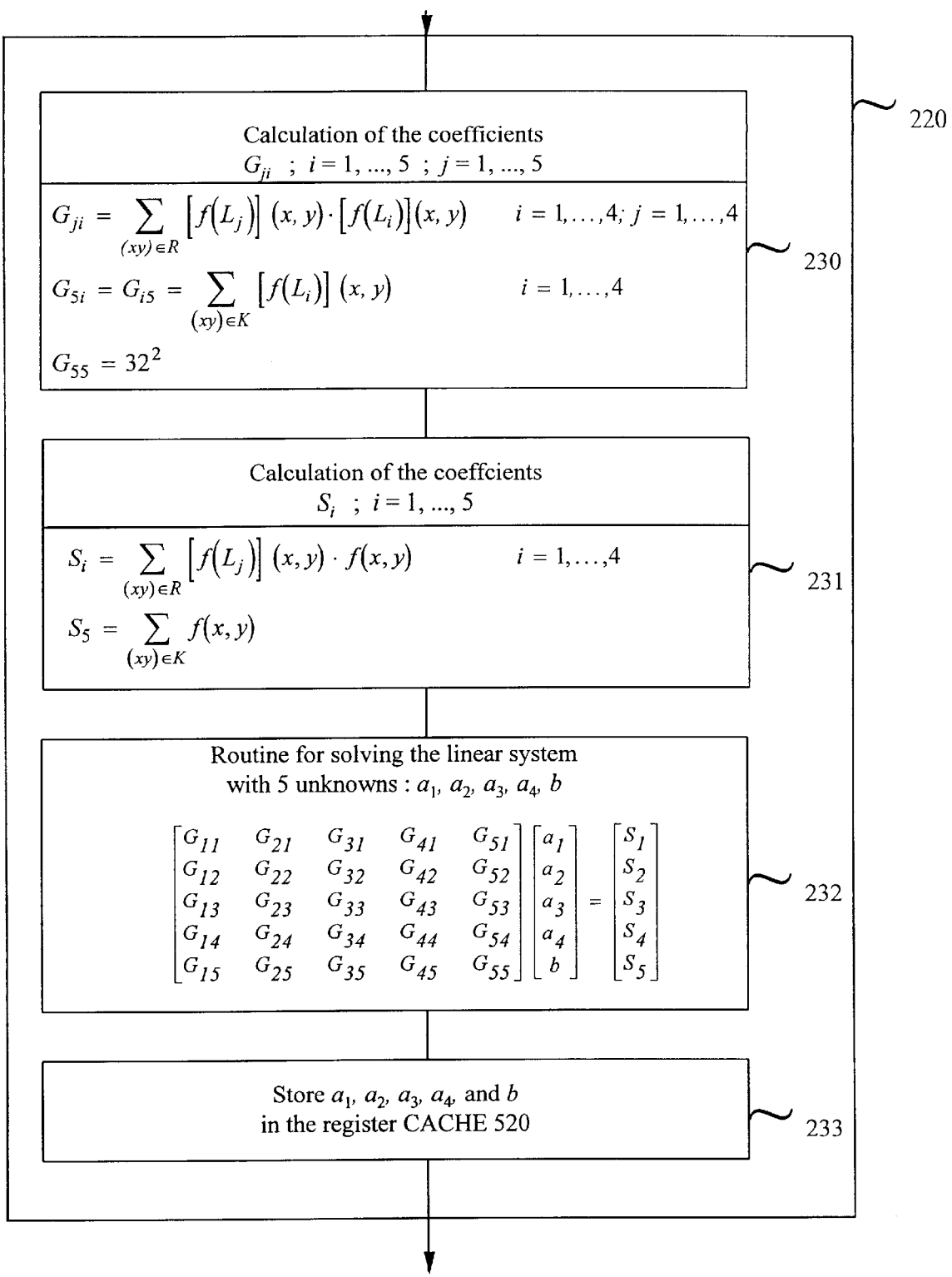
Figure 15:
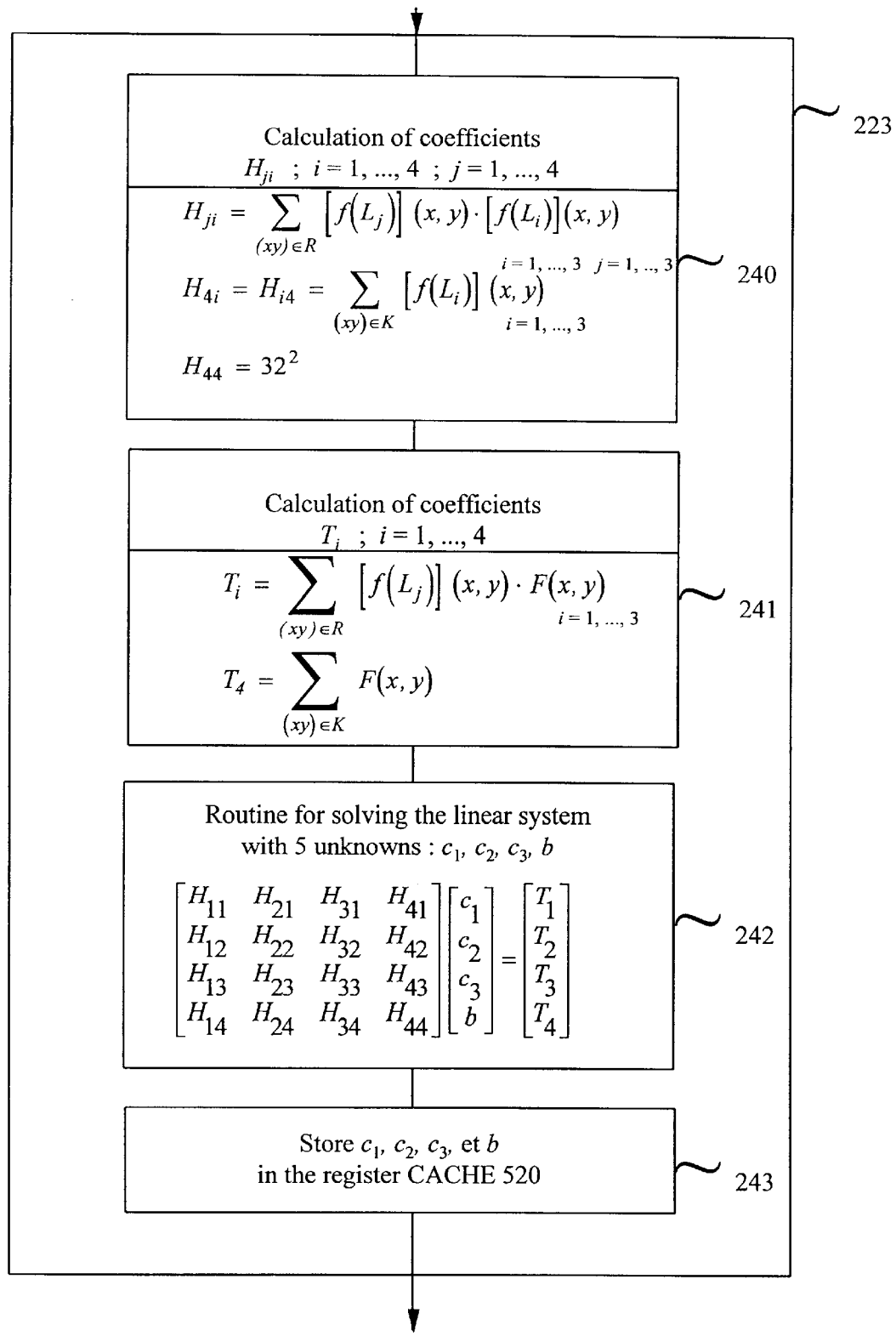
Figure 16:
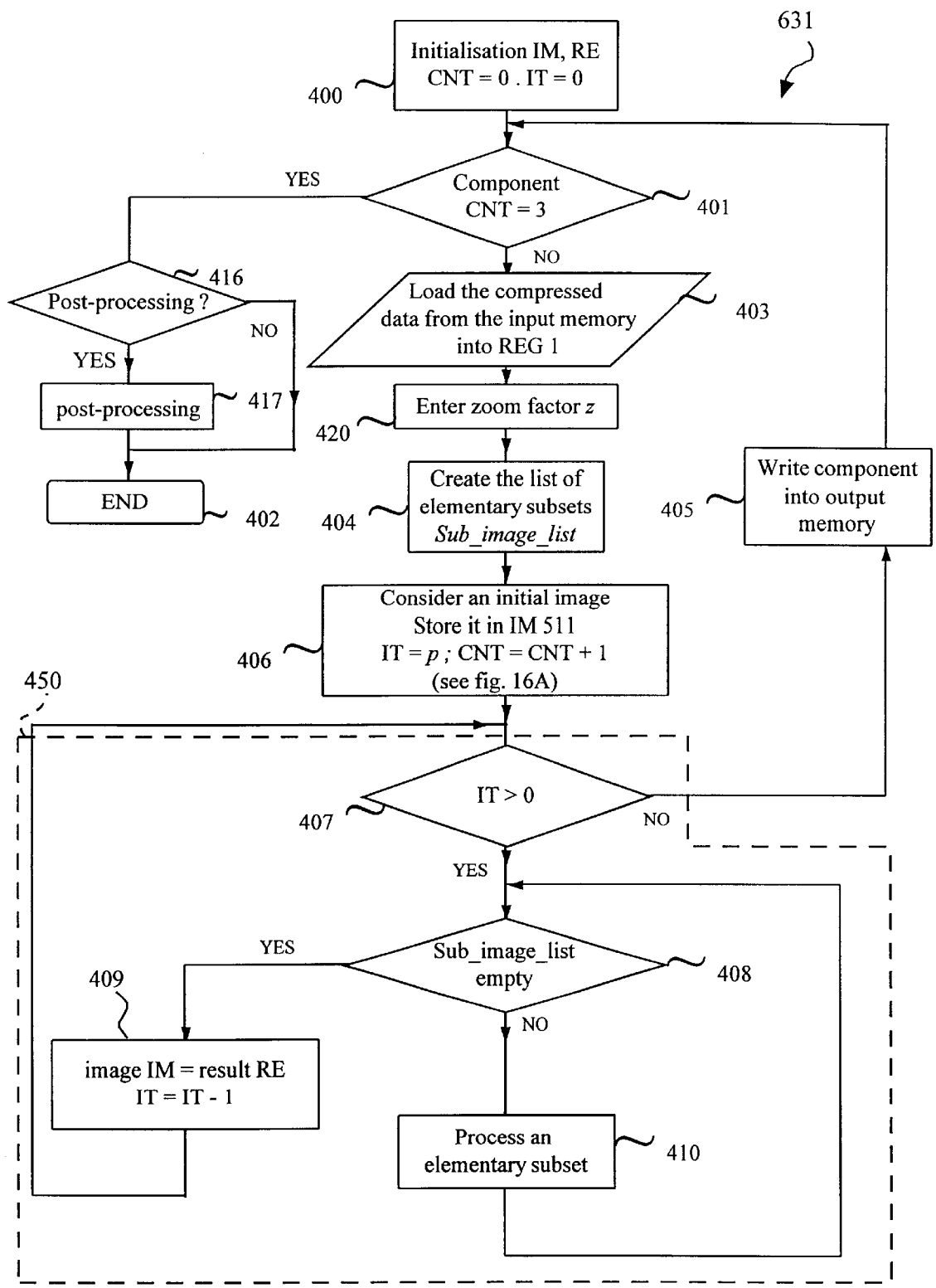
Figure 16A:
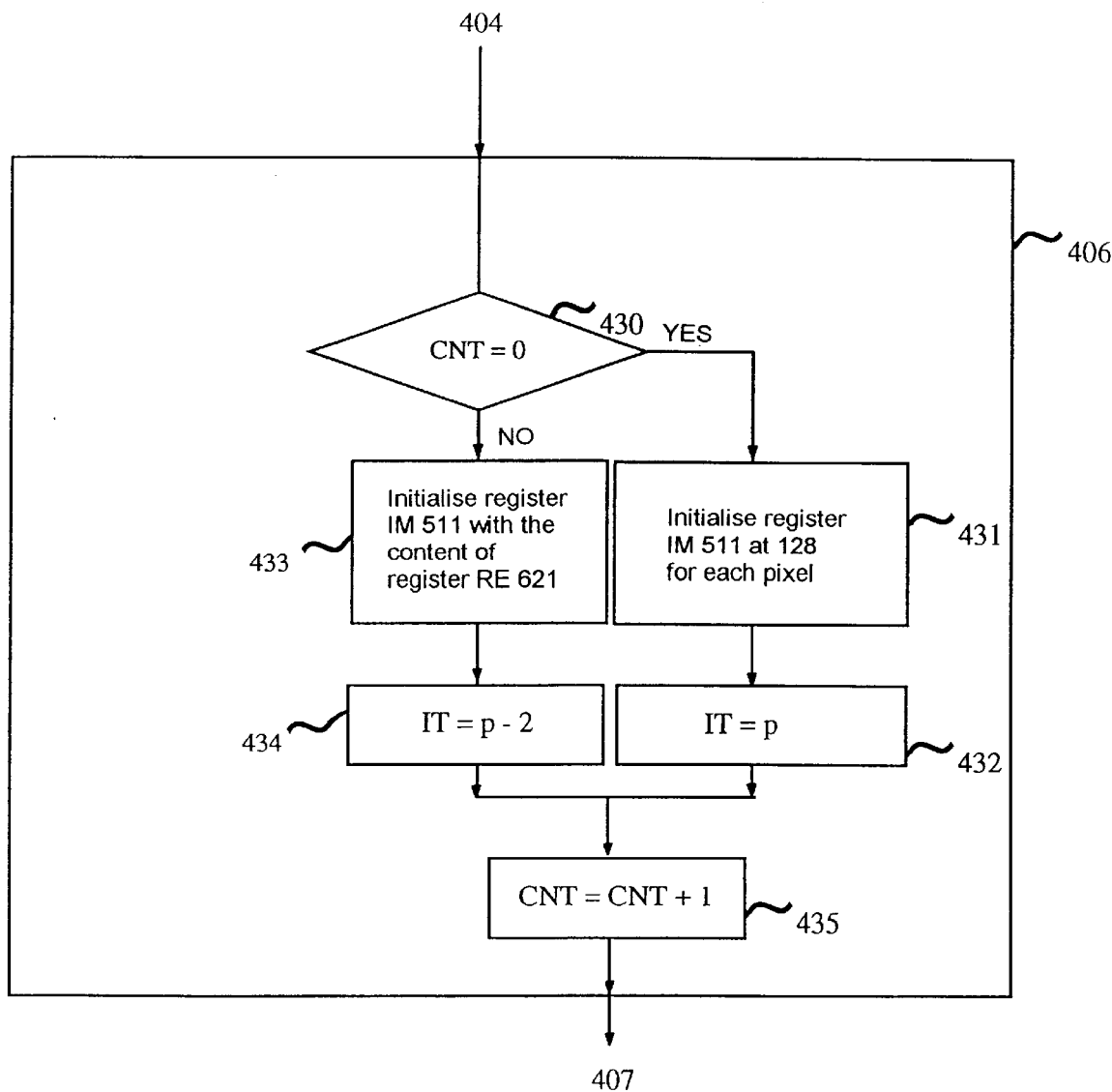
Figure 17:
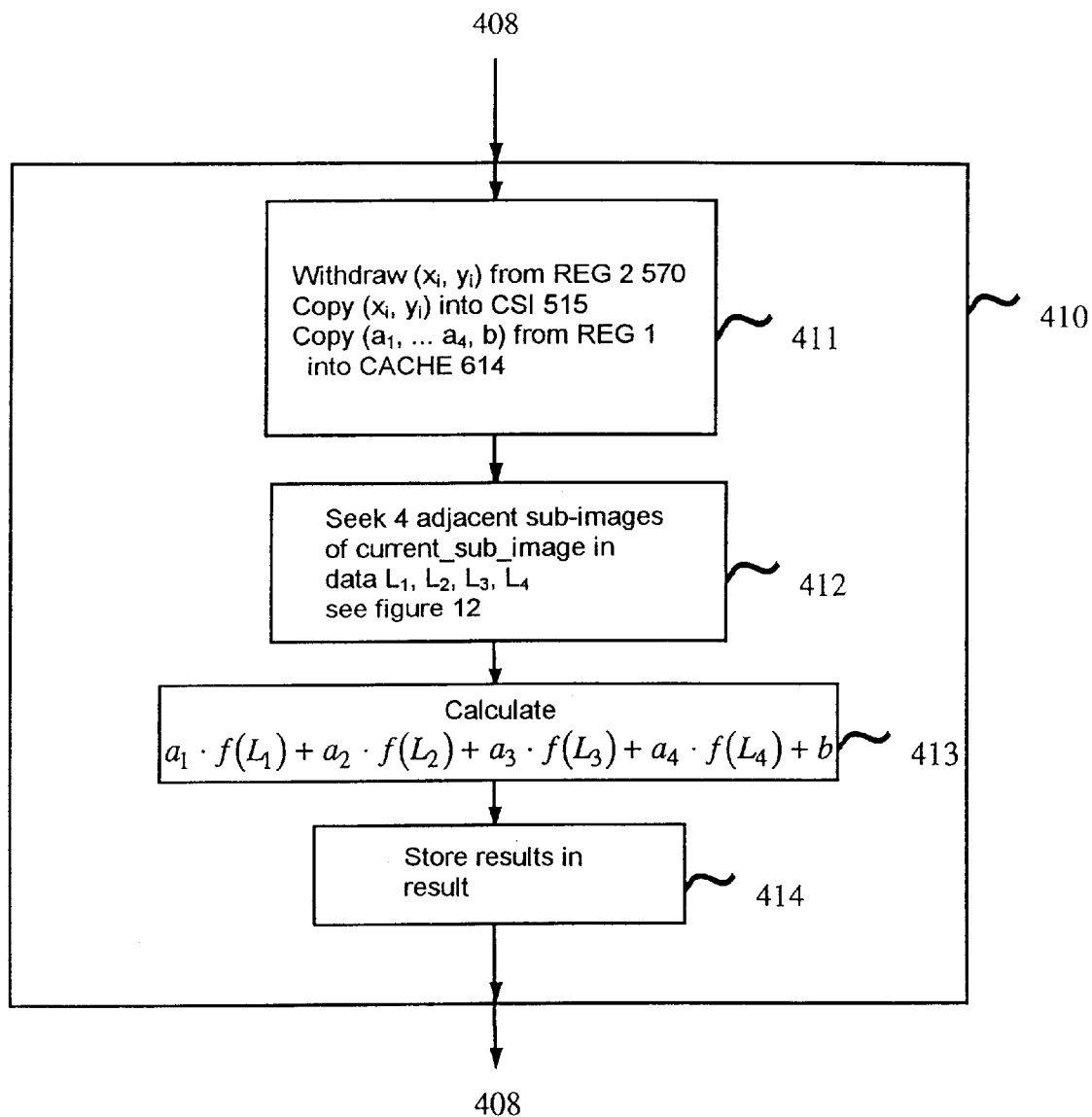
Figure 17A:
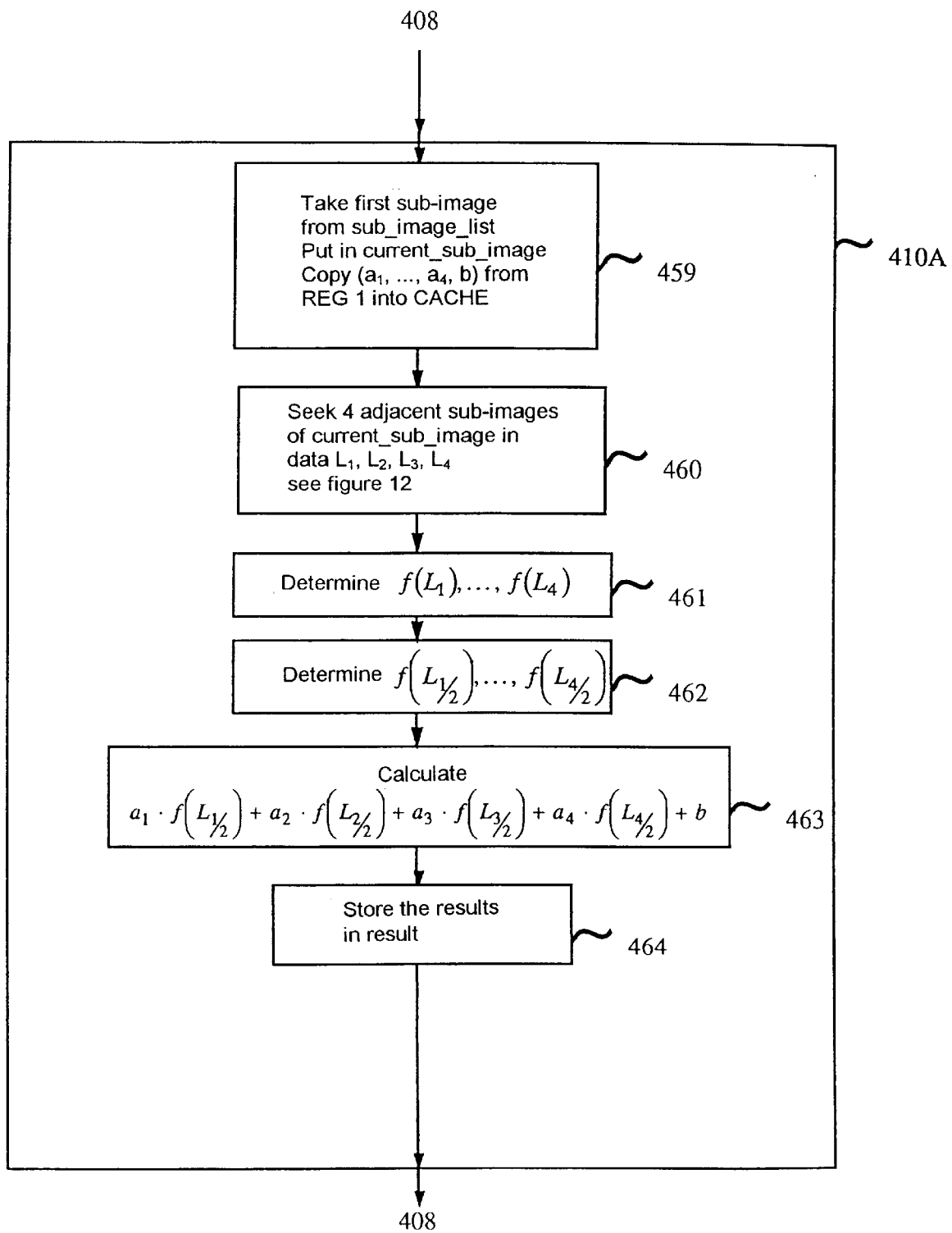
Figure 17B:
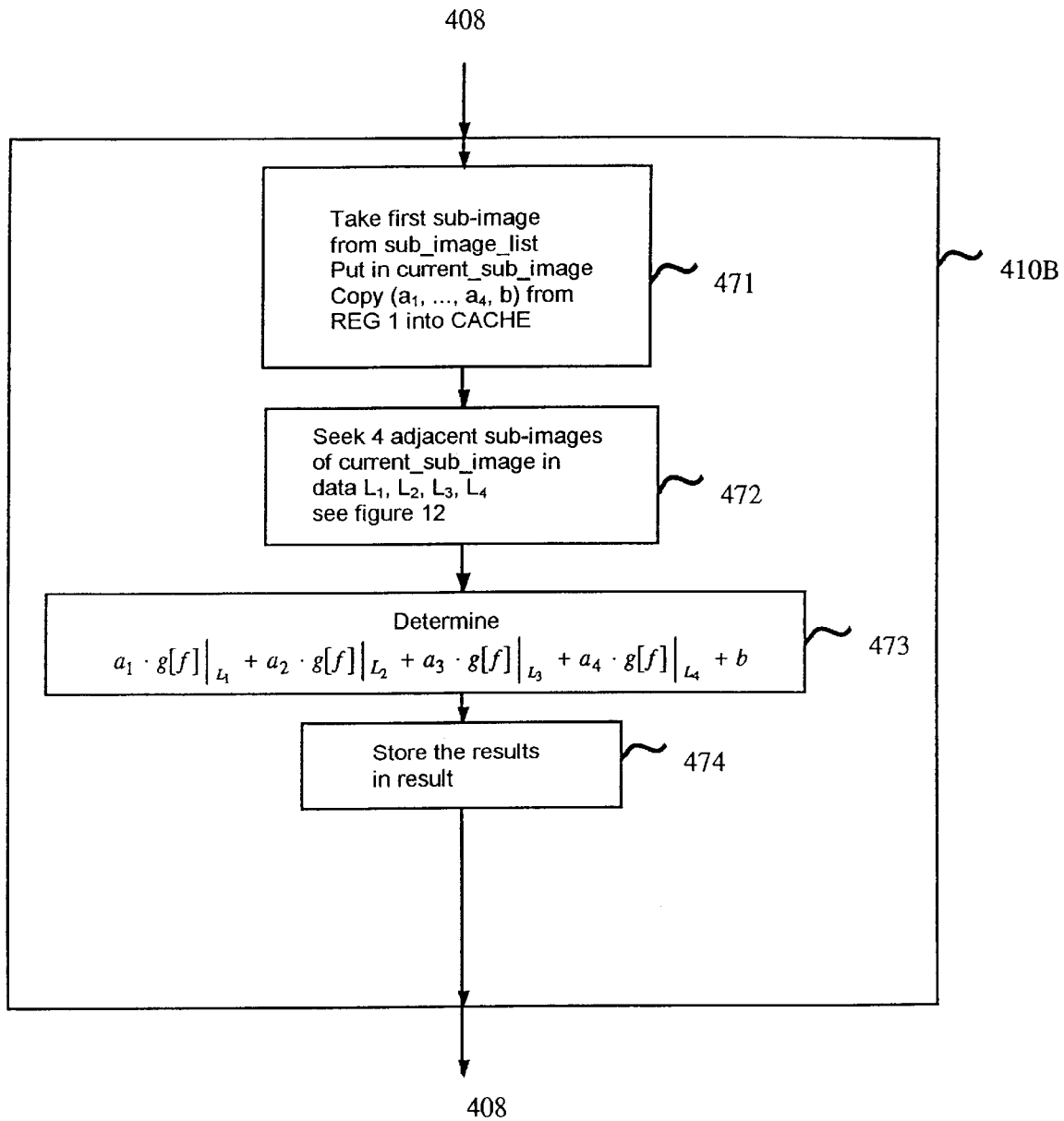
Figure 18:
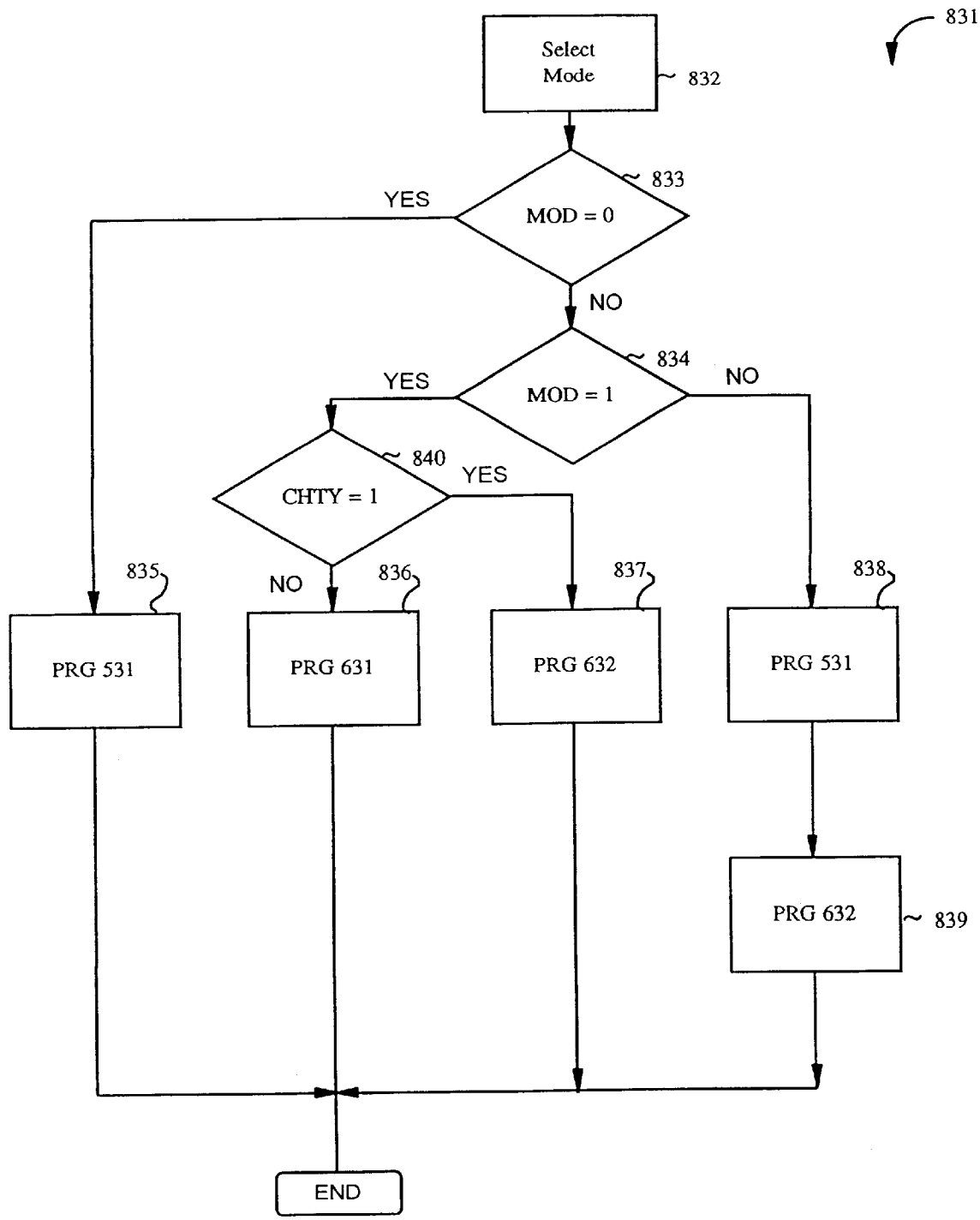
Figure 19:
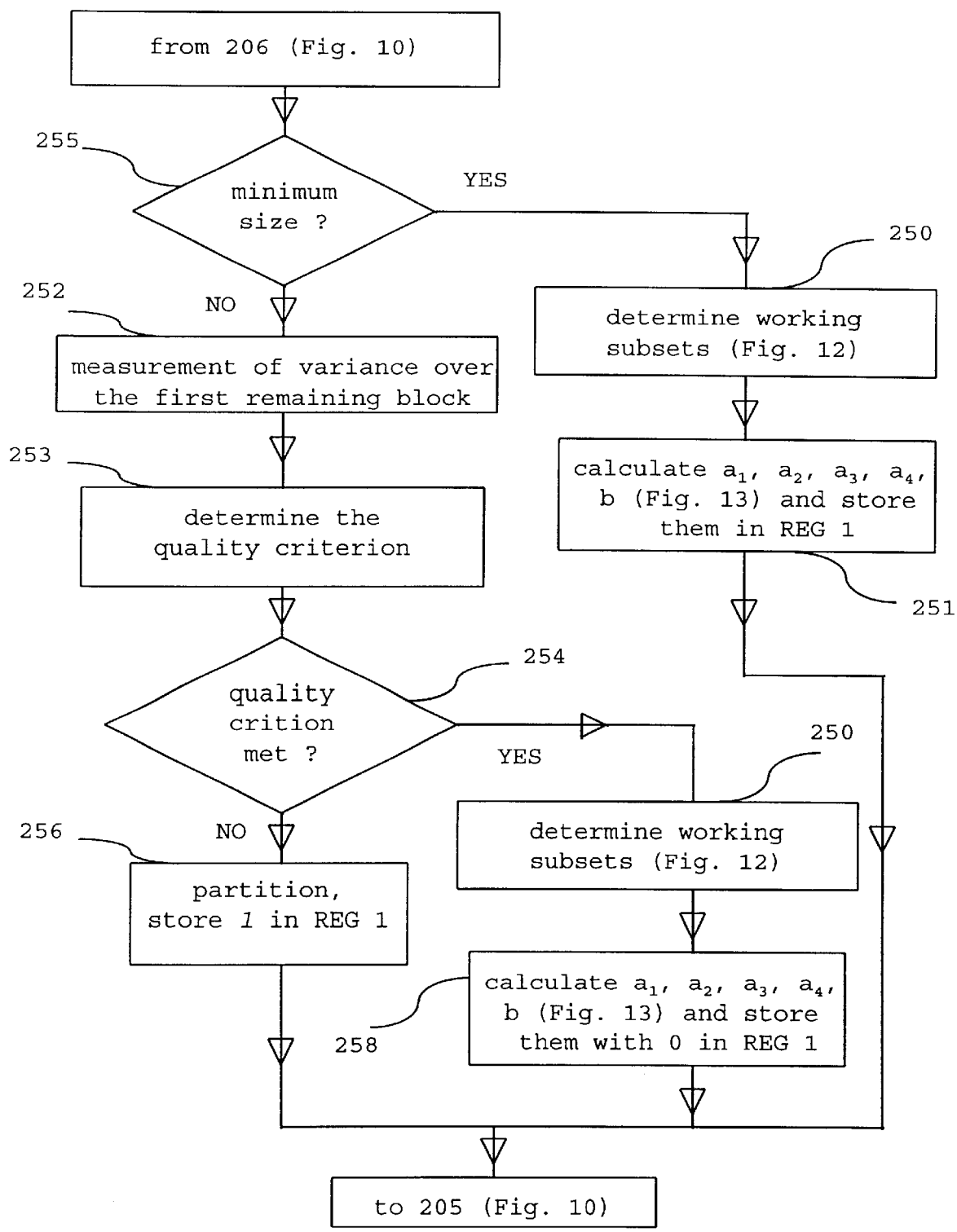
Figure 20:
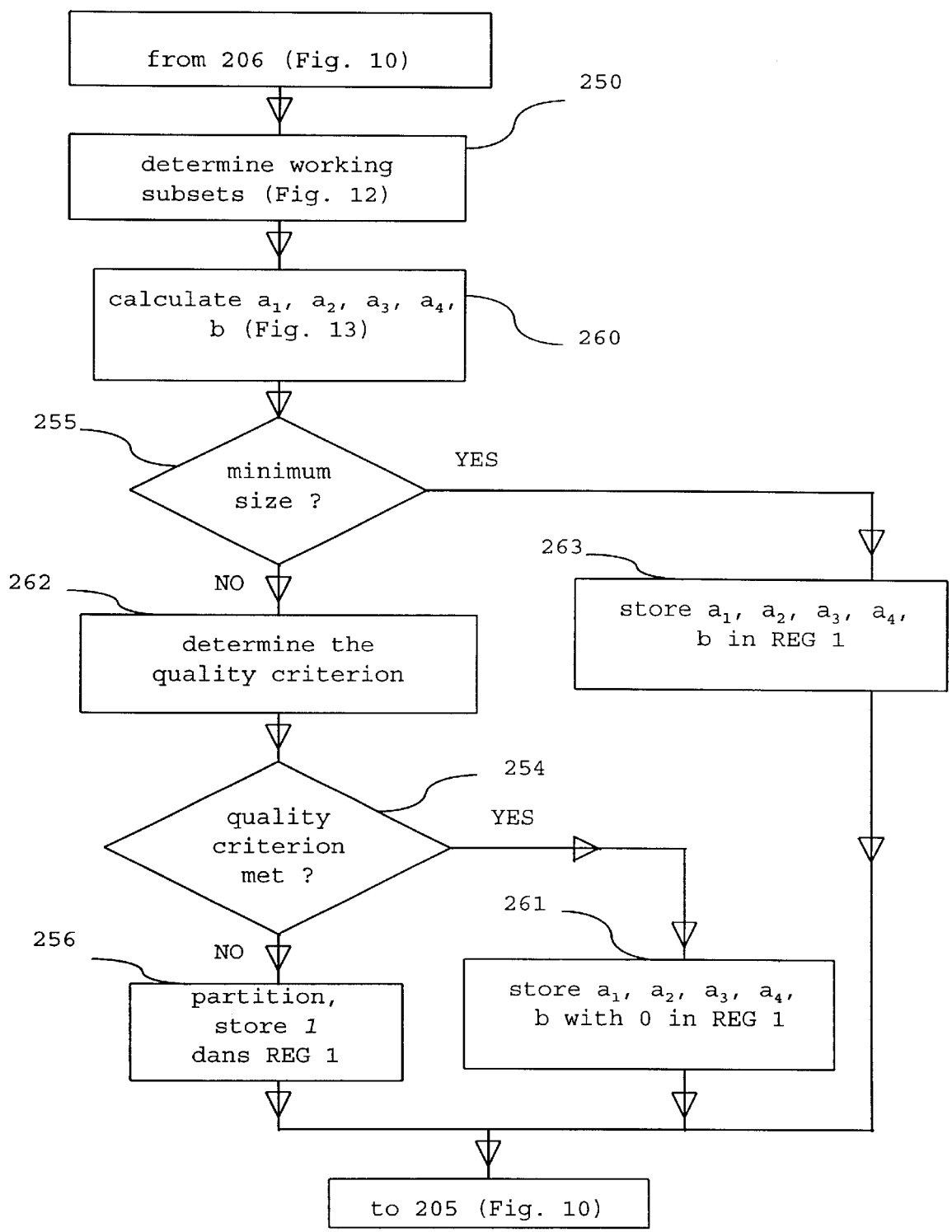

The characteristics, advantages and other objects of the invention will moreover emerge during the description of the accompanying drawings in which:

FIG. 1 illustrates schematically a partitioning of an image of 512×512 pixels into elementary subsets, composed of squares of 32×32 pixels, FIG. 2 illustrates schematically a division of an image of 512×512 pixels into a tiling, composed of squares of 32×32 pixels, displaced horizontally and vertically by 16 pixels, FIG. 3 illustrates schematically the organization of an elementary subset $K_i$ and its four working subsets $L_1$, $L_2$, $L_3$ and $L_4$, which, in a first embodiment of the invention, are of identical size to that of the elementary subset $K_i$ and displaced in both directions with respect to the said elementary subset, in a predetermined manner, FIG. 3A is similar to FIG. 3 and illustrates schematically a second, preferred, embodiment of the invention, in which the organization of an elementary subset $K_i$ and its four working subsets $L_1$, $L_2$, $L_3$ and $L_4$, each dimension of which is double that of the associated elementary subset $K_i$, and which is displaced in both directions with respect to the said elementary subset, in a predetermined manner, FIG. 4 is a simplified block diagram of a particular embodiment of the device for primary processing of a set of data, FIG. 5 is a schematic diagram of a device using the device of FIG. 4, FIG. 6 is a simplified block diagram of a particular embodiment of the device for secondary processing of a set of data, FIG. 7 is a schematic diagram of a device using the device of FIG. 6, FIG. 8 is a schematic diagram of a device for primary processing and secondary processing, FIG. 9 is a schematic diagram of another device for primary processing and secondary processing, FIG. 9A is a simplified block diagram of a particular embodiment of the processing device of FIG. 9, FIG. 10 is a simplified flow diagram of compression of a 512×512 pixel colour image used in the device of FIGS. 4, 9 and 9A, FIGS. 11, 12, 12A, 12B, 13, 14 and 15 are flow diagrams illustrating certain operations of the flow diagram of FIG. 10, FIG. 16 is a simplified flow diagram of decompression of a colour image used in the device of FIGS. 6, 9 and 9A, FIG. 16A is a flow diagram illustrating one operation from the flow diagram of FIG. 16, FIGS. 17, 17A and 17B are flow diagrams illustrating one operation from the flow diagram of FIG. 16, FIG. 18 is a flow diagram of a configuration program used in the device of FIG. 9A, FIGS. 19 and 20 are flow diagrams illustrating certain operations from the flow diagram of FIG. 10 and one of its variants, and FIG. 21A is a representation of a succession of partitionings of elementary subsets, FIG. 21B is a representation of the structure of partitioning information and parameters representing this succession of partitionings and FIG. 21C is a representation of the organization of the parameters and partitioning information resulting from the primary processing.

The present description is divided into five parts:

the first part relates to the general description of the method.

This part is divided into three sections:

the first section relates to the general theory at the root of the invention. Herein are explained the mathematical concepts which, generally speaking, underlie the invention as it may be understood in its most general terms;

the second section explains, notably with the help of FIGS. 1 to 3, certain particular characteristics of the first embodiment of the method allowing primary processing of the data of a 512×512 pixel image resulting in its compression. This section explains more particularly the structure of the multidimensional mapping chosen in this particular embodiment and the means making it possible to calculate the coefficients of this mapping.

the third section explains the particular characteristics of the first embodiment of the method for secondary representation of the data of the image, and notably the restoration of its data from the compressed data obtained at the conclusion of primary processing. This section explains more particularly the method of successive approximations used here to do this.

the second part relates to the description of a first embodiment of a processing device and is divided into six sections:

the first section relates to the description of a device for primary processing of a set of data, the second section relates to a device for secondary processing of a set of parameters resulting from the primary processing of initial data. Such a device makes it possible, for example, to restore the image compressed by the primary processing device, the third section relates to the description of a device incorporating both a primary processing device and a secondary processing device, the fourth section relates to the description of a particular flow diagram for compression of a 512×512 pixel colour image implemented in the logic means included in the primary processing device, the fifth section relates to the description of two embodiments of a decompression flow diagram implemented in the logic means included in the secondary processing device, and the sixth section relates to the description of the flow diagram of the configuration program of the device incorporating a primary processing device and a secondary processing device.

the third part relates to the description of the preferred embodiment, using working subsets having a size different from that of the corresponding elementary subset. In this part, only the modifications made to the embodiment described in the second part are described;

in the fourth part a variant embodiment is described, one of which uses a global contractive mapping composed of non-linear mappings. In this fourth part only the elements modified compared with those of the embodiment described in the second part are explained; and in the fifth part, a variant embodiment using a quality criterion measured using the global contractive mapping is described.

1. General description of the method

The method as implemented in the first embodiment of the present invention will now be described with the help of FIGS. 1 to 3. This description will be produced with the help of the aforementioned Figures and a certain number of mathematical concepts belonging, generally speaking, to the theory of analysis and more particularly to those of topology and functional analysis.

In this particular embodiment, it is proposed to compress the data relating to an image in order to end up with a "primary representation" of the image, and then to restore the initial data, that is to say carry out a "secondary representation" of the compressed data in order to obtain a set of data of the same type as the initial data with a predetermined maximum deviation between the data thus restored and the initial data.

In order to clarify ideas, a colour image of 512×512 pixels with three components, one of luminance and two of chrominance, each having 256 levels, is considered here. In general, such a colour image is captured in the form of three components relating to the three fundamental colours, red, green and blue, then converted, using conversion matrices well known to persons skilled in the art, into luminance and chrominance components.

This digital image requires 512×512×24 bits to be stored, that is, without data compression, 6 Mbits. In order to measure the deviation between the initial image and the restored image, the square root of the mean square deviation, averaged over all pixels and all components (conventionally denoted RMSE), is considered. The efficiency of a compression algorithm is expressed by the link between the compression ratio obtained for a given deviation (RMSE). The particular embodiment described here makes it possible to obtain the following efficiency:

TABLE 1

| Number of iterations to decompression | RMSE | bits/pixel |
|---|---|---|
| 5–7 | 7–15 | 0.75 |
| 5–8 | 5–10 | 1.50 |
| 6–8 | 4–8 | 2.25 |
| 7–9 | 3–7 | 3.00 |
| 7–10 | 2–5 | 4.50 |

General theory at the root of the invention

The representation of a set of data, themselves representing physical quantities, such as the data relating to the image described above, especially when it is wished to compress these data on the occasion of the said representation, may be analysed as an approximation of the set of data.

The invention originates in the revelation, by the inventors, of the fact that the fixed point theory can be used to carry out such an approximation.

It is considered that the approximation of a set of initial data is an operation consisting of searching, in a family of candidates for the representation, for the candidate(s) which minimise(s) a predetermined criterion. Most often, the criterion is expressed by a distance between two elements of a metric space, which can be expressed by the following equation:

$$d:(g, h)\epsilon E \times E \rightarrow d(g, h)\epsilon R^+ \quad (1)$$

where:

d is the distance function,

E is a metric space, $R^+$ is the set of positive real numbers or zero.

g, h are elements of the metric space E, that is to say of the space which contains all the mappings of a given definition domain $\Omega \subset R^q$ in a mapping domain $R^d$.

The data to be processed are mappings of $\Omega \subset R^q$ in $R^d$:

$$g:(x,y)\epsilon\Omega \subset R^q \rightarrow g(x,y)\epsilon R^d$$

where $R^q$ and $R^d$ are spaces produced from R of a given number (n or d) of dimensions. The set of data to be processed is a given metric space E.

It should be noted that for example in the context of a 512×512 colour image with 3×256 levels of each of the three components, the data of the initial image are constituted by a correspondence table which associates three positive values of the levels of the components of luminance, Y, red chrominance, Cr, and blue chrominance, Cb, between 0 and 255, with each pixel position (x,y) in the definition domain [0,511]×[0,511]. It may be seen that these data of the initial image in reality constitute a mapping f∈E of a domain of the space $R^2$ in a domain of the space $R^3$:

$$g:(x,y)\epsilon[0,511]\times[0,511] \subset R^2 \rightarrow [0,255]^3 \subset R^3$$

The problem of the approximation of a set of data to be processed f∈ E therefore consists of searching, in a family of candidates for the representation $G \subset E$, for the candidate(s) g* in G which minimize the distance (1). This is expressed by the following equation:

$$?g^*\epsilon G:d(f,g^*)=\inf\{d(f,g)|g\epsilon G\}.$$

The said candidates belong to the set:

$$P_G(f)=\{g^*\epsilon G|d(f,g^*)=\inf\{d(f,g)|g\epsilon G\}\}, \quad (2)$$

where:

$P_G$ is the metric projection operator, inf { . . . } is the largest minorant of the set under consideration { . . . }.

Subsequently, it is assumed that the metric space is complete, which guarantees the existence of a unique fixed point for each contraction of the metric space in itself.

The inventors have shown clearly that candidates for the representation may be defined as being fixed points relating to contractions, a family of contractions being jointly determined. Under these conditions, the search for the best approximation amounts to determining the fixed point relating to the contraction minimising the said predetermined error criterion in this family of contractions.

These conditions can be expressed thus:

$$?a^*\epsilon\breve{o}(X):d(f,a^*)\leq d(f,a), \forall a\epsilon\breve{o}(X) \quad (3)$$

where ŏ (X) is the extension to a subset of contractions X,(X⊂CON(E)) of the existing link between a contraction and its fixed point. This mathematical link can be expressed as follows:

$$\sigma:T\epsilon CON(E)\rightarrow t\epsilon E \quad (4)$$

where t is the fixed point of the contraction T (T(t)=t), CON(E) the set of contractions of E.

The approximation problem can, under these conditions, be reformulated as follows: it is a question of searching for the contraction of which the fixed point is the best approximation of the initial data.

It can be seen that by doing this the inventors have shifted the problem to be solved since it is now no longer a question of searching for a candidate in itself constituting a better approximation but a contraction of which the fixed point constitutes the best approximation.

This may be expressed by the inequality:

$$?T^* \epsilon X:d(f,\sigma(T^*))\leq d(f,\sigma(T))\forall T\epsilon X \quad (5)$$

where X is a subset of contractions of E (X⊂ CON(E)).

The inventors have thus revealed that, in accordance with the general method disclosed by themselves, the essential step for ending up at a representation of data to be processed, notably within the context of data compression, consists of:

composing a family of contractions capable of transforming the data, and selecting the parameters of one of the said contractions in order to satisfy one or more predetermined conditions, in the case in point to minimise the distance between the initial data and the fixed point constituting the best approximation of the said initial data.

It is a question here, in accordance with the invention, of a step of "constructing" the global contractive mapping.

Next, in accordance with the invention, the parameters thus determined must allow, for restoration of the initial set of data, the use of a method of successive approximations converging towards the fixed point of the said global contractive transform representing the said set of initial data, which makes it possible for the reasons explained above to restore, with the best approximation, the said set of data to be processed.

It can be seen that for implementation of the general method according to the invention, and notably in the step of constructing the global contractive mapping, persons skilled in the art have, in order to compose the family of contractions capable of transforming the data, a large range of choices of mathematical mappings in the group of mappings composed of multidimensional mappings and non-linear mappings. In the embodiment described below, the global contraction will be constructed in pieces, and for each piece a specific multidimensional linear mapping will be used. It could use other mappings, for example non-linear mappings. The general method, a particular embodiment of which will be described in detail below, thus allows very many possibilities for processing data, with a view to representing them.

The means used in the particular embodiment to construct the global contractive mapping will now be described.

The inventors have revealed the fact that in order to search for a contraction whose fixed point constitutes the best approximation of the initial data, it was necessary first of all to look for a candidate in itself constituting a good approximation, which constitutes a practical approach for solving such a problem.

The inventors have revealed that the said practical approach may consist of finding the contraction which minimises the distance between the initial and transformed data, taking into account an estimated contraction factor.

This reformulation of the problem to be solved can be expressed by the following main optimisation problem:

$$? \hat{T} \in X : d\left(f, \frac{\hat{T}(f)}{1-con(\hat{T})}\right) = \min\left\{d\left(f, \frac{T(f)}{1-con(T)}\right) \middle| T \in X\right\} \quad (6)$$

where con (T) is the contraction factor of the contractive mapping T.

As, in reality, it is sometimes difficult to find the said contraction factor of the global mapping, the inventors have found that, in these cases, a simplified optimisation problem may just be solved, in the terms of which it is necessary to find a global contraction which minimises the distance between the initial data and their transform. It can be seen, here, that the factor 1/1-con(T) is no longer taken into account.

This simplified optimisation problem is expressed as follows:

$$? \hat{T} \in X : d(f, \hat{T}(f)) = \min\{d(f, T(f)) | T \in X\}. \quad (7)$$

First method of primary processing of image data.

According to an important characteristic of one aspect of the invention as implemented here, the global contraction is constructed in pieces. To do this, a step of "partitioning" the set of data relating to the image is carried out, during which the said set is partitioned into m "elementary subsets".

In the particular embodiment which concerns image processing, generally speaking, the initial image is partitioned into m elementary sub-images, themselves also called "elementary subsets" for reasons of clarity of the description.

It may be recalled here that generally speaking a "partitioning" of the metric space $\Omega$ amounts to defining the set $\tau=\{K_i|K_i \subset \Omega, i=1, \ldots, m\}$ where $K_1, \ldots, K_m$ are subsets defined in the said metric space $\Omega$, having to meet the following four conditions:

1) the subsets $K_i$ must be closed, which is expressed by $K_i$=adh $K_i$, i=1, . . . ,m.

2) none of the subsets $K_i$ may have an empty interior, which is expressed by: int $K_i \neq \emptyset$, i=1, . . . ,m.

3) their union must produce the closure of the metric space $\Omega$ under consideration, which is expressed by:

$$adh\Omega = \bigcup_{i=1}^{m} K_i$$

4) the interiors of each subset $K_i$ must be disjoint in pairs, which is expressed by:

int $K_i \cap$ int $K_j = \emptyset, i, j=1, \ldots, m, i \neq j$.

It should also be noted here that the partitioning of an initial data item of a given type (g$\in$E) amounts, generally speaking, to defining a restriction $g|_{K_i}$ for each subset $K_i$ of the partitioning $\tau$.

This characteristic makes it possible, advantageously, to facilitate the work of constructing the global contraction, by reducing this work to that of finding elementary mathematical transformations each having the object of allowing the restoration of the elementary subset $K_i$. This is because, by definition, the data subsets have fewer data items than the initial set, and consequently it is substantially easier to find mathematical transformations making it possible to restore these data, it being specified again that the set of mathematical transformations must, at the level of the whole image, constitute a global contractive mapping.

Consequently, the global contractive mapping T is thus constructed in pieces, each piece being, in accordance with this aspect of the invention, a Lipschitz mapping.

Moreover it can be seen here that these elementary Lipschitz mappings are not necessarily contractive, and that at this level also, by virtue of the invention, persons skilled in the art have at their disposal a large range of mathematical mappings allowing them to process the data relating to the subsets.

It should be noted, however, that in certain cases it will not be necessary to carry out this partitioning, for example when the image gives rise to a simple geometrical structure.

According to the aspect of the invention described here, for each of the m elementary subsets ($K_1, \ldots, K_m$), n working subsets (n=4 in this embodiment) are considered. For each of the m elementary subsets produced during partitioning, the elementary Lipschitz mapping under consideration is constructed from these n working subsets.

So as to be able to consider the n working subsets linked to each of the m elementary subsets, a "division" of the set of initial data will be carried out.

This division L={$L_j|L_j \subset \Omega, j=1, \ldots, l$}, of the data set, which is defined in the metric space $\Omega$, must meet the following three conditions:

1) the subsets $L_j$ must be closed, which is expressed by:

$L_j$=adh $L_j, j=1, \ldots, l$

2) None of the subsets $Lj$ may have an empty interior, which is expressed: int $L_j \neq \emptyset, j=1, \ldots, l$.

3) Their union is included in the metric space $\Omega$, which is expressed by:

$$\bigcup_{j=1}^{l} L_j \subset \Omega$$

It may be observed at this stage that the division thus carried out encompasses, on the one hand, partitionings as defined above, but also encompasses, on the other hand, what will be called a "tiling" for which the subsets $L_j$ are capable of overlapping, which is expressed by the equation:

int $L_i \cap$ int $L_j \neq \emptyset, i, j=1, \ldots, l, i \neq j$.

In the first embodiment, the 512×512 pixel image is, according to an initial partitioning, partitioned into 256 square elementary subsets of 32×32 pixels (see FIG. 1).

As usual in the image processing field, the data are organised as follows:

the coordinate reference point (0,0) is constituted by the lower left point of the image;

the columns (x-axis) are numbered from left to right;

the lines (y-axis) are numbered from bottom to top.

FIG. 1 illustrates schematically on the y-axis the rank of certain lines of the image and on the x-axis the rank of certain columns. For reasons of clarity, the scale used on the x-axis and the y-axis is not uniform. In the lower left part of FIG. 1 the first 9 squares of 32×32 pixels are illustrated, so as to make the rows and columns constituting the boundary of the said squares stand out. The 32×32 pixel squares constitute an example of partitioning of the domain $\Omega=[0,511]\times[0,511]$ where the image under consideration is defined.

In the first embodiment, division of the 512×512 pixel image into working subsets is illustrated in FIG. 2. It is similar to the partitioning of FIG. 1, with the exception that the 32×32 pixel working subsets are displaced by 16 pixels in both directions, and in each direction of movement, with respect to the elementary subsets. In this Figure, which illustrates the lower left corner of the 512×512 pixel image, the elementary subsets resulting from partitioning are illustrated in thick lines while the working subsets resulting from division are illustrated in dotted lines and are hatched.

In FIG. 2, the working subsets touching the edges of the image have not been depicted. Many solutions exist for supplying each elementary subset which is not associated with working subsets wholly inside the initial image, with substitution working subsets.

It should be noted here that, in all the remainder of the description, the choice of such a solution is applied just as easily to the working subsets for primary processing, for secondary processing and for complex processing: the points of the working subsets defined above which do not belong to the image, that is to say those of which at least one of the coordinates is negative, artificially have a mean value associated, for example 127 for the luminance component and any chrominance components.

FIG. 3 illustrates how, in this first embodiment, each working subset $L_j$ is linked to a given elementary subset $K_i$. The elementary subset $K_i$ having $(x_i,y_i)$ for coordinates is illustrated in thick lines, while the corresponding working subsets are illustrated in dotted lines, the other subsets being outlined in thin lines. It may be observed, in this first embodiment, that four working subsets $L_j$ (numbered $L_1, \ldots, L_4$), displaced by 16 pixels in both directions, are linked to each subset $K_i$. In reality it is the four subsets resulting from division which cover the elementary subset under consideration (resulting from partitioning). The expressions below show the coordinates of a subset $K_i$ and the working subsets $L_1, \ldots, L_4$.

$K_i$: $[x_i, x_i+31] \times [y_i, y_i+31]$ $L_1$: $[x_i-16, x_i+15] \times [y_i+16, y_i+47]$ $L_2$: $[x_i+16, x_i+47] \times [y_i+16, y_i+47]$ $L_3$: $[x_i-16, x_i+15] \times [y_i-16, y_i+15]$ $L_4$: $[x_i+16, x_i+47] \times [y_i-16, y_i+15]$ It should be noted that, in this first embodiment, the subsets resulting from division have the same dimensions as those resulting from partitioning; moreover, in this first embodiment, division of the image into working subsets does not constitute a tiling but a simple partitioning because of the fact that the working subsets have an identical size to the subsets and that the displacement between a working subset and the corresponding elementary subset is equal to one half side of the square subsets under consideration.

Below, in particular with the help of FIG. 3A, a second, preferred embodiment will be described, in which, in accordance with another aspect of the invention, the working subsets have a size different from that of the elementary subset to which they correspond, division of the image thus resulting in a tiling.

The global mapping used in the particular embodiment described with the help of FIGS. 2 and 3 will now be defined.

It should be recalled first of all that the global contractive mapping consists of taking an element g of the metric space E in order to transform it into an element T(g) of the same metric space E which is expressed by $$T: g \epsilon E \to T(g) \epsilon E \qquad (8)$$

Membership of g to the space E (g∈E) can also be expressed as follows:

$$g: (x,y) \epsilon \Omega \subset \mathbf{R}^q \to g(x,y) \epsilon \mathbf{R}^d \qquad (9)$$

It may be noted in effect that equation (9) only helps to explain the type of special data under consideration: each pair of values (x,y) taken in the definition domain (in the case in point the plane image $\Omega \subset \mathbf{R}^2$) has a corresponding value in the mapping domain $\mathbf{R}^d$, that is to say three values amongst 256 levels of the three components, Y, Cr and Cb. Moreover it should be noted that as regards image processing, the definition domain is $\mathbf{R}^2$, while the mapping domain is $\mathbf{R}^3$ since the colour image has three components, one of luminance and two of chrominance.

In the particular embodiment of FIGS. 2 and 3 described below and in accordance with another aspect of the invention, each "piece" of the global contractive mapping, that is to say a Lipschitz elementary mapping, is a multi-linear mapping of the type:

$$T(g)|_{Ki} : (x,y) \in Ki \to [T(g)](x,y) = \sum_{j=1}^{n} a_j \cdot g|_{Lj}(x,y) + b \qquad (10)$$

where:

| | |
|---|---|
| $T(g)|_{Ki}$ | the restriction of T(g) to the elementary subset $K_i$ |
| n > 1 | the dimension of the multilinear mapping |
| $a_1, \ldots a_n$ | the multiplying coefficients |
| b | the translation factor |
| $L_1, \ldots L_n$ | the working subsets, with predetermined position with respect to $K_i$ and linked to this subset. |

Thus in the example of FIG. 3, the values g (x,y) of the pixels with coordinates (x,y), are transformed as follows:

$$[T(g)](x,y) = a_1 \cdot g(x-16, y+16) + a_2 \cdot g(x+16, y+16) + a_3 \cdot g(x-16, y-16) + a_4 \cdot g(x+16, y-16) + b \qquad (10a)$$

where:

| | |
|---|---|
| g (x,y) | is the value of the pixel (x,y) in the image g |
| (x,y) | is a pixel of the elementary subset $K_i$. |
| g (x − 16, y + 16) | is the value of the corresponding pixel in the working subset $L_1$ |
| g (x + 16, y + 16) | is the value of the corresponding pixel in the working subset $L_2$ |
| g (x − 16, y − 16) | is the value of the corresponding pixel in the working subset $L_3$ |
| g (x + 16, y − 16) | is the value of the corresponding pixel in the working subset $L_4$ |
| $a_1, \ldots, a_4$ | the multiplying coefficients |
| b | the translation factor. |

It can be seen that equations (10) and (10a) above are by nature linear and multidimensional, that is to say multilinear, the coefficients $a_j$ for $j=1,\ldots,n$ and b being respectively the multiplying coefficients and the translation factor. The coefficients $(a_1,\ldots,a_n,b)$ are here the "parameters", within the meaning of the invention, of the elementary mapping relating to the subset $K_i$. The set of coefficients $(a_1,\ldots,a_n,b)_{K_i}$ relating to the m elementary subsets $(K_1,\ldots,K_m)$ constitutes, in this embodiment, "the set of parameters" of the global contractive mapping, within the meaning of the invention.

It should be stated that in the particular embodiment n=4, which means that only four working subsets $L_j$, $j=1,\ldots,n$ such as those defined with the help of FIG. 3, are linked to each elementary subset $K_i$.

Thus a value calculated from the multilinear equation (10) is associated with each pair of values (x,y) of a determined elementary subset $K_i$, (see the example of FIG. 3 and equation 10a). This is carried out for all m elementary subsets $(K_1,\ldots,K_m)$.

It will now be explained how the coefficients of the multilinear mapping $a_j$, $j=1,\ldots,n$ and b are determined for each elementary working subset $K_i$.

In order to solve the simplified optimisation problem (7) it is necessary, generally speaking, for each elementary subset $K_i$, to minimise the distance between the restriction to the elementary subset $K_i$ and its transform by the global contractive mapping. In other words, it is necessary to minimise the distances:

$$d(f|_{Ki}, T(f)|_{Ki}), i=1,\ldots m \quad (11)$$

In the particular embodiment, use is made of a method of minimisation of least squares in the presence of constraints, where the quantity to be minimized is the distance defined in equation (11) and is expressed in the form:

$$[d(f|_{Ki}, T(f)|_{Ki})]^2 = \sum_{(x,y)\in Ki} (f(x,y) - [T(f)](x,y))^2 \quad (12)$$

$$|a_i|<\beta, i=1,\ldots,n \quad (13)$$

where $\beta<1/n$.

By minimizing the expression (12) under the constraints (13), each restriction of T(f) to $K_i$ is determined, and at the same time the coefficients $a_j$ and b of equation (10).

The coefficients $a_j$, b associated with each of the subsets $K_i$ constitute the primary representation of the set of initial data.

The minimisation problem according to equations (10) and (12) under the constraints (13), in order to determine the coefficients $(a_1,\ldots,a_n, b)$ for each $K_i$: $i=1,\ldots,m$, will be detailed below.

For each elementary subset, the target function $\phi_{K_i}: \mathbb{R}^{n+1} \to \mathbb{R}$ will be considered, defined as follows:

$$\phi_{Ki}(a_1,\ldots,a_n,b) = \sum_{(x,y)\in K_i} \left(f(x,y) - \left[\sum_{j=1}^{n} a_j \cdot f|_{L_j}(x,y) + b\right]\right)^2. \quad (14)$$

The problem of minimisation under constraints therefore amounts to searching for the (n+1) values $(a_1^*,\ldots,a_n^*,b^*)$ $\in C \subset \mathbb{R}^n$ which satisfy:

$$\phi_{K_i}(a_1^*,\ldots,a_n^*,b^*)=\min\{\phi_{K_i}(a_1,\ldots,a_n,b)|(a_1,\ldots,a_n,b) \in C\}, \quad (15)$$

where $$C=\{(a_1,\ldots,a_n,b)|\mathbb{R}^{n+1}|-\beta<a_i<\beta; i=1,\ldots,n\}.$$

It should be stated first of all that resolution of a problem of minimisation without constraints is well known to persons skilled in the art. In this case it is a question of minimizing in general a target function of the type:

$$\Psi(c_1,\ldots,c_m) = \sum_{(x,y)\in K} \left(F(x,y) - \left[\sum_{j=1}^{m-1} c_j \cdot g_j(x,y) + c_m\right]\right)^2, \quad (16)$$

where m is the number of parameters of the target function and when $(c_1,\ldots,c_m)$ covers the whole space $\mathbb{R}^m$. The vector $(c_1^*,\ldots,c_m^*)$ sought satisfies:

$$\Psi(c_1^*,\ldots,c_m^*)=\min\{\Psi(c_1,\ldots,c_m)|(c_1,\ldots,c_m) \in \mathbb{R}^m\}.$$

This vector $(c_1^*,\ldots,c_m^*)$ is characterized by Euler's equation:

$$\Psi'(c_1^*,\ldots,c_m^*)=0, \quad (17)$$

where $\Psi'(c_1^*,\ldots,c_m^*)$ is the derivative of $\Psi$ (in the sense of Fréchet). This is a linear and continuous mapping of $\mathbb{R}^m$ à $\mathbb{R}$.

This last equation is replaced here by the partial derivatives of $\Psi$ at the point $(c_1^*,\ldots,c_m^*)$, with respect to each variable. It is therefore obtained that $(c_1^*,\ldots,c_m^*)$ is characterized by:

$$\left.\begin{aligned}\partial_1 \Psi(c_1^*,\ldots,c_m^*) &= 0, \\ &\vdots \\ \partial_m \Psi(c_1^*,\ldots,c_m^*) &= 0.\end{aligned}\right\} \quad (18)$$

Taking into account the particular form of the functional (16), the equations (18) are equivalent to:

$$\sum_{j=1}^{m} c_j^* \cdot G_{ji} = S_i; \quad i=1,\ldots,m, \quad (19)$$

where $$G_{ji} = \sum_{(x,y)\in K} g_j(xy) \cdot g_i(xy), \quad \begin{cases} j=1,\ldots,m-1, \\ i=1,\ldots,m-1, \end{cases}$$

$$G_{mi} = G_{im} = \sum_{(x,y)\in K} g_i(xy), \quad i=1,\ldots,m-1,$$

$$G_{mm} = \text{number of points } (x,y) \text{ in } K_i,$$

-continued $$S_i = \sum_{(x,y) \in K} g_j(xy) \cdot F(xy), \quad i = 1, \ldots, m-1,$$

$$S_m = \sum_{(x,y) \in K} F(xy).$$

The equations (19) form a linear system of equations easy to solve by various methods well known in mathematics.

Resolution of the problem of minimisation (15) of the functional (14) under the constraints (13) will comprise the following steps:

a) Resolution of the problem of minimisation without constraints of the functional (14) on $\mathbb{R}^{n+1}$ by the method described above by the equations (16) to (19). The solution will be denoted $(\tilde{a}_1, \ldots, \tilde{a}_n, b) \in \mathbb{R}^n$ b) If $(\tilde{a}_1, \ldots, \tilde{a}_n, b) \in C$, then if $-\beta < \tilde{a}_i < \beta$; i=1, ..., n then the solution sought to the problem described by equations (15) and (16) is found and therefore $(a_1^*, \ldots, a_n^*, b) = (\tilde{a}_1, \ldots, \tilde{a}_n, b)$ c) If $(\tilde{a}_1, \ldots, \tilde{a}_n, b) \notin C$, certain constraints are violated. The effect of this will be a disjoint partitioning of the set of indices $\{1, \ldots, n\} = NV \cup UV \cup LV$ where NV is the set of indices $i \in \{1, \ldots, n\}$ for which $-\beta < \tilde{a}_i < \beta$ UV is the set of indices $j \in \{1, \ldots, n\}$ for which $\beta < \tilde{a}_j$ LV is the set of indices $k \in \{1, \ldots, n\}$ for which $\tilde{a}_k < -\beta$ Therefore expressed mathematically:

$$\{1, \ldots, n\} = NV \cup UV \cup LV \quad (20)$$

$$NV = \{i \in \{1, \ldots, n\} \mid -\beta < \tilde{a}_i < \beta\} \quad (21)$$

$$UV = \{j \in \{1, \ldots, n\} \mid \beta < \tilde{a}_j\} \quad (22)$$

$$LV = \{k \in \{1, \ldots, n\} \mid \tilde{a}_k < -\beta\} \quad (23)$$

In this case it is advisable to solve a problem of minimisation without constraints described by equations (16) to (19) where $$F(xy) = f(x,y) - \sum_{j \in UV} \beta \cdot g|_{L_j}(x,y) + \sum_{k \in LV} \beta \cdot g|_{L_k}(x,y), \quad (24)$$

$$\Psi(c_1, \ldots, c_m) = \sum_{(x,y) \in K} \left( F(x,y) - \left[ \sum_{j=1}^{m-1} c_j \cdot g_j(x,y) + c_m \right] \right)^2, \quad (25)$$

where m the number of indices in NV, $g_j = g|_{L_j}$ expresses the fact that the $j^{th}$ non-violated constant concerns the coefficient $a_j$.

The solution of the last problem (24) and (25) will be $(c_1^* \ldots c_m^*)$.

Finally the solution sought of the problem with constraints will be $$a_i^* = c_j^*: \quad j = 1, \ldots, m-1 \quad \text{où} \quad i \in NV, \quad (26)$$

$$a_k^* = \beta: \quad k \in UV, \quad (27)$$

$$a_l^* = -\beta: \quad l \in LV, \quad (28)$$

$$b^* = c_m. \quad (29)$$

if however (26) meets the constraints. In the contrary case, it will be necessary to reiterate the process.

A flow diagram allowing partitioning of the 512×512 pixel image, its division and the calculation, for each elementary sub-space $K_i$, of coefficients $a_j$ and b is described below, with the help of FIGS. 10 to 15.

It may be noted here that, when all the elementary subsets have the same dimensions, a compromise must be made. This is because, when these dimensions are too small, the compression ratio is limited since it is a direct function of the number of pixels which are represented by the five parameters associated with each elementary subset. On the other hand, when the dimensions of the elementary subsets are large, the quality of the image reconstructed after secondary processing of these parameters may be too limited for a comfortable use of the reconstructed image, the smallest details possibly having been badly processed during the primary processing.

In an image, it is common that certain areas have very little detail and are practically uniform and that other areas of the image have great complexity (a complexity capable of being represented by the variance of the values of each component of the pixels of the area under consideration).

The invention proposes, in addition to the implementation of the theory explained above, a method making it possible to use elementary subsets of large dimensions in the most uniform areas of the image and elementary subsets of smaller dimension in the least uniform areas of the image. To this end, for each elementary subset in the course of processing, a so-called "quality" complexity criterion is determined and a partitioning suitability estimation is performed. When this estimate does not meet the quality criterion, that is to say when the elementary subset under consideration is assumed to have a certain complexity, it is partitioned into elementary subsets of smaller dimension which are processed in their turn, until a minimum dimension has been reached. In the embodiments described and depicted, this partitioning consists of dividing the elementary subset into four equal elementary subsets, of a form homothetic to that of the initial elementary subset and mutually displaced in each direction.

First Mode of Secondary Processing of Compressed Data

A first embodiment of the method of secondary representation of a set of data constituted by parameters resulting from a primary processing of data, in accordance with the first embodiment of the primary processing method described above, will now be described.

In this first embodiment, the parameters resulting from the primary processing form the subject of the secondary processing, with a view to restoring, with the error rate mentioned above, the initial data.

In other embodiments, one of which is described below, the object of the secondary processing is to deliver data of a type other than that of the initial data.

Generally speaking, in the case of restoration of the initial data, an "iterative calculation" step is carried out, during which, from the said parameters $(a_1, \ldots, a_n, b)$, a method of successive approximations converging towards the fixed point of the global contractive mapping (T) is used, this fixed point constituting a representation of the said set of initial data (f∈E).

In order to use the method of successive approximations within the context of restoration, there is applied in accordance with the first embodiment of the invention, on a set of arbitrarily chosen data $(x_0 \in E)$, the global contractive mapping (T*) as defined above (equations (8) and (10)). Next, the same contraction (T*) is applied on the transform thus obtained and this process is reiterated until the distance between two consecutive transforms is less than a given threshold. This is expressed by the following equation:

$$T^*(\ldots T^*(T^*(x_0))\ldots) = (T^*)^n(x_0) \quad (30)$$

By applying the global contractive mapping q times on the result of the preceding transform, a good approximation of f is obtained, which is expressed by:

$$(T^*)^q(x_0) \approx f \quad (31)$$

the criterion for stopping the iterations being expressed as follows:

$$d((T^*)^l(x_0),(T^*)^{l+1}(x_0)) < \epsilon \quad (32)$$

where $\epsilon$ is the deviation tolerated on one pixel multiplied by the number of pixels in the image.

It should be noted that implementing the global contractive mapping (T) amounts to performing the various partitionings and divisions of the arbitrary image and the successive transforms of it, so as to be able to implement the equation (10) for each elementary subset of the partitionings under consideration.

Below, notably with the help of FIGS. 16 and 17, a flow diagram of restoration of an image represented in accordance with the first embodiment of the secondary processing method of the invention is described.

In the preceding description, the global contractive mapping defined at equations (8) and (10) is used in the data restoration process. This is because, as the aim of the secondary processing described above is, in this embodiment, to obtain as accurate a restoration as possible of the initial data, it is the same global contractive mapping which is used at the restoration step.

On the other hand, in the variant described below, with the help of FIGS. 9, 9A, 18 and 19 where it is wished to obtain, at the conclusion of the secondary processing, data of a type different from that of the initial data, another global contractive mapping, and/or another definition set will be used.

Generally speaking, the global contractive mapping used during the primary processing is referred to as "first type"; that used during the secondary processing is referred to as "second type". In the case of restoration of the initial data, the second type global contractive mapping is identical to the first type. Where, in the course of secondary processing, data of a type different from that of the initial data are obtained, the second type global contractive mapping will be different from the first type.

2. Description of a first embodiment of a processing device

Device for Primary Processing of a Set of Data

There will now be described with the help of FIG. 4 a first embodiment of a device for processing a set of data representing physical quantities, and intended to allow a primary representation of the said set by implementation of the method described above.

In this embodiment, which concerns a device for processing color images, the data of the image in 512×512 pixels are received as an input, while as an output the device delivers the parameters $a_i$, i=1, . . . ,4 and b and partitioning information, relating to each of the subsets constituting a partitioning of the image.

It should be noted here that the present invention is certainly not limited to one particular image format but allows the processing of images of all sizes. However, in one embodiment described and depicted, the image processed and restored is an image of 512×512 pixels with 256 levels on each of the three components Y, luminance, Cr, red chrominance, and Cb, blue chrominance.

In the block diagram of FIG. 4, the encoding device has the general reference 500.

It has, connected to a data and address bus, designated under the reference 501:

a controller (ALU+CTR) 550 incorporating an arithmetic logic unit. This controller is constituted, in this embodiment, by a microprocessor of the type of that marketed by the INTEL company under the reference i486, a random access memory RAM, having the reference 510. This memory has a certain number of registers which will be described below and a part which is addressable at high speed (cache) 514, a program memory 530, of ROM type, a first direct-access register 560 (REG 1) in random access memory, a second direct-access register 570 (REG 2) in random access memory, an input buffer (IBFR) 590, connected to an input connector 591 and an output buffer (OBFR) 580, connected to an output connector 581.

A program is recorded in the ROM 530, allowing the processing of data at the input 591, with compression of the said data in accordance with the method described above. The compression program, which has, on FIG. 4, the reference 531, is described below with the help of FIGS. 10 to 15, 19, 20 and 21.

The set of means 510, 530, 531, 550, 560 and 570 here constitutes an embodiment of "first logical transformation means" in the sense of the invention.

In a particular embodiment, all these elements are incorporated in one and the same specific integrated circuit (ASIC).

In this embodiment, the random access memory RAM 510 has, among others, the following registers intended for implementation of the program 531:

a register 511 (IM), intended for storing the image data, a counter 513 (CNT) used as explained below (FIG. 10).

the part 514 (CACHE) of the random access memory. This part is a part of memory which is addressable at very high speed, in which are, as is known, stored the data most commonly used at a given instant.

The part (CACHE) 514 of the memory 510 has the following registers:

a register 515 CSI intended to store, at a given instant, the coordinates of the elementary subset $K_i$ in the course of processing, registers $f(L_1)$–$f(L_4)$ referenced 516 to 519, in which are recorded the values $[f(L_i)](x,y)$ corresponding to each point (x,y) (a level from amongst 256 of the component in the course of processing) of the working subsets $L_1$–$L_4$ associated with the elementary subset $K_i$ under consideration, a register 520 intended to store the coefficients $a_1$, $a_2$, $a_3$, $a_4$ and b, relating to an elementary subset under consideration $K_i$, and a register 522 intended to store division factors A corresponding to the number of supplementary partitionings performed in order to obtain the elementary subset under consideration $K_j$, the registers 521 and 523 to 526, intended to store intermediate variables of a processing generating the references of elementary subsets forming an initial partitioning of an image to be compressed, the register 560 (REG 1), intended to accumulate, for each elementary subset, the coefficients $a_1$, $a_2$, $a_3$, $a_4$ and b, and any partitioning information, relating to each working subset.

the register 570 (REG 2), intended to store the list of addresses of all the elementary subsets $K_j$.

FIG. 5 depicts, connected respectively to the input and output means:

a non-compressed data source 592, and compressed data user means 582.

The source 592 may have many means within the capability of persons skilled in the art. For example, it may consist of a hard disk or diskette or compact disk (known by the initials CD-ROM) drive. The data of the image to be compressed may therefore advantageously be recorded on the corresponding media: hard disk, diskette or CD-ROM (compact disk). This recording may be carried out in any way known to persons skilled in the art.

The source 592 may also be constituted by a video interface, capable of delivering the data of the image to be compressed at the input 591.

The source 592 may also be constituted by means for receiving data connected to a transmission network, the source 592 being capable of transforming the received data into a suitable format so that they can be presented at an input of the primary processing device.

Likewise, the user means 582 may consist of means for storing the compressed image (hard disk, diskette, CD-ROM, etc.) or a simple interface intended to deliver the video signal, in a known format, to other user means, such as means intended for example to transmit this compressed image remotely or to store it. These means 582 may moreover consist of a data transmission device connected to a telecommunications network.

Device for Secondary Processing of a Set of Parameters Resulting from the Primary Processing of Initial Data In this embodiment, which concerns image processing, the secondary processing device is capable of restoring, from the coefficients $a_1$, $a_2$, $a_3$, $a_4$ and b and partitioning information relating to each elementary subset, the initial image, in colour.

It is also capable of delivering the data relating to a grey scale image corresponding to an original colour image. It is, moreover, adapted to supply an image having a different number of elementary points from the number of elementary points in the image processed by the primary processing device, these images being referred to as having different definition or resolution. These data at the output of the secondary processing device are of a type other than the type of the data of the initial image which were subject to the primary processing.

In the block diagram of FIG. 6, the restoration or iterative calculation device has the general reference 600.

It has, connected to a data and address bus designated under the reference 601:

a controller (ALU+CTR) 650 incorporating an arithmetic logic unit. This controller is constituted, in this embodiment, by a microprocessor of the type marketed by the INTEL company under the reference i486.

a random access memory RAM, having the reference 610, which has a certain number of registers which will be described below and a part which is addressable at high speed (referred to as "cache memory") 614.

a program memory 630, of ROM type. In this memory, notably the following are recorded:

a program 631 for decompression of the data of the image presented at an input 681 with a view to the reconstruction of an approximation of the initial image of identical or different resolution, a program 632 for decompression of the data of the image with a view to the reconstruction of a grey scale image in place of a colour image, and a zoom factor z in a register "z" 628.

The programs 631 and 632 implementing the method described above and their flow diagrams are detailed below with the help of FIG. 16 to 17.

a first direct-access register 560 (REG 1), and a second direct-access register 570 (REG 2) identical to those described with the help of FIG. 4, an output buffer (OBFR) 690, connected to an output connector 691 and an input buffer (IBFR) 680, connected to an input connector 681.

The set of means 610, 630, 631, 650, 560, and 570 here constitute an embodiment of "second logic means" in the sense of the invention. The set of means 610, 630, 632, 650, 560 and 570 here constitute another embodiment of "second logic means" in the sense of the invention.

In a particular embodiment, all these elements are incorporated in one and the same specific integrated circuit (ASIC) suitable for the secondary processing.

In this embodiment, the random access memory RAM 610 has, among others, the following registers intended for implementation of the programs 631 and 632:

a register 511 (IM), described with the help of FIG. 4, a register 621 (RE), intended to store the data of an image, a register (CHTY) 622, intended to differentiate the general secondary processing from a restoration, a register (IT) 612 intended to store the current value of the number of iterations performed to carry out the secondary representation, a register (p) 623 intended to store the number of iterations to implement the method of successive approximations in order to perform the secondary processing of the image, a counter 513 (CNT) described with the help of FIG. 4. This counter is used here as explained below (FIG. 16), the part 614 (CACHE) of the random access memory 610. This part is a part of memory which can be addressed at very high speed, in which are, as is known, stored the data most commonly used at a given instant, the part (CACHE) 614 of the memory 610 has registers 515 to 520 and 627 respectively identical to the registers 515 to 520 and 522 described with the help of FIG. 4, the register 560 (REG 1), intended to store, for each elementary subset, the coefficients $a_1$, $a_2$, $a_3$, $a_4$ and b and any partitioning information associated with this subset, and the register 570 (REG 2), intended to store the list of addresses of all elementary subsets $K_j$.

FIG. 7 depicts, connected respectively to the input and output means:

a compressed data source 682, and decompressed data user means 692.

The source 682 may consist of means for storing the compressed image (hard disk, diskette, CD-ROM, etc.) or a simple interface intended to deliver them. The means 682 may also consist of a data receiving system connected to a telecommunications network.

The means 692 may consist for example of means for storing decompressed data or a simple interface delivering the decompressed data on its output. They may also consist of a device for transmitting decompressed data on a telecommunications network.

Description of a Device Incorporating a Primary Processing Device and a Secondary Processing Device In the schematic diagram of FIG. 8, a device incorporating a primary processing device 500 and a secondary processing device 600 is depicted and has the general reference 700.

This device is capable of processing image compressions and decompressions in parallel. It is consequently composed of the devices described with the help of FIGS. 4 and 6. In this case this is the primary processing device 500 and the secondary processing device 600. This type of equipment is called "full-duplex".

In another embodiment (half-duplex), the device can execute only primary processing or secondary processing but never at the same time. It can also carry out "complex" processing consisting of primary processing and secondary processing carried out one after the other. The schematic diagram of such a device is depicted in FIGS. 9 and 9A.

This device which has the reference 800 has jointly the resources of the devices 500 and 600 described above, avoiding double usage. For this reason:

the registers of the random access memories 510 and 610 described above are incorporated in the same random access memory unit 810, the same read-only memory unit 830 incorporates the programs 531, 631 and 632 mentioned above and a configuration program 831, the same microprocessor 850 incorporates the means 550 and 650.

The configuration program 831 which will be described below with the help of FIG. 18 allows the device 800 to carry out:

compression of the data of a colour image, decompression of the data either with a view to restoring the initial colour image, or with a view to restoring it with a different resolution, or with a view to delivering an image with corresponding grey scales, and complex processing making it possible to transform a colour image into a grey scale image.

Description of a Particular Flow Diagram for Compression of a 512×512 Pixel Colour Image This flow diagram is illustrated in FIG. 10. FIGS. 11 to 15 are flow diagrams clarifying certain operations of the compression flow diagram of FIG. 10.

The flow diagrams of FIGS. 11 and 12 furthermore also detail operations of the decompression flow diagram of FIGS. 16 and 17 which will be described below. The references among the parameters refer to the steps of FIG. 16.

It should be noted first of all that the data relating to the image represent a mapping as defined in equation (9) stated above.

In the case in point, each pair of values (x,y) (column, line coordinates) taken in the definition domain (in the case in point the 512×512 pixel plane image) has a corresponding value f(x,y) in the mapping domain $\mathbf{R}^3$, that is to say a value from amongst 256 levels relating to each of the three components Y, Cr and Cb.

Three series of numbers are organised, each corresponding to the level of one component (that is 512×512=262,144 values f(x,y) per component), by scanning the image data as follows:

the lines are scanned from left to right;

the lines are incremented from bottom to top.

These three series are here recorded in the non-compressed data source 592. They can be read on the input port 591 under control of the microprocessor 550.

At 200, an initialisation of the registers (IM) 511, (CNT) 513 and the two registers (REG 1) 560 and (REG 2) 570 to the uniform value zero is carried out.

The files relating to the components Y, Cr and Cb are accessible separately and are supplied in a predetermined order, namely:

first the data of the image under consideration relating to the luminance component (Y), next the image data relating to the red chrominance component (Cr) and finally the image data relating to the blue chrominance component (Cb).

At 201, a first test is carried out for the purposes of determining whether or not the counter (CNT) 513 is equal to 3.

If not, the program switches to the step 202, during which:

the counter 513 (CNT) is incremented by one unit;

the microprocessor 550 will read from the input port 591 the next component to be processed.

It should be noted that each component, Y, Cr or Cb, appears as a series of 262,144 values f(x,y) corresponding to the level of the component under consideration for each pixel in the image. This series is loaded into the register (IM) 511.

It should be noted that, in this particular embodiment, each working subset has as many data items as the elementary subsets.

The program next switches to the step 204 (explained in FIG. 11), during which initial partitioning of the 512×512 pixel image into 256 elementary subsets $K_i$,i=(1, . . . ,256) of 32×32 pixels will be carried out. This partitioning is done by determining the coordinates (x,y) of the lower left corners of each of the m subsets $K_i$ under consideration. In this way, the subset $K_i$ illustrated in FIG. 3 has the coordinates $(x_i, y_i)$, which correspond to those of its lower left corner. Each of the addresses of the lower left corners of the 32×32 pixel blocks corresponds to a particular address in the list recorded in the register (IM) 511 of the random access memory 510.

The list of these addresses is loaded into the register (REG 2).

Figure 11:
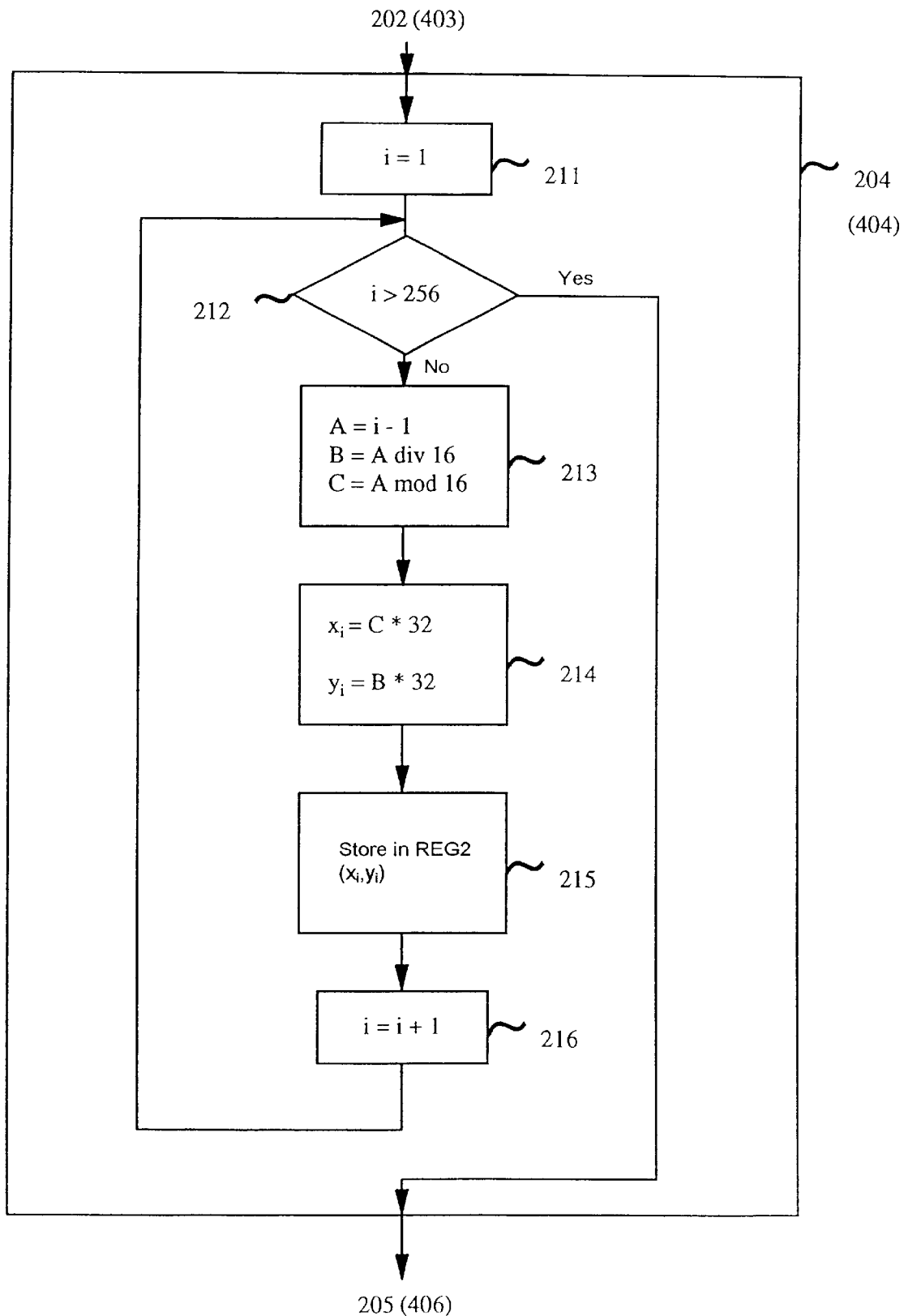

With reference to FIG. 11, after initialisation of a counter constituted by the register i 521 relating to the index of the subsets $K_i$ at the step 211, the program switches to the test 212 during which it is checked whether the list is complete or not. If not, the program switches to the step 213 during which the division factor A, which counts down each supplementary partitioning which is performed on an elementary subset, is initialised to the value zero and where a variable B is determined as the quotient of an integer division of (i−1) by 16. The remainder from the division (variable C) is stored in the register 524. The values $x_i$=C * 32 and $y_i$=B * 32 are calculated during the operation 214 and stored temporarily in the registers 525 and 526. These coordinates which are those of the lower left corner of the elementary subset $K_i$ under consideration, and the associated division factor A, are stored in the variables ($x_i$, $y_i$) in the register 570 (REG 2) during the step 215. During the step 216 the counter i is incremented and the program then executes the test 212 again.

When the test 212 is positive, the program performs the test 205 (FIG. 10) during which it is checked whether the list recorded in the register (REG 2) is empty or not. If not, this means that there are still elementary subsets $K_i$ to be processed and the program switches to the step 206.

At the step 206, the first elementary subset is deleted from the list recorded in the register (REG 2). This subset is recorded in a register CSI 515 of the cache memory of the RAM 510.

The program then switches to the step 207 detailed in FIG. 19 or, according to a variant, FIG. 20. During this step, a test 255 determines whether or not the elementary subset under consideration has the minimum dimensions, that is to say in the embodiment described and depicted, 2 times 2 pixels.

When the result of the test 255 is positive, the operation 250 consists of determining the four working sub-images $L_i$ associated with the working subset under consideration. This operation 250 is detailed in FIG. 12. During the operation 250, from the address recorded in the register CSI and the division factor A, the search for the four related working subsets $L_1$, $L_2$, $L_3$, $L_4$ (see FIG. 3 for the working subsets associated with the initial partitioning) is carried out. To this end, the rule stated above is applied:

each working subset has the same dimensions as the elementary subset to which it is linked, that is in each direction: 32 divided by 2 to the power A; and each working subset is displaced by one half-dimension in each direction, with respect to the associated elementary subset.

The aim of the operation 250 is therefore to determine the values f(x,y) of the component under consideration associated with each pixel of the working subsets $L_1$, $L_2$, $L_3$ and $L_4$ linked geometrically and in a predetermined manner to the elementary set under consideration $K_i$. The set of values f(x,y) linked to the pixels of the subset $L_1$ (respectively $L_2$, $L_3$ and $L_4$) will be denoted hereinafter f($L_1$) (respectively f($L_2$)f($L_3$) and f($L_4$)).

Figure 12:
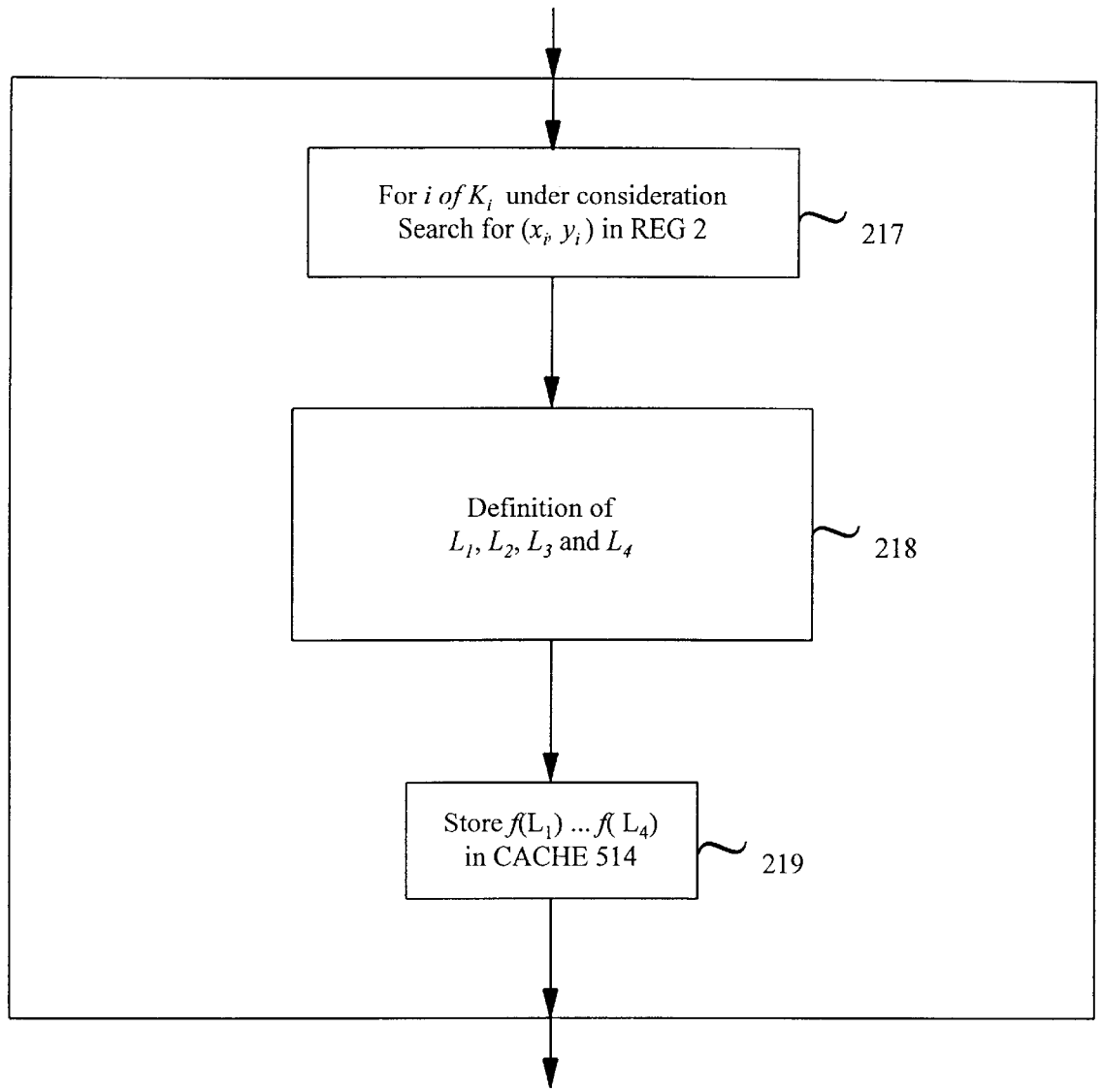

With reference to FIG. 12, for each elementary subset $K_i$ under consideration, the controller 550 reads from the register 570 (REG 2) the coordinates ($x_i$,$y_i$) of the lower left pixel of $K_i$, at the step 217. Next, at the step 218, the arithmetic unit 550 reads the values of the component under consideration for each pixel of the four working subsets $L_1$ to $L_4$, defined according to the following table:

$L_1$: $[x_i-16/2^A, x_i-1+16/2^A] \times [y_i+16/2^A, y_i-1+(3\times16)/2^A]$ $L_2$: $[x_i+16/2^A, x_i-1+(3\times16)/2^A] \times [y_i+16/2^A, y_i-1+(3\times16)/2^A]$ $L_3$: $[x_i-16/2^A, x_i-1+16/2^A] \times [y_i-16/2^A, y_i-1+16/2^A]$ $L_4$: $[x_i+16/2^A, x_i-1+(3\times16)/2^A] \times [y_i-16/2^A, y_i-1+16/2^A]$ It can be seen here that each working subset has here the same number of pixels as the elementary subset under consideration, that is $(32/2^A)^2$.

Next, at the step 219, the arithmetic unit 550 will search, for the component, Y, Cr or Cb in the course of processing, for the value corresponding to each of the $(32/2^A)^2$ pixels of $L_1$ (respectively $L_2$, $L_3$ and $L_4$) and stores the set of $(32/2^A)^2$ values in the register f($L_1$) 516 (respectively f($L_2$) 517, f($L_3$) 518 and f($L_4$) 519) of the cache 514).

Following the operation 250 (FIG. 19), the program performs the operation 251 during which, generally speaking, the parameters $a_i$ (in the case in point $a_1$, $a_2$, $a_3$, $a_4$) and b are calculated using the method of least squares with the constraints described above (see equations 12 and 13).

Figure 13:
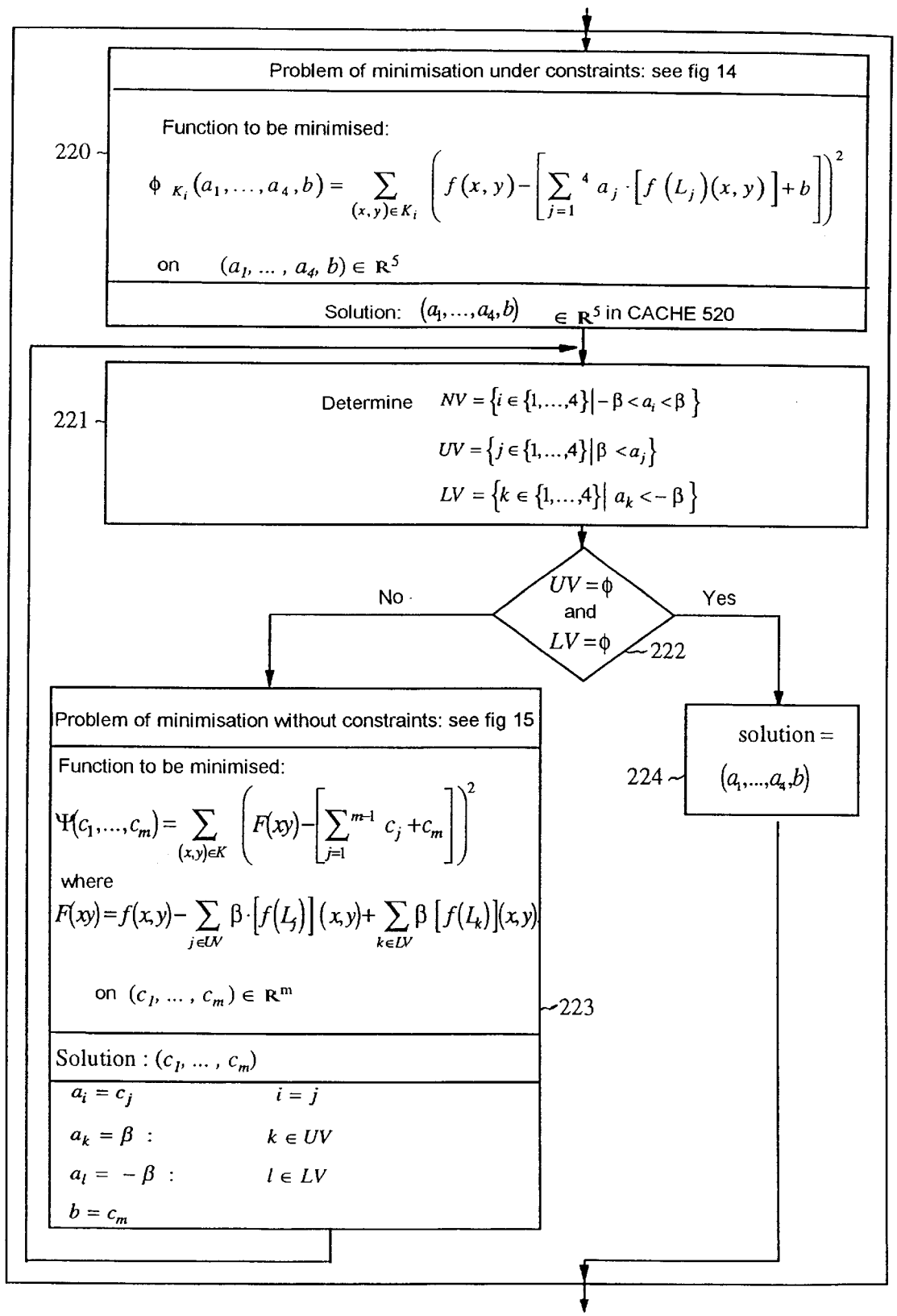

A simplified description of the step 251 is given in the flow diagram depicted in FIG. 13. It should be stated that in order to determine the coefficients $a_1$, $a_2$, $a_3$, $a_4$ and b it is necessary to solve a problem of minimisation of a functional under constraints. It has been seen above, with the help of the equations 14 to 29, that this amounts to iteratively solving two types of problem of minimisation without constraints. The explanations given above for a general case are put into practice for determination of the four parameters $a_1$, $a_2$, $a_3$, $a_4$ and the parameter b.

At the step 220, the solving of the first problem of minimisation without constraints is carried out. The following functional is minimised:

$$\phi_{K_i}(a_1, \ldots, a_4, b) = \sum_{(x,y)\in K_i} \left( f(x,y) - \left[ \sum_{j=1}^{n=4} a_j \cdot [f(L_j)](x,y) + b \right] \right)^2$$

for values ($a_1$, . . . ,$a_4$,b) covering all $\mathbb{R}^5$. To do this, the method of least squares described above by the equations (16) to (19) is used. The unique solution to this problem ($a_1$, . . . ,$a_4$, b) in $\mathbb{R}^5$ is the solution of the linear system (19).

As illustrated in FIG. 14, the step 220 is subdivided into four steps 230–233.

During the step 230, coefficients $G_{ij}$,i=1, . . . ,5,j=1, . . . ,5 are calculated using the following formulae:

$$G_{ji} = \sum_{(x,y)\in K} [f(L_j)](x,y) \cdot [f(L_i)](x,y) \quad i, j = 1, \ldots, 4$$

$$G_{5i} = G_{i5} = \sum_{(x,y)\in K} [f(L_i)](x,y) \quad i = 1, \ldots, 4$$

$$G_{55} = 32^2$$

The coefficients [$G_{ij}$] constitute the matrix to be inverted in order to solve the linear system of equations (19).

The above formulae for determining the coefficients $G_{ij}$, are, as can be seen, simple additions and multiplications using pixel values corresponding to the levels of the component under consideration, for each pixel of the elementary subset under consideration.

Likewise at the step 231, the coefficients $S_1$, . . . ,$S_5$, constituting the second member of the linear system, are calculated. The formulae used are:

$$S_i = \sum_{(x,y)\in K} [f(L_i)](x,y) \cdot f(x,y) \quad i = 1, \ldots, 4$$

$$S_5 = \sum_{(x,y)\in K} f(x,y)$$

The step 232 calls upon a conventional routine for inverting a system of linear equations, in the case in point with five unknowns. The linear system to be inverted is as follows:

$$\begin{bmatrix} G_{11} & G_{21} & G_{31} & G_{41} & G_{51} \\ G_{12} & G_{22} & G_{32} & G_{42} & G_{52} \\ G_{13} & G_{23} & G_{33} & G_{43} & G_{53} \\ G_{14} & G_{24} & G_{34} & G_{44} & G_{54} \\ G_{15} & G_{25} & G_{35} & G_{45} & G_{55} \end{bmatrix} \begin{bmatrix} a_1 \\ a_2 \\ a_3 \\ a_4 \\ b \end{bmatrix} = \begin{bmatrix} S_1 \\ S_2 \\ S_3 \\ S_4 \\ S_5 \end{bmatrix}$$

The solution $a_1, \ldots, a_4, b$ will be stored at the step 233 in the part 514 (CACHE) of the random access memory 510.

The program next goes to the step 221 (FIG. 13) where, in accordance with the equations (20) to (23), a disjoint partitioning of the set of integers $\{1,2,3,4\}$ is determined in NV, UV and LV defined as $$NV = \{i \in \{1, \ldots, 4\} \mid -\beta < a_i < \beta\},$$
$$UV = \{j \in \{1, \ldots, 4\} \mid \beta < a_j\},$$
$$LV = \{k \in \{1, \ldots, 4\} \mid a_k < -\beta\}.$$

The program next switches to the test 222 during which it is checked whether the sets UV and LV are empty. If this test is positive the values currently present in the register 520 constitute (step 224) the solution of the problem with constraints.

If not, certain constraints are active for the solution of the problem with constraints. In this case, (step 223: see FIG. 15) it is necessary to solve a restricted problem.

It is a question in the case in point of minimising under constraints the modified functional:

$$\psi(c_1, \ldots, c_m) = \sum_{(x,y) \in K} \left( F(xy) - \left[ \sum_{j=1}^{m-1} c_j \cdot [f(L_j)](x, y) + c_m \right] \right)^2,$$

where $$F(x, y) = f(x, y) - \sum_{j \in UV} \beta \cdot [f(L_j)](x, y) + \sum_{k \in LV} \beta \cdot [f(L_k)](x, y),$$

and m<4 since fewer constraints are active.

The solution of this problem is $(c_1, \ldots, C_m)$ and is obtained by considering the equations (16) to (18) and solving the linear system (19).

The solution of the initial problem with constraints is:

$$a_i = c_j: \quad j = 1, \ldots, m-1 \quad \text{or} \quad i \in NV,$$
$$a_k = \beta: \quad k \in UV,$$
$$a_l = -\beta: \quad l \in LV,$$
$$b = c_m.$$

The step 223 will be described with the help of the flow diagram of FIG. 15 assuming m=3. The problem of minimisation without constraints should be considered, described in the step 223 which is subdivided into four steps 240 to 243. During the step 240, coefficients $H_{ij}$ i=1, . . . ,4 ,j=1, . . . ,4 are calculated using the following formulae:

$$H_{ji} = \sum_{(x,y) \in K} [f(L_j)](x, y) \cdot [f(L_i)](x, y) \quad i, j = 1, \ldots, 3$$

$$H_{4i} = H_{i4} = \sum_{(x,y) \in K} [f(L_i)](x, y) \quad i = 1, \ldots, 3$$

$$H_{44} = 32^2$$

The coefficients $[H_{ij}]$, constitute the matrix to be inverted in order to solve the linear system of equations (19).

The formulae above making it possible to determine the coefficients $H_{ij}$, are, as can be seen, simple additions and multiplications using pixel values corresponding to the levels of the component under consideration, for each pixel of the elementary subset under consideration.

Likewise at the step 241 the coefficients $T_1, \ldots T_4$ constituting the second member of the linear system are calculated. The formulae used are:

$$T_i = \sum_{(x,y) \in K} [f(L_j)](x, y) \cdot F(x, y) \quad i = 1, \ldots, 3$$

$$T_4 = \sum_{(x,y) \in K} F(x, y)$$

The step 242 calls upon a conventional routine for inverting a system of linear equations, in the case in point with 4 unknowns. The linear system to be inverted is the following:

$$\begin{bmatrix} H_{11} & H_{21} & H_{31} & H_{41} \\ H_{12} & H_{22} & H_{32} & H_{42} \\ H_{13} & H_{23} & H_{33} & H_{43} \\ H_{14} & H_{24} & H_{34} & H_{44} \end{bmatrix} \begin{bmatrix} c_1 \\ c_2 \\ c_3 \\ b \end{bmatrix} = \begin{bmatrix} T_1 \\ T_2 \\ T_3 \\ T_4 \end{bmatrix}$$

At the conclusion of the step 223, it is necessary to see again whether the solution thus obtained still satisfies the constraints. To do this, the step 221 and the test 222 are executed again. This process is reiterated until the test 222 is positive.

During the operation 251, the coefficients $a_1, a_2, a_3, a_4, b$ are recorded in the register 560 (REG 1). Then the test 205 is reiterated. It may be seen here that insofar as the elementary subset has minimum dimensions, no partitioning information is necessary, since no supplementary partitioning can be performed.

When the result of the test 255 is negative, the operation 252 consists of measuring the variance of the levels of the component under consideration, in the elementary subset under consideration. Next, the operation 253 consists of determining a so-called "quality" criterion applicable to the elementary subset under consideration. Preferentially, the definition of the quality criterion consists of the definition of a threshold below which the quality criterion is considered to be met. Also preferentially, the value of the threshold takes into account the dimensions of the elementary subset under consideration. In the embodiment described and depicted this threshold is the function corresponding to the following table:

| dimensions of the subset in pixels | threshold |
|---|---|
| 2 × 2 | 200 |
| 4 × 4 | 160 |
| 8 × 8 | 100 |
| 16 × 16 | 60 |
| 32 × 32 | 20 |

According to variants not depicted:
 the value of the threshold is constant whatever the dimensions of the elementary subsets or
 the value of the threshold is an inverse function of one dimension of the elementary subset under consideration.

The test 254 determines whether or not the quality criterion is met. In the embodiment described and depicted, it is met when the measurement of the variance of the levels of the component under consideration is less than the value of the threshold which corresponds, in the above table, to the dimensions of the elementary subset under consideration.

When the result of one of the tests 254 or 255 is positive, the operation 250 consists of determining the four working sub-images as explained above. Next, the operation 258 is identical to the operation 251, apart from storage, in the register 560 (REG 1), of successively the partitioning information equal to "0", since no supplementary partitioning has been performed, and the coefficients $a_1$, $a_2$, $a_3$, $a_4$, b. Next, the test 205 is reiterated.

When the result of the test 254 is negative, the operation 256 consists of performing a supplementary partitioning of the elementary subset under consideration. In the embodiment described and depicted, this supplementary partitioning consists of dividing each elementary subset into four equal square elementary subsets. To this end, during the operation 256, there is added at the head of the list sub__image__list the coordinates of the four points which define the lower left corners of the four elementary subsets resulting from the supplementary partitioning. With these coordinates are associated a division factor A which is equal to the division factor of the elementary subset which is being partitioned, incremented by the value 1. Moreover, partitioning information equal to "1", since a supplementary partitioning has been performed, is stored in the register 560 (REG 1).

Following the operation 256, the test 205 is reiterated.

It may be seen here that, in accordance with general characteristics of the invention, the primary processing:

takes into account a minimum dimension, during the step 255, and has an "initial partitioning" step, operation 204, during which the set of data is partitioned into so-called "initial elementary" subsets ($K_i$), has:
a) for each elementary subset which does not have the said minimum dimension, at least one iteration of the sequence of operations 252 to 205, having:

a division suitability estimation step, operation 253 and test 254, during which a suitability of division of the said elementary subset is estimated, and when the suitability estimate does not meet the quality criteria, a step of "supplementary partitioning" of the said subset into so-called "intermediate" elementary subsets $K_i$, operation 256, b) a "construction" step, operations 258 or 251, during which, for each elementary subset $K_i$ resulting from the last partitioning step, n working subsets $L_i$, n being non-zero, are considered, and an elementary mapping of the n working subsets in the elementary subset under consideration is constructed.

It should be noted, in this respect, that the parameters $a_i$, b of the elementary mapping are determined so as to:

make contractive a so-called "first type" global mapping, for the said set of data, the said global mapping belonging to the group of mappings composed of multidimensional mappings and non-linear mappings, the restrictions of the global mapping to the elementary subsets $K_i$ being composed of the said elementary mappings, the fixed point of the global mapping constituting an approximation of all or part of this set, allow the use of a method of successive approximations converging towards the fixed point of the said global contractive mapping.

The set of parameters $a_i$, b thus determined and, when at least one supplementary partitioning step has taken place, a so-called "partitioning" information item, representing each said supplementary partitioning, then jointly constitute a primary representation of the said set of data.

FIGS. 21A, 21B and 21C illustrate the effect of supplementary partitionings which are performed on the elementary subsets resulting from the initial partitioning or from previous supplementary partitionings.

For the purposes of explanation, and by exception to the general rules of the description, it is assumed that, in the embodiment explained in FIGS. 21A to 21C, the minimum dimensions of the elementary subsets are four times smaller than their maximum dimensions.

FIG. 21A depicts part of an image, corresponding to twelve elementary subsets referenced $B_0$ to $B_{11}$ resulting from the initial partitioning (operation 204, FIG. 11), in which the elementary subset $B_1$ has undergone a supplementary partitioning into four elementary subsets $B_{1,0}$ to $B_{1,3}$, the elementary subset $B_{1,3}$ has undergone a supplementary partitioning into four elementary subsets $B_{1,3,0}$ to $B_{1,3,3}$, the elementary subset $B_6$ has undergone a supplementary partitioning into four elementary subsets $B_{6,0}$ to $B_{6,3}$, the elementary subset $B_{6,1}$ has undergone a supplementary partitioning into four elementary subsets $B_{6,1,0}$ to $B_{6,1,3}$, and the elementary subset $B_{11}$ has undergone a supplementary partitioning into four elementary subsets $B_{11,0}$ to $B_{11,3}$.

FIG. 21B illustrates, for the elementary subsets thus partitioned, the partitioning information which is associated with the elementary subsets resulting from the initial partitioning (subsets for which the value of the division factor A is zero) or with the elementary subsets resulting from supplementary partitionings.

Thus, the elementary subsets $B_0$, $B_2$, $B_3$, $B_4$, $B_5$, $B_7$, $B_8$, $B_9$ and $B_{10}$ are associated with zero partitioning information, the elementary subsets $B_1$, $B_6$ and $B_{11}$ are associated with partitioning information equal to 1, their elementary subsets $B_{1,0}$, $B_{1,1}$, $B_{1,2}$, $B_{6,0}$, $B_{6,2}$, $B_{6,3}$, $B_{11,0}$, $B_{11,1}$, $B_{11,2}$ and $B_{11,3}$ are associated with zero partitioning information, the elementary subsets $B_{1,3}$ and $B_{6,1}$ are associated with partitioning information equal to "1" and the elementary subsets resulting from their supplementary partitioning are not associated with any partitioning information since the dimensions of these elementary subsets are the minimum dimensions.

The dimensions of all these elementary subsets can thus be defined without ambiguity by the series of partitioning information:

0 1 0 0 0 1 0 0 0 0 1 0 1 0 0 0 0 0 0 1 0 0 0 0

FIG. 21C proposes a representation of the parameters $a_1$, $a_2$, $a_3$, $a_4$ and b, which, jointly, are here referenced D and partitioning information associated with them, using the series stated above.

It can be seen therein that the sequence of compressed data corresponding to the image part depicted in FIG. 21A has:

a header, representing in particular the dimensions of the image (here equal to 512×512 pixels), the initial dimensions of the elementary subsets (here corresponding to 32×32 pixels) and the definition of the minimum dimensions of the elementary subsets (here corresponding to 2×2 pixels) and supplementary processing information and any ratio of dimensions between the resolution of the luminance component and that of the chrominance components;

the series of partitioning information presented above:

0 1 0 0 0 1 0 0 0 0 1 0 1 0 0 0 0 0 0 1 0 0 0 0 associated with any data which correspond to them, in the course of the storage performed during the steps 251 (with no partitioning information) and 258 (with partitioning information), being aware that partitioning information equal to 1 is not associated with any data.

The set of operations 205–258 or 205–256 is reiterated as long as the memory (REG 2) is not empty.

When the test 205 (FIG. 10) is positive, the program switches again to the test 201 for the purposes of checking whether or not the counter (CNT) 513 is equal to 3. In the affirmative, this means that the three components have been processed. The program then switches to the supplementary processing determination step 209, during which the following is carried out:

on the one hand, determination of the usefulness or not of performing supplementary smoothing processing on the image resulting from secondary processing of the parameters and partitioning information and on the other hand, storing of the parameter and partitioning information file header, the said header consisting notably of the image dimensions, the maximum and minimum dimensions of the elementary subsets, the possible ratio of dimensions between the resolution of the luminance component and that of the chrominance components, and the supplementary processing information representing the usefulness of the said supplementary processing.

In order to determine this usefulness, a number of criteria may be used. The first consists of comparing the minimum dimension of the elementary subsets with a dimension which serves as a threshold. When the minimum dimension is greater than the threshold dimension, this means that relatively large elementary subsets (for example of 8×8 pixels) will be used even if the quality criterion, defined at the step 253, is not met and that it will therefore be of benefit to reduce the edge perception affecting such elementary subsets. The second consists of comparing the thresholds used in the table defining the quality criterion with so-called "critical" values, of predetermined thresholds. When the thresholds actually used are greater than these critical values, this means that the quality criterion is easily met on elementary subsets of large dimensions, a subset of which the edges may be visible. It is then, again, worthwhile to provide supplementary processing.

Next the end step 210 is carried out. The parameters of the global contractive mapping may be found associated with the partitioning information, in the register (REG 1) 560. These parameters constitute a primary representation of the initial data which were recorded in the data source 592.

It has been possible to observe the following performance on a 512×512 pixel colour image with 256 levels per component:

Number of data at the start: 3×512×512×8 bits=6,291,456
Number of data at the finish: 3×256×(4×64+10)=204,288
consequently:
compression ratio: 30
number of bits per pixel : 0.78
Processing time: 3×256×80 msec.≡61 sec. (80 msec.=unit time for calculation of $a_1, \ldots, a_4, b$)

Of course, the invention applies both to the primary processing of grey scale images (having a single component) and to that of colour images (having a number of components).

Description of Two Embodiments of a Decompression Flow Diagram

The flow diagram of program 631 allowing reconstruction of the data of the original colour image will now be described with the help of FIGS. 16 and 17.

During the operation 400, FIG. 16, initialisation of the registers (IM), (RE) and (IT) of the random access memory 610, the two memories (REG 1) 560 and (REG 2) 570, and the counter (CNT) 513, to the uniform value zero, is carried out.

The test 401 determines whether or not the contents of the counter 513 (CNT) are equal to 3. When the result of the test 401 is positive, the three components have been restored and the decompression program is finished. The program then performs the test 416 described below.

If not, the program performs the operation 403 during which the compressed data from the input memory are loaded into the memory (REG 1) 560. It should be stated that the compressed data are formed from a series of five or six numbers, namely the coefficients $a_1$, $a_2$, $a_3$, $a_4$ and b and, possibly, partitioning information, relating to each elementary subset $K_i$. In the case of a 512×512 pixel colour image, each component was compressed into series during the primary processing as implemented by the program 531 described above. This sequence of series of numbers is loaded into (REG 1) 560.

During the operation 420, the zoom factor z is read from the read-only memory ROM 630. It should be noted here that selection of the zoom factor z may also be made by any means within the capability of persons skilled in the art. In particular, it could be made by means of a switch (not depicted) arranged on the housing of the secondary processing device which is the object of the present invention, a switch with a number of positions each corresponding to a predetermined zoom factor. This switch would make it possible to send the appropriate signals to the random access memory RAM 610, so as to load the values indicated into a register, not depicted, z. This initialisation may also be carried out under similar conditions by means of a keyboard (not depicted), with technical provisions which are not depicted but are well known to persons skilled in the art.

The program next performs the operation 404, during which creation of the list of references of each elementary subset is carried out. In the case in point this is a list of the coordinates $(x_i, y_i)$ of the lower left pixel of each elementary subset $K_i$, of which the number of pixels is $((z \times 32)/2^A)^2$ pixels, the division factor A being recalculated according to the partitioning information as explained with the primary processing. This list is determined taking into account the partitioning information associated with each elementary subset and the zoom factor z associated with any image resulting from the secondary processing.

It should be noted here that the zoom factor z is a multiplying factor which is applied to the dimensions of the image reconstructed during the secondary processing from parameters coming from an image processed during primary compression processing. This multiplying factor is also applied to the dimensions of each elementary subset, whether it comes from the initial partitioning or from supplementary partitionings, and to each dimension of a working subset associated with one of these elementary subsets. When a ratio between the luminance component resolutions has been transmitted in the header, the zoom factor z is applied to the luminance, and the product of the zoom factor z with the said ratio is applied to the chrominance components, so that all the sets of data on which a component is reconstructed have the same resolution.

In accordance with the invention, no zoom factor z causes a pixel duplication forming the appearance, in the reconstructed image, of uniform blocks.

The program next switches to the step 406 during which:

- in accordance with the embodiment of the invention described here, an initial arbitrary image is stored in the register (IM) 511 of the random access memory 610. In the present case of decompression of a colour image where each component has 256 levels having respectively the values 0 to 255, the register (IM) is initialised to the numeric value 128 (corresponding substantially to the mean value between 0 and 255) for each pixel for the first component processed. For the following components, the result obtained previously is used as initialisation.

- the register (IT) 612 is initialised with a value p read from the register 623 of the RAM 610. The number of iterations is recorded in the register (p), considering the desired RMSE (see above Table 1 of the general description of the method). The inventors in fact noted during tests with the prototype that, in order to obtain a given RMSE from a compression ratio, a limited number of successive iterations during the approximation calculation was necessary. Typically: $2 \leq p \leq 10$; however for very complex images p may have a higher value.

- the counter (CNT) 513 is incremented by one unit.

The program next executes a number p of iterations referenced on the loop 450 in order to allow the restoration of one component of the image.

The program switches first of all to the test 407 during which it is checked whether the contents of the register (IT) 612 are positive and non-zero.

If the test 407 is positive, the program switches to the test 408 during which it is checked whether the list recorded in (REG 2) 570 is empty or not.

If the test 408 is negative, the program switches to the step 410 and executes this until all elementary subsets $K_i$ have been processed.

The detail of the step 410 will now be described in FIG. 17.

The step 410 itself comprises the steps 411 to 415:

At the step 411, the coordinates $(x_i, y_i)$ corresponding to the elementary subset $K_i$ under consideration are extracted and copied into the register CSI 515. Similarly, the coefficients $(a_1, \ldots, a_4, b)$, relating to the elementary subset under consideration are copied from the register (REG 1) to the register 520 of the part 614 (CACHE) of the random access memory 610.

The aim of the step 412 is to determine the working subsets linked geometrically and in a predetermined manner to the elementary subset $K_i$ under consideration, taking into account the fact that each working subset has the same dimensions as the elementary subset under consideration (thus taking into account the zoom factor z) and is displaced, with respect to this elementary subset, by one half-dimension.

This step has the same operations as at the step 250 described above with the help of FIG. 12. The values $f(L_1)$, $f(L_2)$, $f(L_3)$ and $f(L_4)$ of the pixels relating respectively to $L_1$, $L_2$, $L_3$ and $L_4$ are respectively copied into the registers 516, 517, 518 and 519 of the part 614 (CACHE) of the random access memory 610.

The program next switches to the steps 413 and 414 during which, for each pixel (x,y) of $K_i$, the value $$\sum_{i=1}^{4} a_i \cdot [f(L_i)](x, y) + b$$

is calculated with the help of the coefficients stored in the register 520 and the data $f(L_1), \ldots, f(L_4)$ stored in the registers 516 to 519, (step 413) and this value is stored (step 414) in the register (RE) 621 of the RAM 610.

If the test 408 is positive, the contents of the register (RE) 621 are copied into the register (IM) 511, and the contents of the register (IT) 612 are decreased by one unit.

The test 407 is again carried out. As long as this test is positive this means that the number of iterations provided for by the number recorded in the register (p) is not finished and the operations 408 to 410 are reiterated. When the test 407 is negative or zero, the number of iterations provided for is finished, for the component in the course of processing, and the program leaves the loop 450. This component is therefore decompressed.

The step 405 is carried out, which consists of copying the contents of the register (IM) 511 into the output buffer (OBFR) 690. The program next switches to the test 401.

As long as the test 401 is negative, this means that there remains at least one component to be decompressed.

It may be seen that for the second and third component no new initialisation of the register (IM) 511 is carried out. The register (IM) has in fact the list of values corresponding to each pixel for the previously decompressed component. This list of values is the initial arbitrary image for the next component. FIG. 16A illustrates in this respect the progress of the step 406.

However, according to a variant, not depicted, the processing of the three components Y, Cr and Cb, of the image is carried out in a similar manner, taking a set of arbitrary data as the initial set of data.

It may be seen here that, according to general characteristics of the invention, the secondary processing includes:

a step of determining dimensions of elementary subsets constituting a partitioning of a second set of data, operation 404, the said step taking into account the presence of partitioning information corresponding to the said subsets, each elementary mapping corresponding to an elementary subset being determined by at least one parameter of the said set of parameters, and an "iterative calculation" step, operation 450 or 407 to 410, during which, from the said set of parameters and the said dimensions, a method of successive approximations converging towards the fixed point of a global contractive mapping is used on the second set of data, the restrictions of the global mapping to the elementary subsets $K_i$ being composed of the said elementary mappings.

In FIG. 16A, during the test 430, testing of the counter 513 (CNT) is carried out. If its contents are equal to zero, this means that the first component, that of luminance, is concerned, and the register (IM) 511 is initialised to 128 for each pixel (step 431). The register (IT) is initialised to the value p (step 432).

If the contents of the counter 513 (CNT) are greater than zero, this means that at least one component has been decompressed and, at the step 433, the register (IM) 511 is loaded with the contents of the register (RE) 621, that is to say with the values corresponding to the previously decompressed component. This makes it possible to decrease the number of iterations p by two units (cf. step 434 where (IT) is initialised to the value p-2) since the initial image is very close to the final image. The calculation time is reduced by virtue of this characteristic.

The counter 513 (CNT) is next incremented by one unit (step 435).

When the three components have been decompressed, the test 401 is positive. The test 416 then consists of determining whether or not:
either the supplementary processing information present in the parameter and partitioning information header represents a usefulness to perform supplementary processing, or the zoom factor z has a value which makes supplementary processing useful (z being, for example, greater than or equal to 4).

When the result of the test 416 is negative, the end step 402 is performed directly. When the result of the test 416 is positive, the supplementary processing operation 417 is performed. This operation 417 consists of an operation known to persons skilled in the art under the name "post-processing", which refers to processing performed after the image decompression illustrated in FIG. 16. This processing has, in a known manner, spatial filtering, intended to reduce any boundary perception of the elementary subsets.

Preferentially, the parameters of this filtering are functions of the dimensions of the subset processed. For example, the dimensions of the filter used are proportional to those of the subset under consideration, on the one hand, and the number of pixels on which this filter is applied is proportional to each dimension of the elementary subset under consideration, on the other hand. According to each of these examples, the zoom factor plays a part in the parameterizing of the supplementary processing.

At the end of the operation 417, the end step 402 is performed. During the end step 402, the data relating to each of the three components are, in turn, copied into the output buffer (OBFR) 690 from where they are transferred to the decompressed data user means 682 (FIG. 7).

It can be seen here that, in order to obtain a reconstructed grey scale image, without colour, it is sufficient to perform primary processing only on the data coming from primary processing of the colour image luminance, this limitation furthermore being designated under the name of program 632.

Description of the Flow Diagram of the Configuration Program

The flow diagram of the configuration program used in the device 800 of FIGS. 9 and 9A will now be described with the help of FIG. 20.

The configuration program has the reference 831 in FIGS. 9A and 20.

The device 800 illustrated in FIG. 9A has four modes of operation which will be detailed below.

The mode of operation of the equipment is selected first of all (step 832). Selection of the mode is made by entering, into the register MOD 822, a value equal to 0, 1 or 2 and, into the register (CHTY), a value equal to 0 or 1. This recording may be carried out by any means within the capability of persons skilled in the art. In particular, it could be carried out by means of a switch arranged on the housing of the equipment 800 with four positions each corresponding to the desired mode of operation. This switch would make it possible to send the appropriate signals to the RAM memory 810, so as to load the values indicated into the registers MOD or (CHTY). This initialisation may also be carried out under similar conditions by means of a keyboard, not depicted in FIG. 9A.

At the step 833, a first test on the register MOD is carried out for the purposes of determining whether or not its contents are equal to zero. If the test 833 is positive, this means that the mode of operation chosen is the first of those mentioned above and the program 531 is implemented from data supplied from the data source 810, the compressed data being delivered at the output 881 to the compressed data user means 860 (FIG. 9).

If the test 833 is negative, a test is carried out, at the step 834, for the purposes of determining whether or not the contents of the register MOD are equal to 1.

If the test 834 is positive, a test 840 is then carried out on the contents of the register (CHTY) for the purposes of determining whether or not it is equal to 1.

If the test 840 is negative, this means that the device of FIGS. 9 and 9A is in the second mode of operation, that is to say in the one where it is used to restore the original data of a colour image from parameters (compressed data) and partitioning information, supplied at an input 881, from a source 861 (FIG. 9). The decompressed data delivered at an output 892 of the device 800 are intended for decompressed data user means 820.

If the test 840 is positive, this means that the device 800 is in the third mode of operation, that is to say the one where it is used to carry out secondary processing of compressed data and deliver data of a type other than that of the original data, in the case in point data relating to a grey scale image corresponding to an original colour image. In this case, the program 632 is implemented from parameters and partitioning information delivered by a compressed data source 861. The decompressed data are delivered at an output 892 and supplied to user means 820.

If the test 834 is negative, this means that the contents of the register MOD are equal to 2. The device 800, which is then in its fourth mode of operation, is used to transform a colour image into a grey scale image. Here this is an example of complex processing in the sense of the present invention, having a primary processing phase and a secondary processing phase.

Thus, in the embodiment described here, in accordance with this aspect of the invention, the primary processing and secondary processing programs are implemented sequentially.

The program 531 makes it possible, from data delivered by a non-compressed data source 810 on the input 891 of the device 800, to compress these data, in order to obtain parameters $a_i, b, A$ relating to each of the elementary subsets $K_i$ of the original image. These parameters and partitioning information are, in accordance with what has been described above with the help of FIG. 10, all present in the register (REG 1) 560 at the end of the program 531. The main program of FIG. 20 then orders a direct switch to the end of the step 404 of the program 631 described above.

The transformed data are then present in the buffer register (OBFR) 893 of the device 800 and transferred to the decompressed data user means 820. These data are those relating to a grey scale image corresponding to the colour image of which the data were transferred into the device 800 from the source 810.

It should be noted that the sub-program consisting of the set of steps 404, 452, 406, 450, 405 and 402 of the program 632 here constitutes a particular embodiment of a secondary processing method in the sense of the invention. It is this particular sub-program which is implemented here following the program 631 in order to constitute an example of "complex" processing in the sense of the present invention.

3. Description of a preferred variant using working subsets having a size different from that of the corresponding elementary subset When the working subsets have the same dimension as the elementary subsets with which they are associated, and the contractive mapping is linear over each working subset, the reconstructed image cannot have, in the elementary subset under consideration, a complexity greater than it has in each working subset.

Moreover, the convergence of the method of successive approximations may be relatively slow.

For these two reasons, and at least in the case of the use of multilinear contractive mappings, it is preferable to use working subsets having dimensions greater than those of the elementary subsets.

Also, there will now be described with the help of FIGS. 3A, 10, 11, 12A, 13 to 16 and 17A, a preferred variant implementation of the method and device described above, in which at least one working subset has a size different from that of the corresponding elementary subset. In the particular embodiment of this variant, four working subsets are associated with each elementary subset, these four working subsets having dimensions greater than those of the corresponding elementary subset.

The image to be processed is here an image of 512×512 pixels initially partitioned into square subsets of 32×32 pixels, in accordance with what has been described above with the help of FIG. 1.

The initial division of the image into working subsets will now be described, being aware that each supplementary partitioning of an elementary subset gives rise to the definition of working subsets of dimensions proportional to those of this elementary subset. The working subsets have here a size double that of the elementary subsets, so that the 512×512 pixel image is divided into square subsets of 64×64 pixels. However, so that four working subsets correspond to one given elementary subset (see FIG. 3A), the displacement used for division of the image is 32 pixels, division of the image then resulting in a tiling.

In FIG. 3A the elementary subset $K_i$ having the coordinates $(x_i,y_i)$ is illustrated in thick lines, while the corresponding working subsets are illustrated in dotted lines, the other subsets being outlined in thin lines. It can be seen that, in this embodiment, to each subset $K_i$, four working subsets $L_j$ (numbered $L_1, \ldots, L_4$) are linked, displaced by 64 pixels in both directions and placed symmetrically with respect to the subset $K_i$ under consideration. In reality it is the four subsets resulting from the division which cover the elementary subset under consideration (resulting from the initial partitioning). The expressions below show the coordinates of a subset $K_i$ and the working subsets $L_1, \ldots, L_4$, for all values of the division factor A

TABLE 2

$K_i : [x_i, x_i - 1 + (32/2^A)] \times [(y_i, y_i - 1 + (32/2^A)]$
$L_1 : [x_i - (48/2^A), x_i - 1 + (16/2^A)] \times [(y_i + (16/2^A), y_i - 1 + (80/2^A)]$
$L_2 : [x_i + (16/2^A), x_i - 1 + (80/2^A)] \times [(y_i + (16/2^A), y_i - 1 + (80/2^A)]$
$L_3 : [x_i - (48/2^A), x_i - 1 + (16/2^A)] \times [(y_i - (48/2^A), y_i - 1 + (16/2^A)]$
$L_4 : [x_i + (16/2^A), x_i - 1 + (80/2^A)] \times [(y_i - (48/2^A), y_i - 1 + (16/2^A)]$ It should be stated here that the points of the working subsets defined above which do not belong to the image, that is to say those of which at least one of the coordinates is negative, artificially have a mean value associated, for example 127, for each component.

The compression and decompression devices used to implement this variant implementation are similar to those described with the help of FIGS. 4 and 6. However, the programs 531 and 631 are modified as will be explained below.

As regards first of all the compression program 531 described above with the help of FIG. 10, its structure is retained. Only the operation 250 changes. This modified operation 250A will be described below with the help of FIG. 12A.

At the step 250A, the search for the four related working subsets $L_1$, $L_2$, $L_3$, $L_4$ (see FIG. 3A) from the address recorded in the register CSI is carried out. To this end, the rule stated above is applied.

The aim of the step 250A is to determine the values f(x,y) of the component under consideration, associated with each pixel of the working subsets $L_1, L_2, L_3, L_4$ linked geometrically and in a predetermined manner to the elementary set $K_i$ under consideration. The set of values f(x,y) linked to the pixels of the subset $L_1$ (respectively $L_2$, $L_3$ and $L_4$) will be denoted hereinafter $f(L_1)$ (respectively $f(L_2)$, $f(L_3)$ and $f(L_4)$) in accordance with the notations used above.

The essential element which differentiates the step 250A (FIG. 12A) from the step 250 (FIG. 12), resides in the fact that the set of values represented by $f(L_i)$, i=1, . . . ,4 concerns working subsets $L_i$, i=1, . . . ,4 which have a size different from that of the elementary subset $K_i$. In order to be able to execute the comparison operations with the subset $K_i$, it is necessary to reduce the sets $f(L_i)$ to the same size. A number of methods are available to persons skilled in the art. In this embodiment where the size of the working subsets is 64×64 pixels and that of the elementary subsets 32×32 pixels, a mean value per square of 4 pixels is adopted. The set of these mean values will be denoted for a working set $L_i$ under consideration $f(L_{i/2})$. The detailed flow diagram of this step is depicted in FIG. 12A.

Figure 12A:
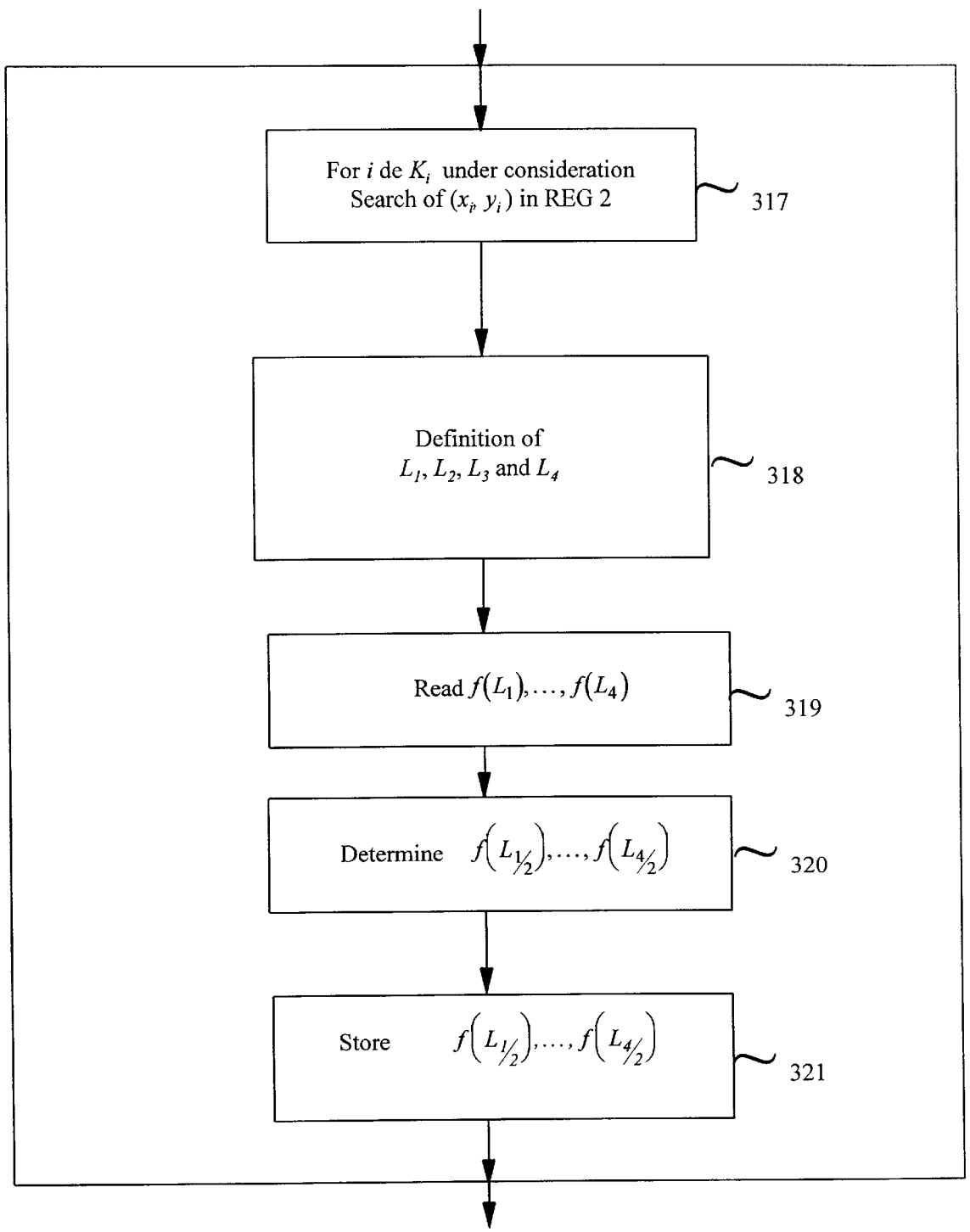
Figure 12B:
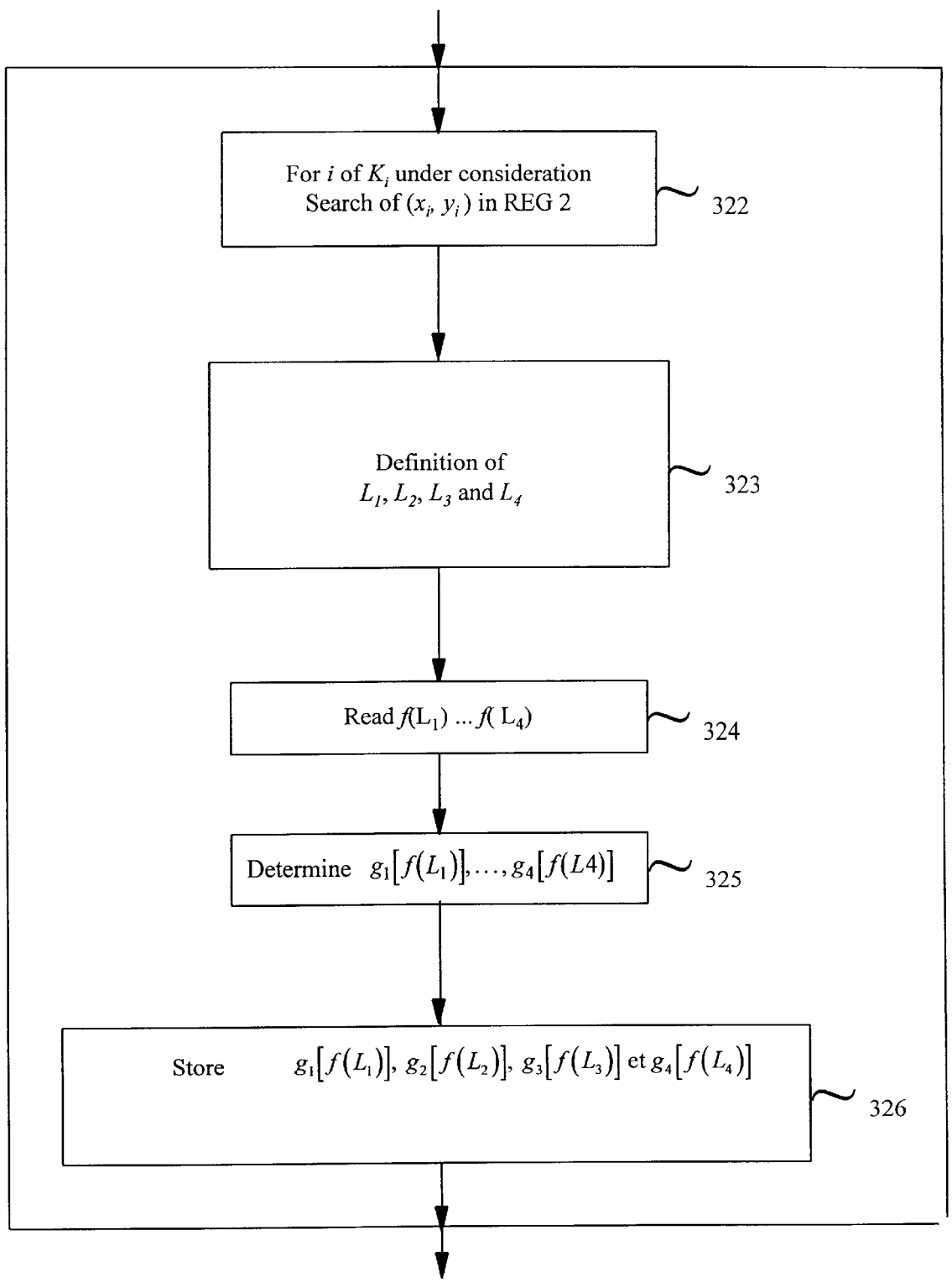

With reference to FIG. 12A at the step 317, the coordinates $(x_i,y_i)$ of the lower left pixel of the elementary subset $K_i$ under consideration and the division factor A are copied into the arithmetic unit 550 and stored in the register (REG 2) 570. Next, the arithmetic unit 550 determines the coordinates of each pixel of each working subset according to Table 2 as indicated at the step 318.

At the step 319, the arithmetic unit 550 will search, for the component in the course of processing, for the value corresponding to each of the $(64/2^A)^2$ pixels of $L_1$ (respectively $L_2$, $L_3$ and $L_4$) and stores the set of the $(64/2^A)^2$ values in the register $f(L_1)$ 516 (respectively $f(L_2)$ 517, $f(L_3)$ 518 and $f(L_4)$ 519) of the cache 514.

At the step 320, the arithmetic unit 550 processes each square of 2×2 values of $f(L_1)$ and substitutes for them a corresponding value of $f(L_{1/2})$ at the register 516. In this embodiment the corresponding value of $f(L_{1/2})$ will be obtained by calculating the mean of the values of the said square of 2×2 values of $f(L_1)$. The other sets $f(L_2), \ldots, f(L_4)$ are then processed in the same way.

At the step 321, the values of $f(L_{1/2}), \ldots, f(L_{4/2})$ are stored in the part 514 (CACHE) of the random access memory 510, in the registers $f(L_1)$ 516 to $f(L_4)$ 519.

The program next switches to the step 208 (FIG. 13) during which, as indicated above, the parameters $a_i$ (in the case in point $a_1$, $a_2$, $a_3$, $a_4$) and b are calculated using the method of least squares with the constraints described above (see equations 12 and 13). However, in this embodiment, the value of β will be less than $\sqrt{2}/_n$.

It can be seen that this latter value is higher than that used in the first embodiment. This is because, insofar as, during the step 320, substitution working subsets, of which the value of each pixel is calculated as the mean of the values of four pixels of the initial image, were placed in the registers 516 to 519, a contractive mapping has already been performed. The constraints applied to the contractivity of the global mapping which follows this substitution may consequently be reduced.

The operation of the compression program is, for the remainder, identical to the operation of the compression program 531 described above with the help of FIG. 10. The only difference being that, in the registers 516 to 519, the values $f(L_{1/2}), \ldots, f(L_{4/2})$ are stored.

In this implementation variant, the decompression program operates in a similar manner to the program 631 described above with the help of FIGS. 16 and 17. However, the operation 410 must be modified as explained below and will be referenced as 410A, illustrated in FIG. 17A.

The detail of the step 410A is described with the help of FIG. 17A.

The step 410A itself comprises the steps 459 to 465: The steps 459 and 460 are identical to the steps 411 and 412 described above (FIG. 17), but they take into account, for the definition of the elementary subsets and working subsets, the so-called "zoom" multiplying factor z which multiplies each of their dimensions in a set of data which itself has dimensions which are multiplied by this zoom factor.

The program next switches to the steps 461, 462 and 463 during which the values $f(L_1), \ldots, f(L_4)$ are determined. Next at the step 462 the values $f(L_{1/2}), \ldots, f(L_{4/2})$ are determined. To do this, the arithmetic unit 550 processes each square of 4 values of $f(L_1)$ and substitutes for them a corresponding value of $f(L_{1/2})$ at the register 516. In this embodiment the corresponding value of $f(L_{1/2})$ is obtained by calculation of the mean of the values of the said square or any other low-pass filtering well known to persons skilled in the art. The other sets $f(L_2), \ldots, f(L_4)$ are then processed in the same way. At the step of 463, for each pixel (x,y) of $K_i$, the value $$\sum_{i=1}^{4} a_i \cdot \left[ f\left(\frac{L_i}{2}\right)\right](x, y) + b$$

is calculated with the help of the coefficients from 520 and the data $f(L_{1/2}), \ldots, f(L_{4/2})$ from 516 to 519 (step 462), and this value is stored (step 463) at the corresponding pixel in the register (RE) 621 of the RAM 610.

Finally, the step 464 is identical to the step 414 (FIG. 17).

The operation of the modified decompression program as explained above with the help of FIG. 17A is for the remainder identical to the operation of the decompression program 631 described above with the help of FIG. 16.

In this implementation variant, complex processing may also be carried out, making it possible to transform data, as described above with the help of FIG. 20, using the programs for compression 531 and decompression 631 modified as explained above with the help of FIGS. 10, 11, 12A, 13, 14 and 17A.

4. Description of an implementation variant using a global contractive mapping composed of non-linear mappings In this variant implementation of methods and devices in accordance with the invention, a global contractive mapping composed of non-linear mappings is used.

In this variant implementation, which also concerns image compression and decompression, the image to be processed is also a 512×512 pixel image. This image is initially partitioned into elementary subsets and divided into working subsets in the same way as described above with the help of FIGS. 1 to 3.

The global mapping used in a particular mode of this variant implementation will now be defined.

In accordance with this aspect of the invention, each "piece" of the global contractive mapping is a non-linear Lipschitz elementary mapping of the type:

$$T(f)|_{Ki} : (x, y) \in Ki \to [T(f)](x, y) = \sum_{j=1}^{n} a_j \cdot g_j[f]|_{Lj}(x, y) + b \quad (10\,b)$$

where:

| | |
|---|---|
| $T(f)\|_{Ki}$ | the restriction of T(f) to the elementary subset $K_i$ |
| $g_1[f], \ldots, g_n[f]$ | are non-linear transformations of $f(g_i \in F(E,E))$ such as fractional or integer powers of f (for example $g[f] = \sqrt{f}$), |
| n > 1 | the number of working subsets (n = 4 in this embodiment) |
| $a_1, \ldots a_n$ | the multiplying coefficients |
| b | the translation factor |
| $L_1, \ldots L_n$ | the working subsets, at predetermined position with respect to $K_i$ and linked to this subset. |

It can be seen that the equation (10 b) above is by nature non-linear essentially because of the non-linear transformations $g_1, \ldots, g_n$, the coefficients $a_j$, j=1, ..., n and b being respectively the multiplying coefficients and the translation factor. The coefficients $(a_1, \ldots, a_n, b)$, are here the "parameters" in the sense of the invention of the elementary mapping relating to the subset $K_i$. The set of coefficients $(a_1, \ldots, a_n, b)_{Ki}$ relating to the m elementary subsets $(K_1, \ldots, K_m)$ here also constitutes the "set of parameters" of the global contractive mapping in the sense of the invention.

It should be stated that, in this embodiment, n=4, which means that only four working subsets $L_j$, j=1, ..., n such as those defined with the help of FIG. 3, are linked to each elementary subset $K_i$.

Thus a value calculated from the non-linear equation (10 b) is associated with each pair of values (x,y) of a specific elementary subset $K_i$. This is carried out for all the m elementary subsets $(K_1, \ldots, K_m)$ resulting both from the initial partitioning and from supplementary partitionings, as described above.

In order to solve the simplified optimisation problem (see above, notably equation (7)) which makes it possible to determine the coefficients of the non-linear mapping $a_j$, j=1, ..., n and b for each elementary working subset $K_i$, it is necessary, generally speaking, for each elementary subset $K_i$, to minimise the distance between the restriction to the elementary subset $K_i$ and its transform by the global contractive mapping. In other words, it is necessary to minimise the distances:

$$d(f|_{Ki}, T(f)|_{Ki}), i=1, \ldots m \quad (11)$$

In this respect, the theory explained with the help of equations (12) to (29) in the part relating to the general theory is applied.

Furthermore, it should be noted that, generally speaking, in this variant implementation, the method of secondary representation of the parameters resulting from the primary processing of initial data, in accordance with the variant described above, uses the general principles described above with the help of equations (30) to (32).

The compression and decompression devices used to implement this variant implementation are similar to those described above with the help of FIGS. 4 and 6. However, the programs 531 and 631 are modified as will be explained below.

As regards first of all the compression program 531 described above with the help of FIG. 10, its structure is retained. Only the step 251 relating to the calculations of the coefficients changes. This variant of the step 251 (referenced as 251B) will now be described notably with the help of FIG. 12B.

The step 251B has the steps 322 and 323 respectively identical to the steps 217 and 218 described above with the help of FIG. 12. At the step 324, the values $f(L_1), \ldots, f(L_4)$ are read from the register (IM) 511.

At the step 325, the values $g_1[f(L_i)], \ldots, g_4[f(L_4)]$, are determined, calculating by mapping of the formula $g_i[f(L_i)]_* = \sqrt{f(Li)}$.

Finally, at the step 326, the values $g_1[f(L_i)], \ldots, g_4[f(L_4)]$ are stored in the registers 516 to 519 of the part 514 (CACHE) of the random access memory 510.

The functioning of the compression program with the operation 250 modified as just described is, for the remainder, identical to the functioning of the program 531 described above with the help of FIG. 10.

Likewise, in this variant implementation, the decompression program functions in a manner similar to the program 631 described above with the help of FIGS. 16 and 17. However the operation 410 must be modified as explained below. This new operation is referenced 410B and is illustrated in FIG. 17B.

The detail of the step 410B will now be described with the help of FIG. 17B. The step 410B itself comprises the steps 471 to 475:

At the step 471, the coordinates $(x_i, y_i)$ of the elementary subset $K_i$ under consideration are extracted and copied into the register CSI 515. The coefficients$(a_1, \ldots, a_4, b)$ relating to the subsets $K_i$ under consideration are copied from the register (REG 1) to the register 520 of the part 614 (CACHE) of the random access memory 610.

The aim of the step 472 is to determine the working subsets linked geometrically and in a predetermined manner to the elementary set $K_i$ under consideration. This step has the same operations as at the step 250 described above with the help of FIG. 12. The values $g_1[f]|_{L_1}, g_2[f]|_{L_2}, g_3[f]|_{L_3}$ and $|g_4[f]|_{L_4}$ of the pixels relating respectively to $L_1, L_2, L_3$ and $L_4$ are respectively copied into the registers 516, 517, 518 and 519 of the (CACHE) 614.

The program next switches to the steps 473 and 474 during which, for each pixel (x,y) of $K_i$, the value $$\sum_{i=1}^{4} a_i \cdot [g_i[f]|_{L_i}](x, y) + b$$

is calculated with the help of the coefficients stored in the register 520 and the data $f(L_1), \ldots, f(L_4)$ stored in the register 516 to 519, (step 474) and this value is stored at the corresponding pixel in the register (RE) 621 of the random access memory RAM 610.

In this variant implementation complex processing may also be carried out, making it possible to transform data as described above with the help of FIG. 20, using programs for compression 531 and decompression 631 modified as explained above with the help of FIGS. 12B and 17B.

5. Description of a variant implementation using a quality criterion measured with the help of the global contractive mapping According to a variant, the quality criterion used to determine the necessity of performing a supplementary partitioning is not, as presented with reference to FIG. 19, the comparison, on the one hand, of a statistical measurement performed on the levels of the component under consideration in an elementary subset with, on the other hand, a threshold, but the comparison of a measurement of difference between, on the one hand, the image obtained after having applied a global contractive mapping to it, with that initial image.

This variant is illustrated in FIG. 20, in which the tests and operations common with FIG. 19 have the same references. In this variant, following the operation 206, the operation 250 is carried out, taking into account the up-to-date value of the division factor A even if this value is not the value which will, ultimately, be associated with the elementary subset under consideration. The operation 250 determines, it may be recalled, the working subsets associated with the elementary subset under consideration.

Next, the operation 260 is identical to the operation 251 (FIG. 19) apart from the storing in the memory register 560 (REG 1). It therefore supplies parameters of the global contractive mapping, in the elementary subset under consideration. The test 255 follows the operation 260 and determines, as explained above, whether or not the elementary subset has minimum dimensions.

When the result of the test 255 is positive, the operation 263 consists of storing in the register 560 (REG 1) the five parameters determined during the operation 260, without associating any partitioning information with them since no new supplementary partitioning has taken place. Next, the test 205 is reiterated.

When the result of the test 255 is negative, the operation consists of determining a so-called "quality" criterion applicable to the elementary subset under consideration. Preferentially, definition of the quality criterion consists of definition of a threshold below which the quality criterion is considered to be met. Preferentially also, the value of the threshold takes account of the dimensions of the elementary subset under consideration. In the embodiment described and depicted this threshold is the function corresponding to the following table:

| dimensions of the subset in pixels | threshold |
| --- | --- |
| 2 × 2 | 800 |
| 4 × 4 | 640 |
| 8 × 8 | 400 |
| 16 × 16 | 240 |
| 32 × 32 | 80 |

It can be seen here that it is preferable to use a table corresponding to a decreasing function.

The test 254 next determines whether or not the quality criterion is met. In the embodiment described and depicted, it is met when the measurement of the mean square deviation between the component under consideration and its image by the global contractive mapping, a measurement restricted to the elementary subset under consideration, is less than the value of the threshold which corresponds, in the above table, to the dimensions of the elementary subset under consideration.

When the result of the test 254 is negative, the operation 256 consists of performing a supplementary partitioning of the elementary subset under consideration. In the embodiment described and depicted, this supplementary partitioning consists of dividing each elementary subset into four equal square elementary subsets. To this end, during the operation 256, there is added, at the head of the list sub_image_list, the coordinates of the four points which define the lower left corners of the four elementary subsets resulting from the supplementary partitioning.

With these coordinates is associated a division factor A which is equal to the division factor of the elementary subset which is being partitioned, incremented by the value 1. Finally, partitioning information equal to "1" is stored in the register 560 (REG 1) since a supplementary partitioning has been performed.

When the result of the test 254 is positive, the five parameters determined during the operation 260 are stored in the register 560 (REG 1) with partitioning information equal to "0" since no supplementary partitioning has taken place.

In the variant explained in FIG. 20, it is advantageous to measure the mean of the values of the mean square deviation of all the elementary subsets processed for which this deviation is measured during the operation 254, in order to determine the usefulness of a supplementary processing during the secondary processing: when this mean is greater than a predetermined global critical value, it is useful to provide a supplementary processing.

It can be seen here that the variants presented with reference to FIGS. 19 and 20 combine together particularly well, making the operation 262 of FIG. 20 follow at the end of the operations 258 of FIG. 19.

According to variants, not depicted, the supplementary partitionings are performed by performing a non-homothetic division of the elementary subsets, such as for example a division into triangles, into two equal rectangles, successively forming two rectangles side by side horizontally or vertically, etc.

According to another variant, the zoom factor is not uniform. It may thus, for example, have a horizontal value, which serves as a multiplying coefficient for the horizontal dimensions of the elementary subsets and a vertical value which serves as a multiplying coefficient for the vertical dimensions of the elementary subsets. The zoom factor may also have a value which varies according to the distance to the centre of the image, etc.

According to another, preferential, variant, the zoom factor is different for the different components of the processed image. For example, the zoom factor is double, for each chrominance component, what it is for the luminance component. In this case, a filtering is performed preliminary to the primary processing (that is to say here the compression), a filtering which divides the resolution of the chrominance components by a factor of two in each direction, giving, to each component of each pixel of the image of smaller resolution, the mean value of the corresponding component of four pixels of the initial image. This factor is transmitted in the header in the form of the above-mentioned ratio.

Jointly, the number of initial data items used for reconstruction of the luminance component is, in each direction, double what it is for each of the chrominance components. This is because it is common that the complexity of the chrominance components is less than that of the luminance component, on the one hand, and that this complexity is perceived less by the human eye.

In combination with this latter variant, the primary processing device is adapted to perform, before the operations illustrated in FIG. 10, a filtering of the chrominance components in order to divide their resolution by two in each direction of the image.

Of course the present invention is in no way limited to the embodiments chosen and depicted but, on the contrary, encompasses all variants within the capability of persons skilled in the art.

What is claimed is:

1. A method for encoding a digital signal (IM, f), such as a digital image, after the digital signal is initially partitioned into initial elementary subsets ($K_1$), the method comprising, for each elementary subset, the steps of:

comparing a dimension of the elementary subset with a predetermined minimum dimension;

estimating a division suitability criterion if the subset has a dimension larger than the predetermined minimum dimension;

supplementary partitioning the elementary subset into smaller elementary subsets if the division suitability criterion is met;

reiterating the comparing, estimating, and supplementary partitioning steps for each of the smaller elementary subsets;

constructing an elementary mapping of a plurality of working subsets in the elementary subset, if either the subset has a dimension equal to or smaller than the predetermined minimum dimension or the division suitability criterion is not met;

determining a set of parameters ($a_i$, b) associated with a global contractive mapping from the plurality of working subsets to the elementary subset, the fixed point of the global contractive mapping constituting an approximation of the elementary subset; and encoding the set of parameters ($a_i$, b) determined in the determining step to provide encoded parameters constituting a primary representation of the encoded digital signal.

2. A memory, said memory storing software instructions allowing implementation of a method according to claim 1.

3. A memory according to claim 2, said memory also storing parameters and partitioning information resulting from the performance of the method.

4. A method according to claim 1, further comprising, when at least one supplementary partitioning step is performed, a step of further encoding a set of partitioning information representing a result of the at least one supplementary partitioning step in order to constitute, together with the encoded parameters ($a_i$, b), the primary representation of the encoded digital signal.

5. A method according to either claim 1 or 4, wherein at least one iteration of the estimating step, the estimating step comprises a step of measuring a predetermined statistical quantity applied to data of the elementary subset.

6. A method according to claim 5, wherein the statistical quantity measured in the measuring step is a variance of the elementary subset.

7. A method according to either claim 1 or 4, wherein the estimating step is reiterated at least once after the constructing step is performed, the estimating step includes a step of measuring a difference between data of the elementary subset and a restriction of the global contractive mapping under construction to the elementary subset, and, after the step of supplementary partitioning the elementary subset is performed, another constructing step is performed based on a result of the supplementary partitioning step.

8. A method according to claim 7, wherein the step of measuring the difference includes measuring a distance between the data of the elementary subset and the restriction of the global contractive mapping under construction.

9. A method according to claim 5, wherein the at least one iteration of the estimating step also includes a step of comparing the measured predetermined statistical quantity to a predetermined value.

10. A method according to claim 9, wherein the division suitability criterion is not met when the measured predetermined statistical quantity is less than the predetermined value.

11. A method according to either claim 1 or 4, wherein the global contractive mapping is at least partially composed of elementary Lipschitz mappings each linked to an elementary subset ($K_i$).

12. A method according to either claim 1 or 4, wherein, during the constructing step, for each of the elementary subsets ($K_i$), a plurality of working subsets ($L_i$) geometrically linked in a predetermined manner to the elementary subset are taken into account.

13. A method according to claim 12, wherein at least one working subset ($L_i$) has a different size than that of a corresponding elementary subset ($K_i$).

14. A method according to claim 9, further comprising a step of determining the predetermined value based on the dimension of a corresponding elementary subset.

15. A method according to either claim 1 or 4, wherein the parameters representing a first digital signal enable the use, on a second digital signal having a number of data items different from a number of data items in the first digital signal, of a method of successive approximations converging towards a fixed point of another type of global contractive mapping.

16. A method for decoding a set of parameters ($a_i$, b) associated with at least one item of partitioning information resulting from an encoding of a first digital signal, the method comprising the steps of:

determining dimensions of elementary subsets constituting a partitioning of a second digital signal, based on the presence of partitioning information corresponding to the elementary subsets;

determining each elementary mapping corresponding to an elementary subset based on at least one parameter from the set of parameters; and approximating the second digital signal from the set of parameters ($a_i$, b) and the dimensions determined in the determining step, by performing successive approximations converging towards a fixed point of a global contractive mapping, using at least one mapping belonging to a group of mappings composed of multidimensional mappings and nonlinear mappings, wherein restrictions of the global mapping to the elementary subsets ($K_i$) are composed of the elementary mappings.

17. A memory, said memory storing software instructions allowing implementation of a method according to claim 16.

18. A method according to claim 16, wherein each elementary subset is linked to a plurality of working subsets, and an elementary mapping of the working subsets in the elementary subset is determined by parameters from the set of parameters.

19. A method according to claim 18, wherein the partitioning information represents partitions of initial elementary subsets into smaller elementary subsets after a supplementary partitioning step is performed during the encoding of the first digital signal.

20. A method for processing a digital signal (IM, f), such as a digital image, after the digital signal is initially partitioned into initial elementary subsets ($K_1$), the method comprising an encoding phase which comprises, for each elementary subset, the steps of:

comparing a dimension of the elementary subset with a predetermined minimum dimension;

estimating a division suitability criterion if the subset has a dimension larger than the predetermined minimum dimension;

supplementary partitioning the elementary subset into smaller elementary subsets if the division suitability criterion is met;

reiterating the comparing, estimating, and supplementary partitioning steps for each of the smaller elementary subsets;

constructing an elementary mapping of a plurality of working subsets in the elementary subset, if either the subset has a dimension equal to or smaller than the predetermined minimum dimension or the division suitability criterion is not met;

determining a set of parameters ($a_i$, b) associated with a global contractive mapping from the plurality of working subsets to the elementary subset, the fixed point of the contractive global mapping constituting an approximation of the elementary subset;

encoding the set of parameters ($a_i$, b) determined in the determining step to provide encoded parameters constituting a primary representation of the encoded digital signal;

determining dimensions of elementary subsets constituting a partitioning of a second digital signal, based on the presence of partitioning information which is associated with the set of parameters ($a_i$, b) and corresponds to the elementary subsets;

determining each elementary mapping corresponding to an elementary subset based on at least one parameter from the set of parameters; and approximating the second digital signal from the set of parameters ($a_i$, b) and the determined dimensions, by performing successive approximations converging towards a fixed point of another global contractive mapping, using at least one mapping belonging to a group of mappings composed of multidimensional mappings and nonlinear mappings, wherein restrictions of the global contractive mapping to the elementary subsets ($K_i$) are composed of the elementary mappings.

21. A method according to any one of claims 16 to 20, wherein, during the approximating step, the set of parameters ($a_i$, b) associated with an item of partitioning information and a set of arbitrary data, referred to as an initialization set, are taken into account, and wherein the approximating step comprises the steps of:

$C_1$) partitioning the initialization set into elementary subsets ($K_i$), the elementary subsets carrying out the partitioning corresponding to the partitioning information;

$C_2$) considering for each elementary subset ($K_i$), the parameters ($a_i$, b) of the elementary mappings corresponding to the elementary subsets ($K_i$), and implementing the elementary mappings on the elementary subsets ($K_i$) of the initialization set;

$C_3$) combining all the data obtained by implementations of elementary mappings in order to constitute an intermediate representation of the initialization set affected by an error; and $C_4$) reiterating the steps $C_1$–$C_3$, taking, as the initialization set, the intermediate representation, so as to approach said fixed point of the global contractive mapping, wherein a set of data ultimately obtained constitutes a secondary representation (RE) of the digital signal having been encoded.

22. A method according claim 20, wherein the global contractive mappings are identical to one another.

23. A method according to any one of claims 16–20 or 22, wherein the parameters ($a_i$, b) and the partitioning information are a primary representation of a color image with a number of components (Y, Cr, Cb), and wherein, after an approximating step is performed on one of the components, a secondary representation (RE) obtained in the approximating step relating to one of the components already processed is used as the initialization set in the approximating step relating to a next component.

24. A method according to any one of claims 16–20 or 22, wherein the parameters ($a_i$, b) and the partitioning information are a primary representation of a color image with a number of components (Y, Cr, Cb), and wherein the approximating step corresponding to each individual component uses initialization sets composed of arbitrary data for the processing of the parameters ($a_i$, b) relating to each component, and also uses a method of successive approximations converging towards said fixed point of the global contractive mapping corresponding to the individual component.

25. A method according to any one of claims 16–20 or 22, wherein the parameters ($a_i$, b) and the partitioning information of the global contractive mapping are determined to enable the use, on a second digital signal having a different number of data items than a number of data items in the first digital signal, of a method of performing successive approximations converging towards said fixed point of the global contractive mapping, and wherein the determined set of parameters ($a_i$, b) and partitioning information constitute a primary representation of the first digital signal.

26. A method according to claim 25, further comprising the steps of:
initially partitioning the first digital signal into initial elementary subsets;
determining, for each elementary subset ($K_i$), the parameters ($a_i$, b) of the elementary mapping which constitutes a restriction of the global contractive mapping to the elementary subset,
performing a method of successive approximations on the second digital signal to take into account elementary subsets, each corresponding to an elementary subset of the first digital signal and having a number of data items different from that of the corresponding elementary subset of the first digital signal.

27. A method according to claim 26, wherein the numbers of data items in the elementary subsets of the second digital signal are proportional to the numbers of data items in the elementary subsets of the first digital signal which respectively correspond to them.

28. A method according to claim 26, wherein during the constructing step, for each elementary subset ($K_i$) resulting from the initial partitioning and any supplementary partitionings, a plurality of working subsets ($L_i$) are considered, and an elementary mapping of the plurality of working subsets in the elementary subset is constructed by determining the parameters ($a_i$, b) of the elementary mapping, and wherein the method of successive approximations performed on the second digital signal is allowed to take into account working subsets, each corresponding to a working subset of the first digital signal and having a number of data items different from that of the corresponding working subset of the first digital signal.

29. A method according to claim 28, wherein the numbers of data items in the working subsets of the second digital signal are proportional to the numbers of data items in the working subsets of the first digital signal which respectively correspond to them.

30. An encoding apparatus for encoding a digital signal (IM, f), such as a digital image, after the digital signal is initially partitioned into initial elementary subsets ($K_1$), the encoding apparatus comprising:
a comparer arranged for comparing, for each elementary subset, a dimension of the elementary subset with a predetermined minimum dimension;
an estimator arranged for estimating a division suitability criterion if the subset has a dimension larger than the predetermined minimum dimension;
a partitioner for supplementary partitioning the elementary subset into smaller elementary subsets if the division suitability criterion is met, wherein said comparer, said estimator, and said partitioner reiterate the comparing, estimating, and supplementary partitioning operations, respectively, for each of the smaller elementary subsets;
an elementary mapping constructor arranged for constructing an elementary mapping of a plurality of working subsets in the elementary subset, if either the subset has a dimension equal to or smaller than the predetermined minimum dimension or the division suitability criterion is not met;
a determiner arranged for determining a set of parameters ($a_i$, b) associated with a global contractive mapping from the plurality of working subsets to the elementary subset, the fixed point of the global mapping constituting an approximation of the elementary subset; and
an encoder arranged for encoding the set of parameters ($a_i$, b) determined by said determiner to provide encoded parameters constituting a primary representation of the encoded digital signal.

31. A camera, said camera having an apparatus according to claim 30.

32. A facsimile device, said facsimile device having an apparatus according to claim 30.

33. An apparatus according to claim 30, wherein, when said partitioner performs at least one supplementary partitioning operation, said encoder further encodes a set of partitioning information representing a result of the at least one supplementary partitioning operation in order to constitute, together with the encoded parameters ($a_i$, b), the primary representation of the encoded digital signal.

34. An apparatus according to either claim 30 or 33, wherein the estimator performs at least one iteration of the estimating operation by measuring a predetermined statistical quantity applied to data of the elementary subset.

35. An apparatus according to claim 34, wherein the measured predetermined statistical quantity is a variance of the elementary subset.

36. An apparatus according to either claim 30 or 33, wherein the estimator reiterates the estimating operation at least once after the elementary mapping constructor performs the constructing operation, and performs the estimating operation by measuring a difference between data of the elementary subset and a restriction of the global contractive mapping under construction to the elementary subset, and, after the operation of supplementary partitioning the elementary subset is performed by the partitioner, the elementary mapping constructor performs another constructing operation based on a result of the supplementary partitioning operation.

37. An apparatus according to claim 36, wherein the estimator measures the difference by measuring a distance between the data of the elementary subset and the restriction of the global contractive mapping under construction.

38. An apparatus according to claim 34, wherein the estimator also performs the estimating operation by comparing the measured predetermined statistical quantity to a predetermined value.

39. An apparatus according to claim 38, wherein the division suitability criterion is not met when the measured predetermined statistical quantity is less than the predetermined value.

40. An apparatus according to either claim 30 or 33, herein the global contractive mapping is at least partially composed of elementary Lipschitz mappings each linked to an elementary subset ($K_i$).

41. An apparatus according to claim 30 or 33, wherein, during the constructing operation performed by the elementary mapping constructor, for each of the elementary subsets ($K_i$), a plurality of working subsets ($L_i$) geometrically linked in a predetermined manner to the elementary subset are taken into account.

42. An apparatus according to claim 41, wherein at least one working subset ($L_i$) has a different size than that of a corresponding elementary subset ($K_i$).

43. An apparatus according to claim 38, further comprising a value determiner arranged for determining the predetermined value based on the dimension of a corresponding elementary subset.

44. An apparatus according to claim 30 or 33, wherein the parameters representing a first digital signal enable the use, on a second digital signal having a number of data items different from a number of data items in the first digital signal, of a method of successive approximations converging towards a fixed point of another type of global contractive mapping.

45. A decoding apparatus for decoding a set of parameters ($a_i$, b) associated with at least one item of partitioning information resulting from an encoding of a first digital signal, the apparatus comprising:
a dimension determiner arranged for determining dimensions of elementary subsets constituting a partitioning of a second digital signal, based on the presence of partitioning information corresponding to the elementary subsets;
an elementary mapping determiner arranged for determining each elementary mapping corresponding to an elementary subset based on at least one parameter from the set of parameters; and
a digital signal approximator arranged for approximating the second digital signal from the set of parameters ($a_i$, b) and the dimensions determined by said dimension determiner, by performing successive approximations converging towards a fixed point of a global contractive mapping, using at least one mapping belonging to a group of mappings composed of multidimensional mappings and nonlinear mappings, wherein restrictions of the global mapping to the elementary subsets ($K_i$) are composed of the elementary mappings.

46. An apparatus according to claim 45, wherein each elementary subset is linked to a plurality of working subsets, and an elementary mapping of the working subsets in the elementary subset is determined by parameters from the set of parameters.

47. A data processing device incorporating an apparatus according to claim 30 and an apparatus according to claim 45.

48. A data processing device according to claim 47, wherein the global contractive mappings are identical to one another.

49. A printer, said printer having an apparatus according to claim 45.

50. A photocopier, said photocopier having an apparatus according to claim 45.

51. An apparatus according to claim 46, wherein the partitioning information represents partitions of initial elementary subsets into smaller elementary subsets after a supplementary partitioning operation is performed during the encoding of the first digital signal.

52. An apparatus for processing a digital signal (IM, f), such as a digital image, after the digital signal is initially partitioned into initial elementary subsets ($K_1$), the apparatus comprising:
a comparer arranged for comparing, for each elementary subset, a dimension of the elementary subset with a predetermined minimum dimension;
an estimator arranged for estimating a division suitability criterion if the subset has a dimension larger than the predetermined minimum dimension;
a partitioner arranged for supplementary partitioning the elementary subset into smaller elementary subsets if the division suitability criterion is met, wherein the comparer, estimator, and partitioner reiterate the comparing, estimating, and supplementary partitioning operations, respectively, for each of the smaller elementary subsets;
an elementary mapping constructor arranged for constructing an elementary mapping of a plurality of working subsets in the elementary subset, if either the subset has a dimension equal to or smaller than the predetermined minimum dimension or the division suitability criterion is not met;
a parameter determiner arranged for determining a set of parameters ($a_i$, b) associated with a global contractive mapping from the plurality of working subsets to the elementary subset, the fixed point of the global contractive mapping constituting an approximation of the elementary subset;
an encoder arranged for encoding the set of parameters ($a_i$, b) determined by said parameter determiner to provide encoded parameters constituting a primary representation of the encoded digital signal;
a dimension determiner arranged for determining dimensions of elementary subsets constituting a partitioning of a second digital signal, based on the presence of partitioning information which is associated with the set of parameters ($a_i$, b) and corresponds to the elementary subsets;
an elementary mapping determiner arranged for determining each elementary mapping corresponding to an elementary subset based on at least one parameter from the set of parameters; and
a digital signal approximator arranged for approximating the second digital signal from the set of parameters ($a_i$, b) and the determined dimensions, by performing successive approximations converging towards a fixed point of another global contractive mapping, using at least one mapping belonging to a group of mappings composed of multidimensional mappings and nonlinear mappings, wherein restrictions of the global contractive mapping to the elementary subsets ($K_i$) are composed of the contractive elementary mappings.

53. An apparatus according to any one of claims 45 to 52, wherein, during the approximating operation performed by the digital signal approximator, the set of parameters ($a_i$, b) associated with an item of partitioning information and a set of arbitrary data, referred to as an initialization set, are taken into account, and wherein the approximating operation performed by the digital signal approximator comprises the steps of:

$C_1$) partitioning the initialization set into elementary subsets ($K_i$), the elementary subsets carrying out the partitioning corresponding to the partitioning information;

$C_2$) considering for each elementary subset ($K_i$), the parameters ($a_i$, b) of the elementary mappings corresponding to the elementary subsets ($K_i$), and implementing the elementary mappings on the elementary subsets ($K_i$) of the initialization set;

$C_3$) combining all the data obtained by implementations of elementary mappings in order to constitute an intermediate representation of the initialization set affected by an error; and $C_4$) reiterating the steps $C_1$–$C_3$, taking, as the initialization set, the intermediate representation, so as to approach said fixed point of the global contractive mapping, wherein a set of data ultimately obtained constitutes a secondary representation (RE) of the digital signal having been encoded.

54. An apparatus according claim 52, wherein the global contractive mappings are identical to one another.

55. An apparatus according to any one of claims 45–52 or 54, wherein the parameters ($a_i$, b) and the partitioning information are a primary representation of a color image with a number of components (Y, Cr, Cb), and wherein, after the approximating operation is performed by the digital signal approximator on one of the components, a secondary representation (RE) obtained in that approximating operation relating to one of the components already processed is used as the initialization set in the approximating operation relating to a next component.

56. An apparatus according to any one of claims 45–52 or 54, wherein the parameters ($a_i$, b) and the partitioning information are a primary representation of a color image with a number of components (Y, Cr, Cb), and wherein the approximating operation corresponding to each individual component uses initialization sets composed of arbitrary data for the processing of the parameters ($a_i$, b) relating to each component, and also uses a method of successive approximations converging towards said fixed point of the global contractive mapping corresponding to the individual component.

57. An apparatus according to any one of claims 45–52 or 54, wherein the parameters ($a_i$, b) and the partitioning information of the global contractive mapping are determined to enable the use, on a second digital signal having a different number of data items than a number of data items in the first digital signal, of a method of performing successive approximations converging towards said fixed point of global contractive mapping, and wherein the determined set of parameters ($a_i$, b) and partitioning information constitute a primary representation of the first digital signal.

58. An apparatus according to claim 57, further comprising:

an initial partitioner arranged for initially partitioning the first digital signal into initial elementary subsets;

a determiner arranged for determining, for each elementary subset ($K_i$), the parameters ($a_i$, b) of the elementary mapping which constitutes a restriction of the global contractive mapping to the elementary subset; and a successive approximator arranged to perform a method of successive approximations on the second digital signal to take into account elementary subsets, each corresponding to an elementary subset of the first digital signal and having a number of data items different from that of the corresponding elementary subset of the first digital signal.

59. An apparatus according to claim 58, wherein the numbers of data items in the elementary subsets of the second digital signal are proportional to the numbers of data items in the elementary subsets of the first digital signal which respectively correspond to them.

60. An apparatus according to claim 58, wherein during the constructing operation performed by said elementary mapping constructor, for each elementary subset ($K_i$) resulting from the initial partitioning and any supplementary partitionings, a plurality of working subsets ($L_i$) are considered, and an elementary mapping of the plurality of working subsets in the elementary subset is constructed by determining the parameters ($a_i$, b) of the elementary mapping, and wherein the method of successive approximations performed by the digital signal approximator on the second digital signal is allowed to take into account working subsets, each corresponding to a working subset of the first digital signal and having a number of data items different from that of the corresponding working subset of the first digital signal.

61. An apparatus according to claim 60, wherein the numbers of data items in the working subsets of the second digital signal are proportional to the numbers of data items in the working subsets of the first digital signal which respectively correspond to them.

* * * * *

UNITED STATES PATENT AND TRADEMARK OFFICE
CERTIFICATE OF CORRECTION

PATENT NO. : 6,266,451 B1
DATED : July 24, 2001
INVENTOR(S) : Maryline Charrier et al.

It is certified that error appears in the above-identified patent and that said Letters Patent is hereby corrected as shown below:

Column 26,
Line 19, "FIG. 16 to" should read -- FIGS. 16 and --.

Column 31,
Line 10, "in the part" should read -- in the register 520 of the part --.

Column 41,
Tab 2, "[($y_i$, $y_i$" should read -- [$y_i$, $y_i$ --;
Tab 2, "[($y_i$ + (16/$2^A$))," (both occurrences) should read -- [$y_i$ + (16/$2^A$), --; and
Tab 2, "[($y_i$ - (48/$2^A$))," (both occurrences) should read -- [$y_i$ - (48/$2^A$), --.

Column 50,
Line 44, "claims 16 to 20," should read -- claims 16 and 18 to 20, --.

Column 51,
Line 6, "claims 16 to 20" should read -- claims 16 and 18 to 20 --;
Line 14, see col. 51, line 6, above; and
Line 25, see col. 51, line 6, above.

Column 53,
Line 13, "herein" should read -- wherein --;

Column 55,
Line 30, "claims 45-52" should read -- claims 45, 46, 51, 52 --;
Line 40, "claims 45-52" should read -- claims 45, 46, 51, 52 --; and
Line 51, "claims 45-52" should read -- claims 45, 46, 51, 52 --.

Signed and Sealed this

Twenty-fourth Day of December, 2002

JAMES E. ROGAN
*Director of the United States Patent and Trademark Office*